United States Patent
Takeda et al.

(10) Patent No.: US 11,350,444 B2
(45) Date of Patent: May 31, 2022

(54) UPLINK ROUNDTRIP TIMES FOR DUAL CONNECTIVITY

(71) Applicant: QUALCOMM Incorporated, San Diego, CA (US)

(72) Inventors: Kazuki Takeda, Tokyo (JP); Wanshi Chen, San Diego, CA (US); Seyedkianoush Hosseini, San Diego, CA (US); Alberto Rico Alvarino, San Diego, CA (US); Peter Gaal, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/990,962

(22) Filed: Aug. 11, 2020

(65) Prior Publication Data

US 2021/0051703 A1     Feb. 18, 2021

Related U.S. Application Data

(60) Provisional application No. 62/885,770, filed on Aug. 12, 2019.

(51) Int. Cl.
*H04W 72/14* (2009.01)
*H04L 5/14* (2006.01)
(Continued)

(52) U.S. Cl.
CPC ........... *H04W 72/14* (2013.01); *H04L 5/1469* (2013.01); *H04W 8/24* (2013.01); *H04W 24/08* (2013.01);
(Continued)

(58) Field of Classification Search
None
See application file for complete search history.

(56) References Cited

U.S. PATENT DOCUMENTS

2017/0170931 A1* 6/2017 Kusashima .............. H04L 5/001
2017/0238287 A1* 8/2017 Kusashima ........... H04L 1/1854
370/280

(Continued)

FOREIGN PATENT DOCUMENTS

CN           104283655 B    5/2018
EP             3076732 A1   10/2016

OTHER PUBLICATIONS

International Search Report and Written Opinion—PCT/US2020/046010—ISA/EPO—dated Nov. 18, 2020 (194337WO).

*Primary Examiner* — Faruk Hamza
*Assistant Examiner* — Cassandra L Decker
(74) *Attorney, Agent, or Firm* — Holland & Hart LLP

(57) ABSTRACT

Methods, systems, and devices for wireless communications are described. A user equipment (UE) may receive, from a base station and while operating in a dual connectivity mode, an uplink grant in a first subframe of a set of subframes. The uplink grant may schedule transmission of uplink data. The UE may determine a second subframe of the set of subframes to transmit the uplink data and a third subframe of the set of subframes to monitor for feedback associated with transmission of the uplink data. The second subframe and the third subframe may be determined based on combinations of a primary cell time division duplex (TDD) uplink-downlink (UL-DL) configuration and a DL-reference UL-DL configuration. each of the combinations may have at least three uplink transmission subframes or three downlink monitoring subframes within a ten-subframe (Continued)

cycle. The UE may thus perform wireless communications in accordance with the transmission timelines.

30 Claims, 27 Drawing Sheets

(51) Int. Cl.
  *H04W 8/24*  (2009.01)
  *H04W 24/08*  (2009.01)
  *H04W 72/12*  (2009.01)
  *H04W 76/15*  (2018.01)
  *H04L 5/00*  (2006.01)
  *H04W 72/04*  (2009.01)

(52) U.S. Cl.
  CPC ... *H04W 72/0446* (2013.01); *H04W 72/1263* (2013.01); *H04W 76/15* (2018.02)

(56) References Cited

U.S. PATENT DOCUMENTS

| | | | |
|---|---|---|---|
| 2018/0014301 A1 | 1/2018 | Chen et al. | |
| 2018/0042015 A1 | 2/2018 | Yin et al. | |
| 2018/0123744 A1 | 5/2018 | Nogami et al. | |
| 2019/0320396 A1* | 10/2019 | Bagheri | H04W 72/1289 |
| 2020/0235903 A1* | 7/2020 | Kim | H04L 1/1812 |
| 2020/0245255 A1* | 7/2020 | Baldemair | H04W 52/146 |
| 2020/0245343 A1* | 7/2020 | Kim | H04W 72/1215 |
| 2021/0029764 A1* | 1/2021 | Chen Larsson | H04W 72/0446 |
| 2021/0218542 A1* | 7/2021 | Ohuchi | H04L 5/001 |

\* cited by examiner

UPLINK ROUNDTRIP TIMES FOR DUAL CONNECTIVITY

CROSS REFERENCE

The present Application for Patent claims the benefit of U.S. Provisional Patent Application No. 62/885,770 by TAKEDA et al., entitled "UPLINK ROUNDTRIP TIMES FOR DUAL CONNECTIVITY," filed Aug. 12, 2019, assigned to the assignee hereof, and expressly incorporated by reference herein.

FIELD OF TECHNOLOGY

The following relates generally to wireless communications and more specifically to uplink roundtrip time (RTT) for evolved universal terrestrial radio access network (EUTRAN) dual connectivity (EN-DC).

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, each of which may be otherwise known as a user equipment (UE). Some wireless communications systems may support configuring communication devices with various transmission timelines (e.g., in the form of frame structures) that support one or more of a frequency division duplex (FDD) configuration or a time division duplex (TDD) configuration. Some wireless communications systems may support communication of hybrid automatic repeat requests (HARQ) information between communication devices in accordance with one or more of the FDD configuration or the TDD configuration. For example, the communication devices may support exchange of HARQ information to improve reliability of wireless communications, such as uplink or downlink transmissions between the communication devices. As demand for communication efficiency increases, some wireless communications systems may fail to support satisfactory transmission configurations and thereby may be unable to support reliable wireless communications. Improved techniques are therefore desired.

SUMMARY

The described techniques may relate to configuring a communication device, which may be a user equipment (UE), to support multiple transmission timelines corresponding to one or more combinations of a primary cell time division duplex (TDD) uplink-downlink (UL-DL) configuration and a DL-reference UL-DL configuration. The communication device, such as a UE, may be operating in a dual connectivity mode such as an evolved universal terrestrial radio access network (EUTRAN) dual connectivity (EN-DC) mode. In some examples, the described techniques may configure the various transmission timelines to include an uplink feedback roundtrip time based on ten-subframe cycles. In some examples, the described techniques may configure the primary cell TDD UL-DL configuration to correspond to a configuration index 0 and the DL-reference UL-DL configuration to correspond to one of a configuration index 2, a configuration index 4, or a configuration index 5. In some other examples, the described techniques may configure the primary cell TDD UL-DL configuration to correspond to a configuration index 6, and the DL-reference UL-DL configuration to correspond to one of a configuration index 2, a configuration index 4, or a configuration index 5. As demand for communication efficiency increases, the described techniques may configure the combinations to have at least three uplink transmission subframes or three downlink monitoring subframes within a ten-subframe cycle, to enable the communication device to experience improvements to power consumption, spectral efficiency, higher data rates and, in some examples, may promote enhanced efficiency for high reliability and low latency communication operations, among other benefits.

A method of wireless communication at a UE is described. The method may include receiving, from a base station and while operating in a dual connectivity mode, an uplink grant in a first subframe of a set of subframes, the uplink grant scheduling transmission of uplink data, determining a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicating with the base station in accordance with the transmission timelines.

An apparatus for wireless communication is described. The apparatus may include a processor, memory coupled with the processor, and instructions stored in the memory. The instructions may be executable by the processor to cause the apparatus to receive, from a base station and while operating in a dual connectivity mode, an uplink grant in a first subframe of a set of subframes, the uplink grant scheduling transmission of uplink data, determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicate with the base station in accordance with the transmission timelines.

Another apparatus for wireless communication is described. The apparatus may include means for receiving, from a base station and while operating in a dual connectivity mode, an uplink grant in a first subframe of a set of subframes, the uplink grant scheduling transmission of uplink data, determining a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicating with the base station in accordance with the transmission timelines.

A non-transitory computer-readable medium storing code for wireless communication at a UE is described. The code may include instructions executable by a processor to receive, from a base station and while operating in a dual connectivity mode, an uplink grant in a first subframe of a set of subframes, the uplink grant scheduling transmission of uplink data, determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicate with the base station in accordance with the transmission timelines.

Some examples of the method, apparatuses, and non-transitory computer-readable medium described herein may further include operations, features, means, or instructions for identifying, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9.

Some examples of the method, apparatuses, and non-transitory computer-readable medium described herein may further include operations, features, means, or instructions for identifying that the primary cell TDD UL-DL configuration corresponds to the configuration index 0, and identifying that the DL-reference UL-DL configuration corresponds to one of a configuration index 2, a configuration index 4, or a configuration index 5.

In some examples of the method, apparatuses, and non-transitory computer-readable medium described herein, determining the second subframe and the third subframe may include operations, features, means, or instructions for identifying that the uplink grant may be received on subframe index 0 of a first ten-subframe cycle, determining, based on the uplink grant being received on subframe index 0 of the first ten-subframe cycle, that the second subframe for transmitting the uplink data may be at subframe index 4 of the first ten-subframe cycle, and determining, based on the uplink data being transmitted on subframe index 4 of the first ten-subframe cycle, that the third subframe for monitoring the feedback may be at subframe index 0 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be received on subframe index 1 of a first ten-subframe cycle, determining, based on the uplink grant being received on subframe index 1 of the first ten-subframe cycle, that the second subframe for transmitting the uplink data may be at subframe index 7 of the first ten-subframe cycle, and determining, based on the uplink data being transmitted on subframe index 7 of the first ten-subframe cycle, that the third subframe for monitoring the feedback may be at subframe index 1 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be received on subframe index 1 of a first ten-subframe cycle, determining, based on the uplink grant being received on subframe index 1 of the first ten-subframe cycle and on a value of an uplink index field in the uplink grant, that the second subframe for transmitting the uplink data may be either at subframe index 7 or subframe index 8 of the first ten-subframe cycle, and determining, based on the uplink data being transmitted on subframe index 7 or subframe index 8 of the first ten-subframe cycle, that the third subframe for monitoring the feedback may be at either subframe index 1 or subframe index 5 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be received on subframe index 5 of a first ten-subframe cycle, determining, based on the uplink grant being received on subframe index 5 of the first ten-subframe cycle, that the second subframe for transmitting the uplink data may be at subframe index 9 of the first ten-subframe cycle, and determining, based on the uplink data being transmitted on subframe index 9 of the first ten-subframe cycle, that the third subframe for monitoring the feedback may be at subframe index 5 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be received on subframe index 6 of a first ten-subframe cycle, determining, based on the uplink grant being received on subframe index 6 of the first ten-subframe cycle, that the second subframe for transmitting the uplink data may be at subframe index 2 of a second ten-subframe cycle subsequent to the first ten-subframe cycle, and determining, based on the uplink data being transmitted on subframe index 2 of the first ten-subframe cycle, that the third subframe for monitoring the feedback may be at subframe index 6 of the second ten-subframe cycle subsequent.

In some examples of the method, apparatuses, and non-transitory computer-readable medium described herein, determining the second subframe and the third subframe may include operations, features, means, or instructions for identifying that the uplink grant may be received on subframe index 6 of a first ten-subframe cycle, determining, based on the uplink grant being received on subframe index 6 of the first ten-subframe cycle and on a value of an uplink index field in the uplink grant, that the second subframe for transmitting the uplink data may be either at subframe index 2 or subframe index 3 of a second ten-subframe cycle subsequent to the first ten-subframe cycle, and determining, based on the uplink data being transmitted on either subframe index 2 or subframe index 3 of the second ten-subframe cycle, that the third subframe for monitoring the feedback may be either at subframe index 6 or at subframe index 0 of a third ten-subframe cycle subsequent to the second ten-subframe cycle.

Some examples of the method, apparatuses, and non-transitory computer-readable medium described herein may further include operations, features, means, or instructions for identifying that the UE may be a dynamic power sharing capable UE, identifying, from the combinations and based on the UE being a dynamic power sharing capable UE, that the UE may be configured to receive the uplink grant on any one of a subframe index 0, 1, 5, or 6 of a first ten-subframe cycle, identifying, from the combinations, that the UE may be configured to transmit the uplink data on any one of a subframe index 4, 7, or 9 of the first ten-subframe cycle or subframe index 2 of a second ten-subframe cycle subsequent to the first ten-subframe cycle, and identifying, from the combinations, that the UE may be configured to monitor for the feedback associated with transmission of the uplink data on any one of a subframe index 0, 1, 5, or 6 of the second ten-subframe cycle.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the UE may be configured to receive the uplink grant on any one of a subframe index 1 or 6 of a first ten-subframe cycle when the DL-reference UL-DL configuration corresponds to the configuration index 2, identifying, from the combinations, that the UE may be configured to transmit the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2, and identifying, from the combinations, that the UE may be configured to monitor for the feedback associated with transmission of the uplink data on any one of a subframe index 1 or 6 of the second ten-subframe cycle when the DL-reference UL-DL configuration corresponds to the configuration index 2.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the UE may be configured to receive the uplink grant on a subframe index 6 of a first ten-subframe cycle when the DL-reference UL-DL configuration corresponds to the configuration index 4 or the configuration index 5, identifying, from the combinations, that the UE may be configured to transmit the uplink data on subframe index 2 of a second ten-subframe cycle subsequent to the first ten-subframe cycle when the DL-reference UL-DL configuration corresponds to the configuration index 4 or the configuration index 5, and identifying, from the combinations, that the UE may be configured to monitor for the feedback associated with transmission of the uplink data on subframe index 6 of the second ten-subframe cycle when the DL-reference UL-DL configuration corresponds to the configuration index 4 or the configuration index 5.

Some examples of the method, apparatuses, and non-transitory computer-readable medium described herein may further include operations, features, means, or instructions for identifying that the primary cell TDD UL-DL configuration corresponds to the configuration index 6, and identifying that the DL-reference UL-DL configuration corresponds to one of a configuration index 2, a configuration index 4, or a configuration index 5.

In some examples of the method, apparatuses, and non-transitory computer-readable medium described herein, determining the second subframe and the third subframe may include operations, features, means, or instructions for identifying that the uplink grant may be received on subframe index 1 of a first ten-subframe cycle, determining, based on the uplink grant being received on subframe index 1 of the first ten-subframe cycle, that the second subframe for transmitting the uplink data may be at subframe index 7 of the first ten-subframe cycle, and determining, based on the uplink data being transmitted on subframe index 7 of the first ten-subframe cycle, that the third subframe for monitoring the feedback may be at subframe index 1 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be received on subframe index 6 of a first ten-subframe cycle, determining, based on the uplink grant being received on subframe index 6 of the first ten-subframe cycle, that the second subframe for transmitting the uplink data may be at subframe index 2 of a second ten-subframe cycle subsequent to the first ten-subframe cycle, and determining, based on the uplink data being transmitted on subframe index 2 of the first ten-subframe cycle, that the third subframe for monitoring the feedback may be at subframe index 6 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be received on subframe index 9 of a first ten-subframe cycle, determining, based on the uplink grant being received on subframe index 9 of the first ten-subframe cycle, that the second subframe for transmitting the uplink data may be at subframe index 3 of a second ten-subframe cycle subsequent to the first ten-subframe cycle, and determining, based on the uplink data being transmitted on subframe index 3 of the second ten-subframe cycle, that the third subframe for monitoring the feedback may be at subframe index 9 of the second ten-subframe cycle.

Some examples of the method, apparatuses, and non-transitory computer-readable medium described herein may further include operations, features, means, or instructions for identifying that the UE may be a dynamic power sharing capable UE, identifying, from the combinations and based on the UE being a dynamic power sharing capable UE, that the UE may be configured to receive the uplink grant on any one of a subframe index 1, 6, or 9 of a first ten-subframe cycle, identifying, from the combinations, that the UE may be configured to transmit the uplink data on any one of a subframe index 7 of the first ten-subframe cycle or subframe index 2 or 3 of a second ten-subframe cycle subsequent to the first ten-subframe cycle, and identifying, from the combinations, that the UE may be configured to monitor for the feedback associated with transmission of the uplink data on any one of a subframe index 1, 6, or 9 of the second ten-subframe cycle.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the UE may be configured to receive the uplink grant on any one of a subframe index 1 or 6 of a first ten-subframe cycle when the DL-reference UL-DL configuration corresponds to the configuration index 2, identifying, from the combinations, that the UE may be configured to transmit the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2, and identifying, from the combinations, that the UE may be configured to monitor for the feedback associated with transmission of the uplink data on any one of a subframe index 1 or 6 of the second ten-subframe cycle when the DL-reference UL-DL configuration corresponds to the configuration index 2.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the UE may be configured to receive the uplink grant on any one of a subframe index 6 or 9 of a first ten-subframe cycle when the DL-reference UL-DL configuration corresponds to the configuration index 4, identifying, from the combinations, that the UE may be configured to transmit the uplink data on any one of a subframe index 2 or 3 of a second ten-subframe cycle subsequent to the first ten-subframe cycle when the DL-reference UL-DL configuration corresponds to the configuration index 4, and identifying, from the combinations, that the UE may be configured to monitor for the feedback associated with transmission of the uplink data on any one of a subframe index 6 or 9 of the second ten-subframe cycle when the DL-reference UL-DL configuration corresponds to the configuration index 4.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the UE may be configured to receive the uplink grant on a subframe index 6 of a first ten-subframe cycle when the DL-reference UL-DL configuration corresponds to the configuration index 5, identifying, from the combinations, that the UE may be configured to transmit the uplink data on subframe index 2 of a second ten-subframe cycle subsequent to the first ten-subframe cycle when the DL-reference UL-DL configuration corresponds to the configuration index 5, and identifying, from the combinations, that the UE may be configured to monitor for the feedback associated with transmission of the uplink data on subframe index 6 of the second ten-subframe cycle when the DL-reference UL-DL configuration corresponds to the configuration index 5.

In some examples of the method, apparatuses, and non-transitory computer-readable medium described herein, an uplink index field in the uplink grant includes an uplink downlink assignment index.

In some examples of the method, apparatuses, and non-transitory computer-readable medium described herein, an uplink index field in the uplink grant includes one or more static bit values.

Some examples of the method, apparatuses, and non-transitory computer-readable medium described herein may further include operations, features, means, or instructions for identifying a dynamic power sharing capability of the UE, and transmitting, to the base station, UE capability information including an indication of the dynamic power sharing capability of the UE.

Some examples of the method, apparatuses, and non-transitory computer-readable medium described herein may further include operations, features, means, or instructions for receiving, via signaling from the base station, an indication of the primary cell TDD UL-DL configuration and the DL-reference UL-DL configuration based on the UE capability information.

In some examples of the method, apparatuses, and non-transitory computer-readable medium described herein, the signaling includes UE specific radio resource control signaling.

In some examples of the method, apparatuses, and non-transitory computer-readable medium described herein, the signaling includes a dynamic control signaling.

In some examples of the method, apparatuses, and non-transitory computer-readable medium described herein, the dynamic control signaling includes downlink control information.

A method of wireless communication at a base station is described. The method may include configuring a UE with a primary cell TDD UL-DL configuration corresponding to a configuration index 0 or a configuration index 6 and a DL-reference UL-DL configuration, transmitting, to the UE, an uplink grant in a first subframe of a set of subframes, the uplink grant scheduling transmission of uplink data, determining a second subframe of the set of subframes to receive the uplink data and a third subframe of the set of subframes to transmit feedback associated with reception of the uplink data, the second subframe and the third subframe being determined based on combinations of a primary cell TDD UL-DL configuration and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicating with the UE in accordance with the transmission timelines.

An apparatus for wireless communication is described. The apparatus may include a processor, memory coupled with the processor, and instructions stored in the memory. The instructions may be executable by the processor to cause the apparatus to configure a UE with a primary cell TDD UL-DL configuration corresponding to a configuration index 0 or a configuration index 6 and a DL-reference UL-DL configuration, transmit, to the UE, an uplink grant in a first subframe of a set of subframes, the uplink grant scheduling transmission of uplink data, determine a second subframe of the set of subframes to receive the uplink data and a third subframe of the set of subframes to transmit feedback associated with reception of the uplink data, the second subframe and the third subframe being determined based on combinations of a primary cell TDD UL-DL configuration and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicate with the UE in accordance with the transmission timelines.

Another apparatus for wireless communication is described. The apparatus may include means for configuring a UE with a primary cell TDD UL-DL configuration corresponding to a configuration index 0 or a configuration index 6 and a DL-reference UL-DL configuration, transmitting, to the UE, an uplink grant in a first subframe of a set of subframes, the uplink grant scheduling transmission of uplink data, determining a second subframe of the set of subframes to receive the uplink data and a third subframe of the set of subframes to transmit feedback associated with reception of the uplink data, the second subframe and the third subframe being determined based on combinations of a primary cell TDD UL-DL configuration and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicating with the UE in accordance with the transmission timelines.

A non-transitory computer-readable medium storing code for wireless communication at a base station is described. The code may include instructions executable by a processor to configure a UE with a primary cell TDD UL-DL configuration corresponding to a configuration index 0 or a configuration index 6 and a DL-reference UL-DL configuration, transmit, to the UE, an uplink grant in a first subframe of a set of subframes, the uplink grant scheduling transmission of uplink data, determine a second subframe of the set of subframes to receive the uplink data and a third subframe of the set of subframes to transmit feedback associated with reception of the uplink data, the second subframe and the third subframe being determined based on combinations of a primary cell TDD UL-DL configuration and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one, and communicate with the UE in accordance with the transmission timelines.

Some examples of the method, apparatuses, and non-transitory computer-readable medium described herein may further include operations, features, means, or instructions for identifying, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9.

Some examples of the method, apparatuses, and non-transitory computer-readable medium described herein may further include operations, features, means, or instructions for identifying that the primary cell TDD UL-DL configuration corresponds to the configuration index 0, and identifying that the DL-reference UL-DL configuration corresponds to one of a configuration index 2, a configuration index 4, or a configuration index 5.

In some examples of the method, apparatuses, and non-transitory computer-readable medium described herein, determining the second subframe and the third subframe may include operations, features, means, or instructions for identifying that the uplink grant may be transmitted on subframe index 0 of a first ten-subframe cycle, determining, based on the uplink grant being transmitted on subframe index 0 of the first ten-subframe cycle, that the second subframe for receiving the uplink data may be at subframe index 4 of the first ten-subframe cycle, and determining, based on the uplink data being received on subframe index 4 of the first ten-subframe cycle, that the third subframe for transmitting the feedback may be at subframe index 0 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be transmitted on subframe index 1 of a first ten-subframe cycle, determining, based on the uplink grant being transmitted on subframe index 1 of the first ten-subframe cycle, that the second subframe for receiving the uplink data may be at subframe index 7 of the first ten-subframe cycle, and determining, based on the uplink data being received on subframe index 7 of the first ten-subframe cycle, that the third subframe for transmitting the feedback may be at subframe index 1 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be transmitted on subframe index 1 of a first ten-subframe cycle, determining, based on the uplink grant being transmitted on subframe index 1 of the first ten-subframe cycle and on a value of an uplink index field in the uplink grant, that the second subframe for receiving the uplink data may be either at subframe index 7 or subframe index 8 of the first ten-subframe cycle, and determining, based on the uplink data being received on subframe index 1 or subframe index 8 of the first ten-subframe cycle, that the third subframe for transmitting the feedback may be at subframe index 1 or subframe index 5 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be transmitted on subframe index 5 of a first ten-subframe cycle, determining, based on the uplink grant being transmitted on subframe index 5 of the first ten-subframe cycle, that the second subframe for receiving the uplink data may be at subframe index 9 of the first ten-subframe cycle, and determining, based on the uplink data being received on subframe index 9 of the first ten-subframe cycle, that the third subframe for transmitting the feedback may be at subframe index 5 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be transmitted on subframe index 6 of a first ten-subframe cycle, determining, based on the uplink grant being transmitted on subframe index 6 of the first ten-subframe cycle, that the second subframe for receiving the uplink data may be at subframe index 2 of the first ten-subframe cycle, and determining, based on the uplink data being received on subframe index 2 of the first ten-subframe cycle, that the third subframe for transmitting the feedback may be at subframe index 6 of a second ten-subframe cycle subsequent to the first ten-subframe cycle.

Some examples of the method, apparatuses, and non-transitory computer-readable medium described herein may further include operations, features, means, or instructions for identifying that the UE may be a dynamic power sharing capable UE, identifying, from the combinations and based on the UE being a dynamic power sharing capable UE, that the base station may be configured to transmit the uplink grant on any one of a subframe index 0, 1, 5, or 6 of a first ten-subframe cycle, identifying, from the combinations, that the base station may be configured to receive the uplink data on any one of a subframe index 4, 7, or 9 of the first ten-subframe cycle or subframe index 2 of a second ten-subframe cycle subsequent to the first ten-subframe cycle, and identifying, from the combinations, that the base station may be configured to transmit the feedback associated with reception of the uplink data on any one of a subframe index 0, 1, 5, or 6 of the second ten-subframe cycle.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the base station may be configured to transmit the uplink grant on any one of a subframe index 1, or 6 of a first ten-subframe cycle when the DL-reference UL-DL configuration corresponds to the configuration index 2, identifying, from the combinations, that the base station may be configured to receive the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2, and identifying, from the combinations, that the base station may be configured to transmit the feedback associated with transmission of the uplink data on any one of a subframe index 1 or 6 of the second ten-subframe cycle when the DL-reference UL-DL configuration corresponds to the configuration index 2.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the base station may be configured to transmit the uplink grant on a subframe index 6 of a first ten-subframe cycle when the DL-reference UL-DL configuration corresponds to the configuration index 4 or the configuration index 5, identifying, from the combinations, that the base station may be configured to receive the uplink data on subframe index 2 of a second ten-subframe cycle subsequent to the first ten-subframe cycle when the DL-reference UL-DL configuration corresponds to the configuration index 4 or the configuration index 5, and identifying, from the combinations, that the base station may be configured to transmit the feedback associated with reception of the uplink data on subframe index 6 of the second ten-subframe cycle when the DL-reference UL-DL configuration corresponds to the configuration index 4 or the configuration index 5.

Some examples of the method, apparatuses, and non-transitory computer-readable medium described herein may further include operations, features, means, or instructions for identifying that the primary cell TDD UL-DL configuration corresponds to the configuration index 6, and identifying that the DL-reference UL-DL configuration corresponds to one of a configuration index 2, a configuration index 4, or a configuration index 5.

In some examples of the method, apparatuses, and non-transitory computer-readable medium described herein, determining the second subframe and the third subframe may include operations, features, means, or instructions for identifying that the uplink grant may be transmitted on subframe index 1 of a first ten-subframe cycle, determining, based on the uplink grant being transmitted on subframe index 1 of the first ten-subframe cycle, that the second subframe for receiving the uplink data may be at subframe index 7 of the first ten-subframe cycle, and determining, based on the uplink data being received on subframe index 7 of the first ten-subframe cycle, that the third subframe for transmitting the feedback may be at subframe index 1 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be transmitted on subframe index 6 of a first ten-subframe cycle, determining, based on the uplink grant being transmitted on subframe index 6 of the first ten-subframe cycle, that the second subframe for receiving the uplink data may be at subframe index 2 of a second ten-subframe cycle subsequent to the first ten-subframe cycle, and determining, based on the uplink data being received on subframe index 2 of the first ten-subframe cycle, that the third subframe for transmitting the feedback may be at subframe index 6 of a second ten-subframe cycle subsequent to the first ten-subframe cycle.

In some examples of the method, apparatuses, and non-transitory computer-readable medium described herein, determining the second subframe and the third subframe may include operations, features, means, or instructions for identifying that the uplink grant may be transmitted on subframe index 9 of a first ten-subframe cycle, determining, based on the uplink grant being transmitted on subframe index 9 of the first ten-subframe cycle, that the second subframe for receiving the uplink data may be at subframe index 3 of a second ten-subframe cycle subsequent to the first ten-subframe cycle, and determining, based on the uplink data being received on subframe index 3 of the second ten-subframe cycle, that the third subframe for transmitting the feedback may be at subframe index 9 of the second ten-subframe cycle.

Some examples of the method, apparatuses, and non-transitory computer-readable medium described herein may further include operations, features, means, or instructions for identifying that the UE may be a dynamic power sharing capable UE, identifying, from the combinations and based on the UE being a dynamic power sharing capable UE, that the base station may be configured to transmit the uplink grant on any one of a subframe index 1, 6, or 9 of a first ten-subframe cycle, identifying, from the combinations, that the base station may be configured to receive the uplink data on any one of a subframe index 7 of the first ten-subframe cycle or subframe index 2 or 3 of a second ten-subframe cycle subsequent to the first ten-subframe cycle, and identifying, from the combinations, that the base station may be configured to transmit the feedback associated with reception of the uplink data on any one of a subframe index 1, 6, or 9 of the second ten-subframe cycle.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the base station may be configured to transmit the uplink grant on any one of a subframe index 1 or 6 of a first ten-subframe cycle when the DL-reference UL-DL configuration corresponds to the configuration index 2, identifying, from the combinations, that the base station may be configured to receive the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2, and identifying, from the combinations, that the base station may be configured to transmit the feedback associated with reception of the uplink data on any one of a subframe index 1 or 6 of the second ten-subframe cycle when the DL-reference UL-DL configuration corresponds to the configuration index 2.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the base station may be configured to transmit the uplink grant on any one of a subframe index 6 or 9 of a first ten-subframe cycle when the DL-reference UL-DL configuration corresponds to the configuration index 4, identifying, from the combinations, that the base station may be configured to receive the uplink data on any one of a subframe index 2 or 3 of a second ten-subframe cycle subsequent to the first ten-subframe cycle when the DL-reference UL-DL configuration corresponds to the configuration index 4, and identifying, from the combinations, that the base station may be configured to transmit the feedback associated with reception of the uplink data on any one of a subframe index 6 or 9 of the second ten-subframe cycle when the DL-reference UL-DL configuration corresponds to the configuration index 4.

Some examples of the method, apparatuses, and non-transitory computer-readable medium described herein may further include operations, features, means, or instructions for identifying that the UE may be a non-dynamic power sharing capable UE, identifying, from the combinations and based on the UE being a non-dynamic power sharing capable UE, that the base station may be configured to transmit the uplink grant on a subframe index 6 of a first ten-subframe cycle when the DL-reference UL-DL configuration corresponds to the configuration index 5, identifying, from the combinations, that the base station may be configured to receive the uplink data on subframe index 2 of a second ten-subframe cycle subsequent to the first ten-subframe cycle when the DL-reference UL-DL configuration corresponds to the configuration index 5, and identifying, from the combinations, that the base station may be configured to transmit the feedback associated with transmission of the uplink data on subframe index 6 of the second ten-subframe cycle when the DL-reference UL-DL configuration corresponds to the configuration index 5.

In some examples of the method, apparatuses, and non-transitory computer-readable medium described herein, an uplink index field in the uplink grant includes an uplink downlink assignment index.

In some examples of the method, apparatuses, and non-transitory computer-readable medium described herein, an uplink index field in the uplink grant includes one or more static bit values.

Some examples of the method, apparatuses, and non-transitory computer-readable medium described herein may further include operations, features, means, or instructions for receiving UE capability information including an indication of a dynamic power sharing capability of the UE.

Some examples of the method, apparatuses, and non-transitory computer-readable medium described herein may further include operations, features, means, or instructions for transmitting, via signaling to the UE, an indication of the primary cell TDD UL-DL configuration and the DL-reference UL-DL configuration based on the UE capability information.

In some examples of the method, apparatuses, and non-transitory computer-readable medium described herein, the signaling includes a radio resource control signaling.

In some examples of the method, apparatuses, and non-transitory computer-readable medium described herein, the signaling includes a dynamic control signaling.

In some examples of the method, apparatuses, and non-transitory computer-readable medium described herein, the dynamic control signaling includes downlink control information.

DETAILED DESCRIPTION

Figure 1:
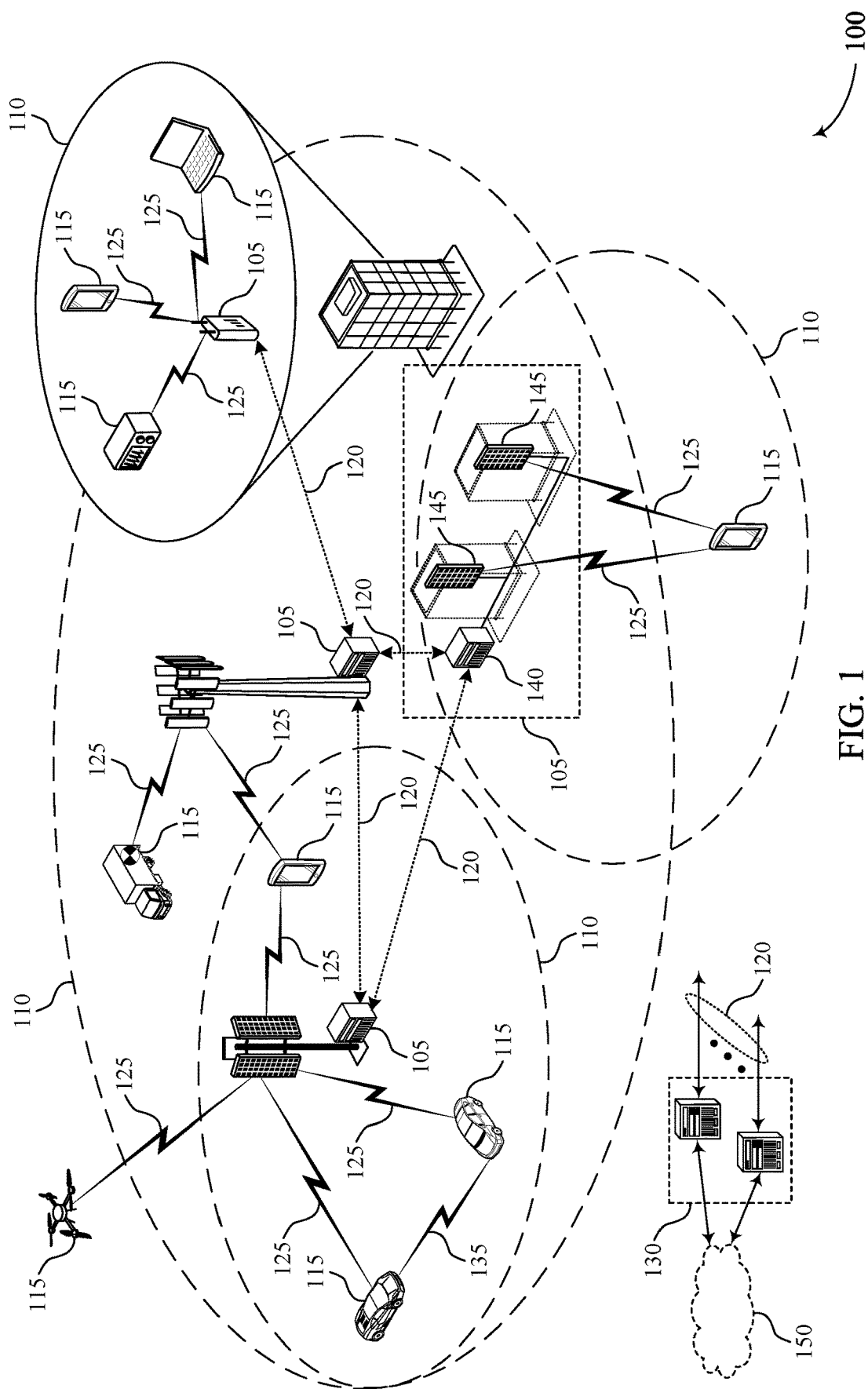
FIGS. 1 and 2 illustrate examples of wireless communications systems that support uplink roundtrip time (RTT) for evolved universal terrestrial radio access network (EU-TRAN) dual connectivity (EN-DC) in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies in accordance with operating in a dual connectivity mode. The mode may thus allow the communication devices to simultaneously transmit and receive information (e.g., in the form of packets) on multiple component carriers from at least two cell groups via a master base station (e.g., a master eNB (MeNB), a master gNB (MgNB)) and a secondary base station (e.g., a secondary eNB (SeNB), a secondary gNB (SgNB)). The component carriers may be configured into a primary cell and a secondary cell. In some examples, the master base station may correspond to the primary cell, while the secondary base station may correspond to the secondary cell.

The primary cell may, in some examples, correspond to one radio access technology while the secondary cell may correspond to another radio access technology. For example, the primary cell may correspond to LTE, while the secondary cell may correspond to NR. Alternatively, the primary cell may correspond to NR, while the secondary cell may correspond to LTE. The primary cell may, in some examples, include one component carrier in time division duplex (TDD) mode, or one downlink component carrier and one uplink component carrier in frequency division duplex (FDD) mode. Similarly, each secondary cell may, in some examples, include one component carrier in TDD mode, or one downlink component carrier and optionally one uplink component carrier in FDD mode. The communication devices may communicate with one or more of the primary cell or the secondary cell on one or more of the configured component carriers.

In some examples, the communication devices may support one or more transmission timelines corresponding to one or more combinations (e.g., in the form of one or more tables) of a primary cell TDD uplink-downlink (UL-DL) configuration and a DL-reference UL-DL configuration. The communication devices may communicate with other communications devices in accordance with the transmission timelines. In some examples, the various transmission timelines may be configured to include an uplink feedback roundtrip time based on ten-subframe cycles, with each subframe in a cycle having a subframe index ranging from 0 to 9. Additionally, as demand for communication efficiency increases, the one or more combinations of primary cell TDD UL-DL configurations and DL-reference UL-DL configurations may be configured to have at least three uplink transmission subframes or three downlink monitoring subframes in a ten-subframe cycle.

In some examples, the primary cell TDD UL-DL configuration may be configured to correspond to a configuration index 0 and the DL-reference UL-DL configuration to correspond to one of a configuration index 2, a configuration index 4, or a configuration index 5. In some other examples, the primary cell TDD UL-DL configuration may be configured to correspond to a configuration index 6, and the DL-reference UL-DL configuration to correspond to one of a configuration index 2, a configuration index 4, or a configuration index 5. By way of example, the communication devices may receive and while operating in the dual connectivity mode, an uplink grant in a first subframe cycle of the ten-subframe cycles. The uplink grant may schedule transmission of uplink data for the communication devices. Following, the communication devices may determine a second subframe cycle of the ten-subframe cycles to transmit the uplink data and a third subframe cycle of the ten-subframe cycles to monitor for feedback associated with transmission of the uplink data. The communication devices may identify (or determine) the second subframe cycle of the ten-subframe cycles for transmitting the uplink data and the third subframe cycle for monitoring for feedback by referencing to the one or more combinations of the primary cell TDD UL-DL configuration and the DL-reference UL-DL configuration. The communication devices may thus communicate in accordance with the transmission timelines.

In some examples, because the transmission timelines may be fixed by the one or more combinations of the primary cell TDD UL-DL configuration and the DL-reference UL-DL configuration, an uplink index field in an uplink grant may not be needed. The uplink index field may indicate some variability in the subframes in which an uplink data transmission is sent, responsive to the uplink grant. However, in some instances, the transmission timelines are set by the one or more combinations. In those instances, a value of the uplink index field in the uplink grant may be assumed, and the uplink index field may be used instead as an uplink downlink assignment index field. In other cases, the value of the uplink index field may not be assumed, as the uplink index field may provide additional variability to the transmission timelines.

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to power consumption when operating under a dual connectivity mode. In some examples, configuring the described one or more communication devices with one or more combinations of a primary cell TDD UL-DL configuration and a DL-reference UL-DL configuration may support improvements to spectral efficiency, higher data rates and, in some examples, may promote enhanced efficiency for high reliability and low latency communication operations, among other benefits.

Aspects of the disclosure are initially described in the context of wireless communications systems. Aspects of the disclosure are further illustrated by and described with reference to transmission timelines that relate to uplink RTT for EN-DC. Aspects of the disclosure are further illustrated by and described with reference to apparatus diagrams, system diagrams, and flowcharts that relate to uplink RTT for EN-DC.

FIG. 1 illustrates an example of a wireless communications system 100 that supports uplink RTT for EN-DC in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
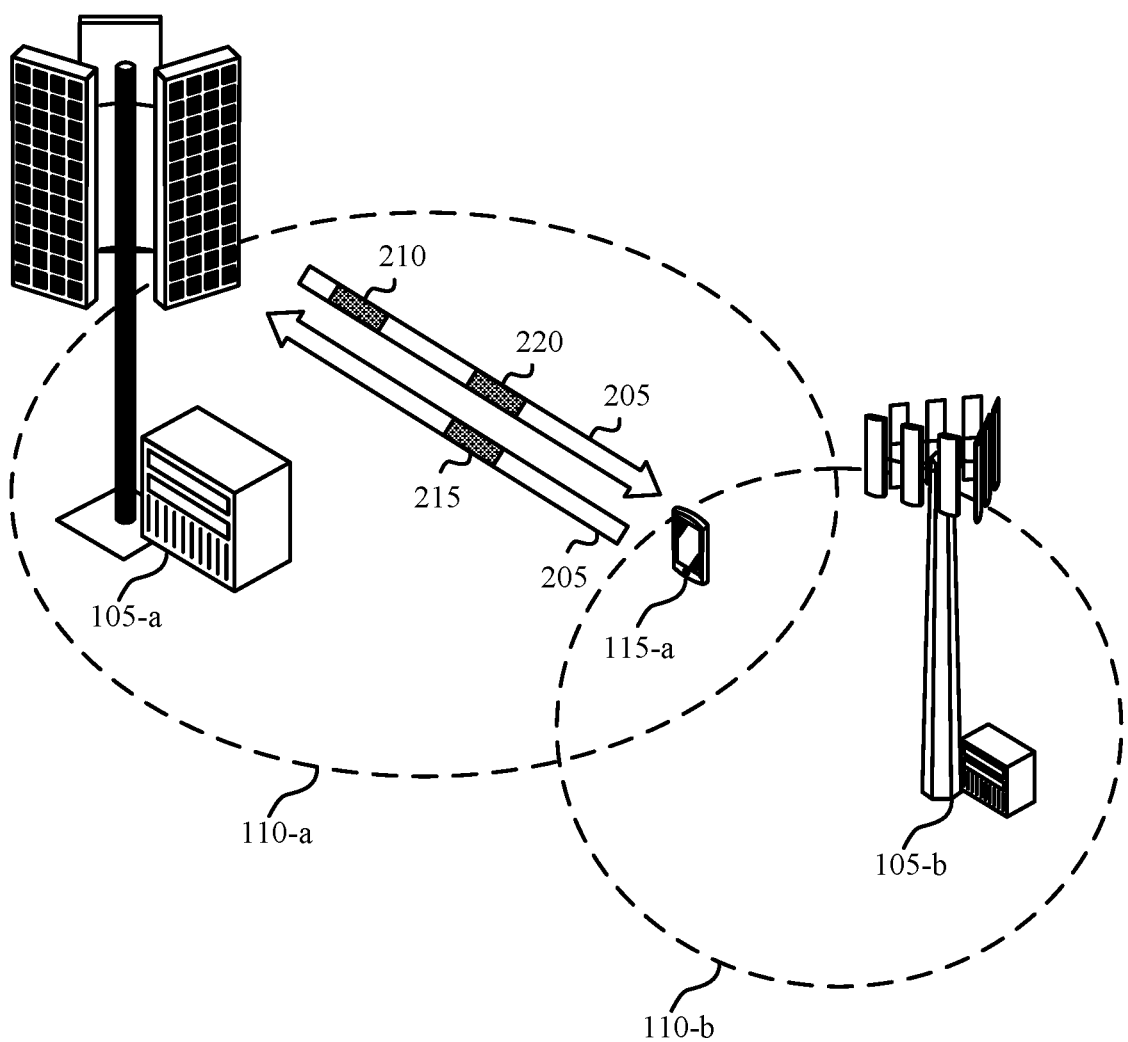

FIG. 2 illustrates an example of a wireless communications system 200 that supports uplink RTT for EN-DC in accordance with aspects of the present disclosure. The wireless communications system 200 may include a base station 105-a and a UE 115-a within a geographic coverage area 110-a, as well as a base station 105-b and the UE 115-a within a geographic coverage area 110-b. The base station 105-a, the base station 105-b, and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. In some examples, the wireless communications system 200 may implement aspects of the wireless communications system 100 to support improvements to power consumption, spectral efficiency, higher data rates and, in some examples, may promote enhanced efficiency for high reliability and low latency communication operations, among other benefits.

In the example of FIG. 2, the UE 115-a may support one or more of the above example radio access technologies, such as LTE and NR in accordance with operating in a dual connectivity mode. The mode may thus allow the UE 115-a to simultaneously transmit and receive information (e.g., in the form of packets) on multiple component carriers from at least two cell groups via a master cell group (MCG) corresponding to a master base station (e.g., a master eNB (MeNB), a master gNB (MgNB)) and a secondary cell group (SCG) corresponding to a secondary base station (e.g., a secondary eNB (SeNB), a secondary gNB (SgNB)). For example, the base station 105-a may be referred to as the master base station, while the base station 105-b may be referred to as the secondary base station. In some examples, the base station 105-a may correspond to the MCG that includes the primary cell (which may correspond to the coverage area 110-a), while the base station 105-b may correspond to the SCG that includes the secondary cell (which may correspond to the coverage area 110-b). In some examples, the SCG may include a primary secondary cell, as well as one or more secondary cells.

The UE 115-a may, in some examples, support one or more combinations of a primary cell TDD UL-DL configuration and a DL-reference UL-DL configuration. In some examples, due to a demand for higher communication efficiency, the one or more combinations of a primary cell TDD UL-DL configuration and a DL-reference UL-DL configuration may be configured to have at least three uplink transmission subframes or three downlink monitoring subframes in a ten-subframe cycle. In some examples, the one or more combinations may be in the form of a table. For example, Table A and Table B below illustrate example combinations of a primary cell TDD UL-DL configuration and a DL-reference UL-DL configuration. In some examples, timing of communications (e.g., grants, data) may be variable based on the primary cell TDD UL-DL configuration and the DL-reference UL-DL configuration in Table A. The UE 115-a and the base station 105-a or the base station 105-b may thus communicate (e.g., feedback information) in subframe n+k, where k is given in Table A. For example, the base station 105-a may transmit, and the UE 115-a may receive, an uplink grant on subframe n that schedules uplink data (e.g., schedules physical uplink shared channel (PUSCH)) for the UE 115-a on subframe n+k. In some examples, timing of feedback (e.g., HARQ acknowledgment) may be variable based on the primary cell TDD UL-DL configuration and the DL-reference UL-DL configuration in Table B. For example, the UE 115-a may receive (or transmit), and the base station 105-a may transmit (or receive), feedback on a subframe n+$k_{PHICH}$ related to the uplink data scheduled on subframe n+k, where $k_{PHICH}$ is given in Table B.

TABLE A k for {primary cell TDD UL-DL configuration, a DL-reference UL-DL configuration}

| Primary Cell TDD UL-DL Configuration | DL-reference UL-DL Configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 2 | | 4 | 6 | | | | 4 | 6 | | |
| | 4 | | 4 | 6 | | | | 4 | 6 | | |
| | 5 | | 4 | 6 | | | | 4 | 6 | | |
| 6 | 2 | | | 6 | | | | 6 | | | 4 |
| | 4 | | | 6 | | | | 6 | | | 4 |
| | 5 | | | 6 | | | | 6 | | | 4 |

TABLE B $k_{PHICH}$ for {primary cell TDD UL-DL configuration, a DL-reference UL-DL configuration}

| Primary Cell TDD UL-DL Configuration | DL-reference UL-DL Configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 2 | | | | 4 | | 6 | | | 4 | 6 |
| | 4 | | | | 4 | | 6 | | | 4 | 6 |
| | 5 | | | | 4 | | 6 | | | 4 | 6 |
| 6 | 2 | | | | 4 | 6 | | | | 4 | |
| | 4 | | | | 4 | 6 | | | | 4 | |
| | 5 | | | | 4 | 6 | | | | 4 | |

As shown in Tables A and B, a primary cell TDD UL-DL configuration may be configured to correspond to a configuration index 0 and a DL-reference UL-DL configuration to correspond to one of a configuration index 2, a configuration index 4, or a configuration index 5. In some other examples, as shown in Table A and Table B, the primary cell TDD UL-DL configuration may be configured to correspond to a configuration index 6, and the DL-reference UL-DL configuration to correspond to one of a configuration index 2, a configuration index 4, or a configuration index 5. Each combination of a primary cell TDD UL-DL configuration index and a DL-reference UL-DL configuration index may correspond to a unique transmission timeline. The various transmission timelines may thus be configured over ten-subframe cycles, with each subframe in a cycle having a subframe index ranging from 0 to 9. The UE 115-a may communicate with one or more of the base station 105-a or the base station 105-b in accordance with a transmission timeline based on a combination of a primary cell TDD UL-DL configuration and a DL-reference UL-DL configuration in one or more of Table A or Table B.

In some examples, the UE 115-a may receive an indication, from the base station 105-a, of a combination of a primary cell TDD UL-DL configuration and a DL-reference UL-DL configuration, for example, based on UE capability information provided by the UE 115-a. For example, the UE capability information may include a dynamic power sharing capability of the UE 115-a. In some examples, the base station 105-a may transmit the indication via signaling, which may include a UE specific RRC signaling, or a dynamic control signaling (e.g., via a downlink control information (DCI) signaling). In some examples, the UE 115-a may determine to reference Table A and Table B based on a value of an uplink index field in the grant 210 or a value of a field in an RRC message (e.g., a bit value '10'). Similarly, the UE 115-a may determine to reference Table C and Table D based on a value of an uplink index field in the grant 210 or a value of a field in an RRC message (e.g., a bit value '11').

The UE 115-a may, in some examples, determine a transmission timeline from a combination a primary cell TDD UL-DL configuration and a DL-reference UL-DL configuration (e.g., in the one or more tables (e.g., the Table A, the Table B, the Table C, or the Table D) in accordance with a dynamic power sharing capability or a non-dynamic power sharing capability of the UE 115-a. In some examples, one or more transmission timelines corresponding to the one or more combinations of primary cell TDD UL-DL configurations and DL-reference UL-DL configuration may be available to the UE 115-a for either or both when the UE 115-a is configured with the dynamic power sharing capability or the non-dynamic power sharing capability. For example, if the UE 115-a reports the dynamic power sharing capability, uplink subframes designated as uplink in a given DL-reference UL-DL configuration and these not designated as uplink in a given DL-reference UL-DL configuration may be available. Alternatively, if the UE 115-a does not report the dynamic power sharing capability, uplink subframes designated as uplink in a given DL-reference UL-DL configuration may be available (in other words, the UE not reporting dynamic power sharing capability does not transmit LTE uplink in the uplink subframes not designated as uplink in a given DL-reference UL-DL configuration). In some examples, uplink scheduling timing and HARQ timing for the UE 115-a for a given combination of primary cell TDD UL-DL configuration and DL-reference UL-DL configuration may have a superset or subset relationship between the case where the UE 115-a reports the dynamic power sharing capability and, in the case, that the UE 115-a dose not report the dynamic power sharing capability. More specifically, in the examples, the uplink scheduling timing and HARQ timing for a given combination of primary cell TDD UL-DL configuration and DL-reference UL-DL configuration for a UE reporting dynamic power sharing capability and for a UE not reporting dynamic power sharing capability are given by the same rows in the same tables; the only difference between these two types of UEs is that the UE that does not report the dynamic power sharing capability cannot utilize some of the uplink subframes determined by the rows in the tables. In some examples, an uplink HARQ roundtrip time may have a fixed value, for example, such as 10 ms.

By way of example, the UE 115-a may receive, from the base station 105-a via communication link 205), and while operating in the dual connectivity mode, a grant 210 (e.g., an uplink grant) in a first subframe cycle of ten-subframe cycles. The grant 210 may schedule transmission of data 215 (e.g., uplink data) for the UE 115-a. Following, the UE 115-a may determine a second subframe cycle of the ten-subframe cycles to transmit the data 215 and a third subframe cycle of the ten-subframe cycles to monitor for feedback 220, from the base station 105-a, associated with transmission of the data 215. The UE 115-a may identify (or determine) the second subframe cycle of the ten-subframe cycles for transmitting the data 215 and the third subframe cycle for monitoring for the feedback 220 based on a combinations of a primary cell TDD UL-DL configuration and a DL-reference UL-DL configuration. The UE 115-a may thus communicate with one or more of the base station 105-a and the base station 105-b in accordance with the transmission timeline related to the identified combinations.

Table C and Table D illustrate other example combinations of a primary cell TDD UL-DL configuration and a DL-reference UL-DL configuration. As shown in Table C and Table D, a primary cell TDD UL-DL configuration may be configured to correspond to a configuration index 0 and a DL-reference UL-DL configuration to correspond to one of a configuration index 2, a configuration index 4, or a configuration index 5. In some other examples, as shown in Table C and Table D, the primary cell TDD UL-DL configuration may be configured to correspond to a configuration index 6, and the DL-reference UL-DL configuration to correspond to one of a configuration index 2, a configuration index 4, or a configuration index 5. Each combination of a primary cell TDD UL-DL configuration index and a DL-reference UL-DL configuration index may correspond to a unique transmission timeline. The various transmission timelines may be configured over ten-subframe cycles, with each subframe in a cycle having a subframe index ranging from 0 to 9.

The UE 115-a may thus communicate with one or more of the base station 105-a or the base station 105-b in accordance with a transmission timeline based on a combination of a primary cell TDD UL-DL configuration and a DL-reference UL-DL configuration in one or more Table C or Table D. In some examples, timing of communications (e.g., grants, data) may be variable based on the primary cell TDD UL-DL configuration and the DL-reference UL-DL configuration in Table C. The UE 115-a and the base station 105-a or the base station 105-b may thus communicate (e.g., feedback information) in subframe n+k, where k is given in Table C. For example, the base station 105-a may transmit, and the UE 115-a may receive, an uplink grant on subframe n that schedules uplink data (e.g., schedules PUSCH) for the UE 115-a on subframe n+k. In some examples, timing of feedback (e.g., HARQ acknowledgment) may be variable based on the primary cell TDD UL-DL configuration and the DL-reference UL-DL configuration in Table D. For example, the UE 115-a may receive (or transmit), and the base station 105-a may transmit (or receive), feedback on a subframe n+$k_{PHICH}$ related to the uplink data scheduled on subframe n+k in Table C, where $k_{PHICH}$ is given in Table D.

In some examples, one or more of the base station 105-a, the base station 105-b, or the UE 115-a may use Table C and Table D dependent on a value of an uplink index field in an uplink grant. For example, the UE 115-a may reference Table C and Table D based on a received uplink grant on one or more of subframe 1 or subframe 6. Then the uplink index field may be used in combination with Table C and Table D to indicate whether the UE 115-a may transmit (e.g., via PUSCH) on subframes 7 or 8 or subframes 2 or 3.

TABLE C k for {primary cell TDD UL-DL configuration, a DL-reference UL-DL configuration}

| Primary Cell TDD UL-DL Config- uration | DL- reference UL-DL Config- uration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 2 | | | 4 | 6 | | | | 4 | 6 | |
| | 4 | | | 4 | 6 | | | | 4 | 6 | |
| | 5 | | | 4 | 6 | | | | 4 | 6 | |
| 6 | 2 | | | 6 | | | | | 6 | | 4 |
| | 4 | | | 6 | | | | | 6 | | 4 |
| | 5 | | | 6 | | | | | 6 | | 4 |

TABLE D $k_{PHICH}$ for {primary cell TDD UL-DL configuration, a DL-reference UL-DL configuration}

| Primary Cell TDD UL-DL Config- uration | DL- reference UL-DL Config- uration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 2 | | | | 4 | 7 | 6 | | | 4 | 7 | 6 |
| | 4 | | | | 4 | 7 | 6 | | | 4 | 7 | 6 |
| | 5 | | | | 4 | 7 | 6 | | | 4 | 7 | 6 |
| 6 | 2 | | | | 4 | 6 | | | | 4 | | |
| | 4 | | | | 4 | 6 | | | | 4 | | |
| | 5 | | | | 4 | 6 | | | | 4 | | |

Examples of transmission timelines are described with reference to FIGS. 3 through 14. Although in the following description of FIGS. 3 through 14 the operations are performed by the UE 115-a, complimentary operations may also be performed by the base station 105-a or the base station 105-b.

Figure 3:
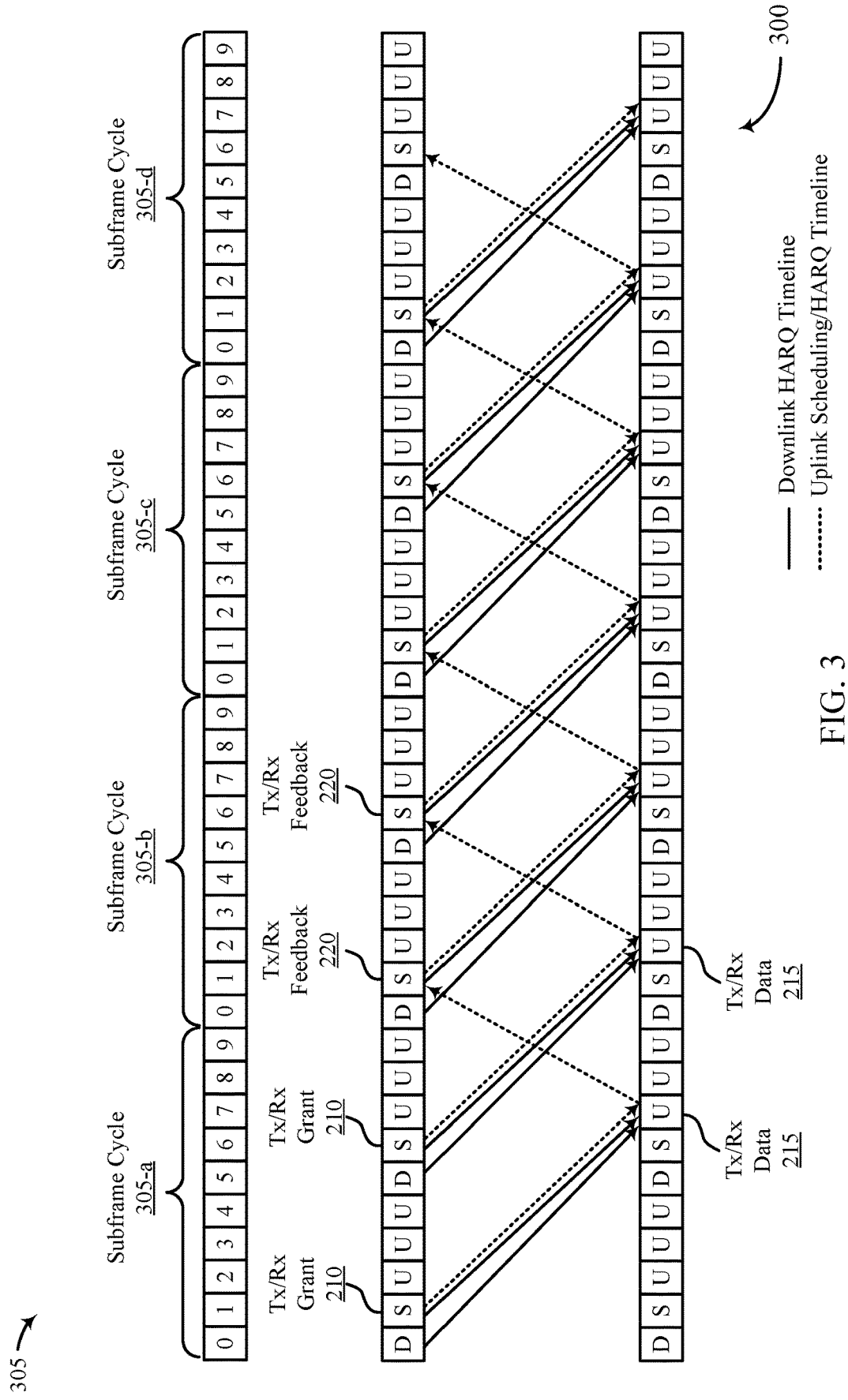
FIGS. 3 through 14 illustrate examples of transmission timelines that support uplink RTT for EN-DC in accordance with aspects of the present disclosure.

FIG. 3 illustrates an example of a transmission timeline 300 that supports uplink RTT for EN-DC in accordance with aspects of the present disclosure. In some examples, the transmission timeline 300 may also implement aspects of the wireless communications systems 100 and 200, as described with reference to FIG. 2. For example, the transmission timeline 300 may be based on a configuration by the base station 105-a, the base station 105-b or the UE 115-a, and implemented by the UE 115-a. In the example of FIG. 3, the transmission timeline 300 may correspond to a primary cell TDD UL-DL configuration relating to a configuration index 0 and a DL-reference UL-DL configuration relating to a configuration index 2, as shown in Tables A through B. The transmission timeline 300 may, in some examples, correspond to a number of subframe cycles 305, with each subframe in a cycle having a subframe index ranging from 0 to 9. In some examples, the transmission timeline 300, in the example of FIG. 3, may be illustrative of a transmission timeline for when the UE 115-a is configured with non-dynamic power sharing capability. Thus, uplink data (e.g., via LTE PUSCH) may be scheduled on one or more of a subframe index 2 or a subframe index 7 of a ten-subframe cycle.

In accordance with the transmission timeline 300, the UE 115-a may identify that the grant 210 is received on subframe index 6 of a first ten-subframe cycle (e.g., a subframe cycle 305-a). For example, the UE 115-a may identify, by referencing Table A, that the grant 210 is received on subframe index 6 of the first ten-subframe cycle (e.g., a subframe cycle 305-a). The base station 105-a may transmit the grant 210 on subframe index 6 of the first ten-subframe cycle (e.g., the subframe cycle 305-a). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 6 of the first ten-subframe cycle (e.g., the subframe cycle 305-a), that the second subframe for transmitting the data 215 is at subframe index 2 of the first ten-subframe cycle (e.g., the subframe cycle 305-a), in accordance with Table A. Thus, the UE 115-a may transmit the data 215 at subframe index 2 of the first ten-subframe cycle (e.g., the subframe cycle 305-a), and the base station 105-a may receive the data 215 at subframe index 2 of the first ten-subframe cycle (e.g., the subframe cycle 305-a).

The UE 115-a may determine, based in part on the data 215 being transmitted on the subframe index 2 of the first ten-subframe cycle (e.g., the subframe cycle 305-a), that the third subframe for monitoring the feedback 220, from the base station 105-a, is at subframe index 6 of a second ten-subframe cycle (e.g., a subframe cycle 305-b) subsequent to the first ten-subframe cycle (e.g., the subframe cycle 305-a), in accordance with Table B. That is, the base station 105-a may transmit the feedback 220 at subframe index 6 of the second ten-subframe cycle (e.g., the subframe cycle 305-b), and the UE 115-a may monitor and receive the feedback 220 at subframe index 6 of the second ten-subframe cycle (e.g., the subframe cycle 305-b). Thus, the grant 210 received on the subframe index 6 may schedule the data 215 (e.g., schedule PUSCH) on the subframe index 2. The transmission timeline pattern may repeat over subframe cycle 305-c and subframe cycle 305-d.

Additionally or alternatively, in accordance with the transmission timeline 300, the UE 115-a may identify that the grant 210 is received on subframe index 1 of a first ten-subframe cycle (e.g., a subframe cycle 305-a), in accordance with Table A. For example, the base station 105-a may transmit the grant 210 on subframe index 1 of the first ten-subframe cycle (e.g., the subframe cycle 305-a). In some examples, the grant 210 may also include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 1 of the first ten-subframe cycle (e.g., the subframe cycle 305-a), that the second subframe for transmitting the data 215 is at subframe index 7 of the first ten-subframe cycle (e.g., the subframe cycle 305-a), in accordance with Table A. Thus, the UE 115-a may transmit the data 215 at subframe index 7 of the first ten-subframe cycle (e.g., the subframe cycle 305-a), and the base station 105-a may receive the data 215 at subframe index 7 of the first ten-subframe cycle (e.g., the subframe cycle 305-a).

The UE 115-a may determine, based in part on the data 215 being transmitted on the subframe index 7 of the first ten-subframe cycle (e.g., the subframe cycle 305-a), that the third subframe for monitoring the feedback 220, from the base station 105-a, is at subframe index 1 of a second ten-subframe cycle (e.g., a subframe cycle 305-b) subsequent to the first ten-subframe cycle (e.g., the subframe cycle 305-a). For example, the UE 115-a may determine, by referencing Table B, that the third subframe for monitoring the feedback 220, from the base station 105-a, is at subframe index 1 of the second ten-subframe cycle (e.g., a subframe cycle 305-b) subsequent to the first ten-subframe cycle (e.g., the subframe cycle 305-a). The base station 105-a may thus transmit the feedback 220 at subframe index 1 of the second ten-subframe cycle (e.g., the subframe cycle 305-b), and the UE 115-a may monitor and receive the feedback 220 at subframe index 1 of the second ten-subframe cycle (e.g., the subframe cycle 305-b). Thus, the grant 210 received on the subframe index 1 may schedule the data 215 (e.g., schedule PUSCH) on the subframe index 7.

Figure 4:
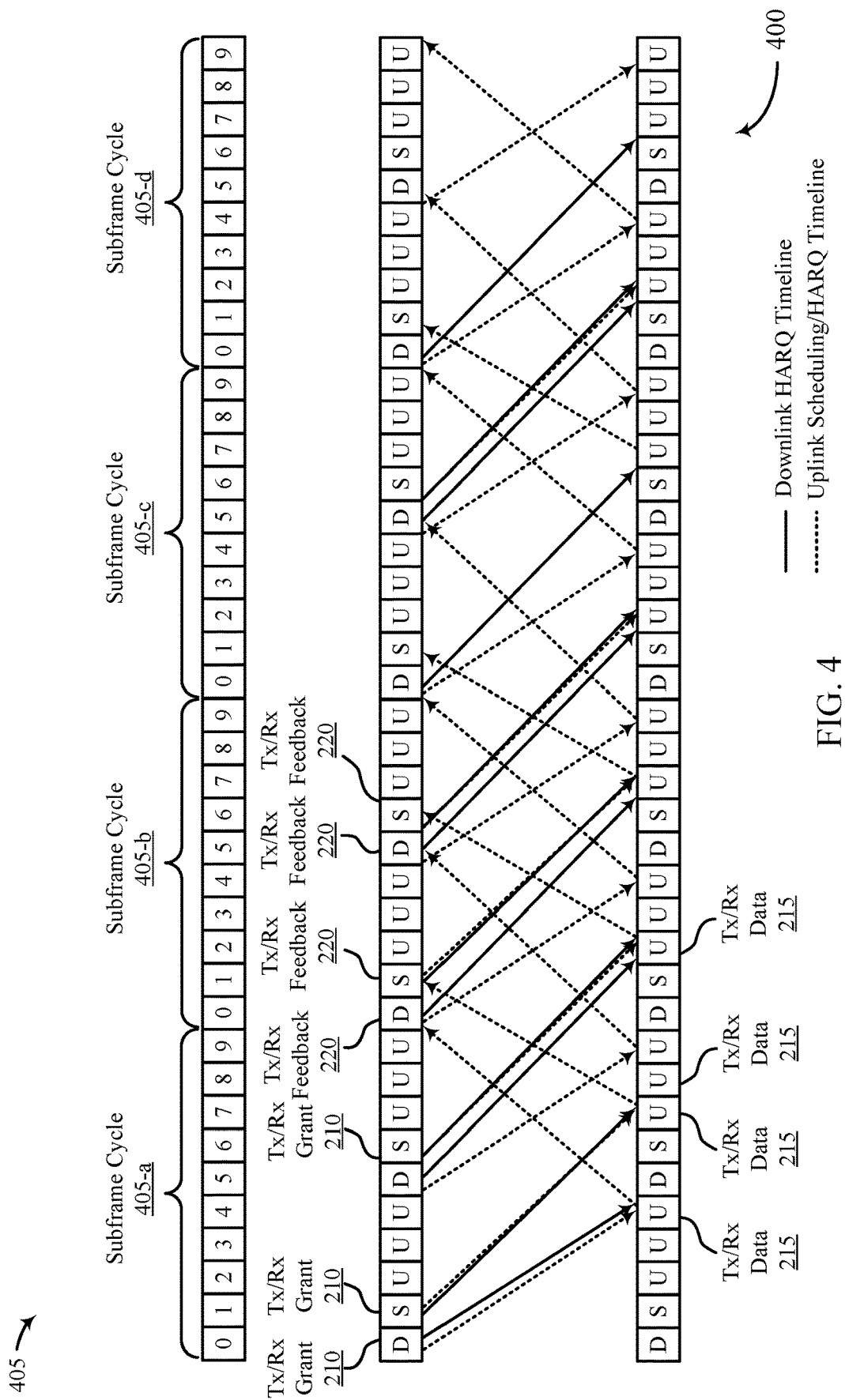

FIG. 4 illustrates an example of a transmission timeline 400 that supports uplink RTT for EN-DC in accordance with aspects of the present disclosure. In some examples, the transmission timeline 400 may also implement aspects of the wireless communications systems 100 and 200, as described with reference to FIG. 2. For example, the transmission timeline 400 may be based on a configuration by the base station 105-a, the base station 105-b or the UE 115-a, and implemented by the UE 115-a. In the example of FIG. 4, the transmission timeline 400 may correspond to a primary cell TDD UL-DL configuration relating to a configuration index 0 and a DL-reference UL-DL configuration relating to a configuration index 2, as shown in the Tables A through D. The transmission timeline 400 may, in some examples, correspond to a number of subframe cycles 405, with each subframe in a cycle having a subframe index ranging from 0 to 9. In some examples, the transmission timeline 400, in the example of FIG. 4, may be illustrative of a transmission timeline for when the UE 115-a is configured with dynamic power sharing capability. As such, uplink data (e.g., via LTE PUSCH) may be scheduled on one or more of a subframe index 2, a subframe index 4, a subframe index 7, or a subframe index 9 of a ten-subframe cycle. In other words, there may be no subframes available for scheduling uplink data (e.g., scheduling PUSCH) on a subframe index 3 and a subframe index 8. Alternatively, the transmission timeline 400 may support scheduling of uplink data on one or more of a subframe index 2, a subframe index 3, a subframe index 4, a subframe index 7, a subframe index 8, or a subframe index 9 of a ten-subframe cycle.

In accordance with the transmission timeline 400, the UE 115-a may identify that the grant 210 is received on subframe index 0 of a first ten-subframe cycle (e.g., a subframe cycle 405-a). For example, the UE 115-a may identify, by referencing Table A, that the grant 210 is received on subframe index 0 of the first ten-subframe cycle (e.g., a subframe cycle 405-a). The base station 105-a may transmit the grant 210 on subframe index 0 of the first ten-subframe cycle (e.g., the subframe cycle 405-a). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field.

The UE 115-a may also determine, based in part on the grant 210 being received on the subframe index 0 of the first ten-subframe cycle (e.g., the subframe cycle 405-a), that the second subframe for transmitting the data 215 is at subframe index 4 of the first ten-subframe cycle (e.g., the subframe cycle 405-a), in accordance with Table A. Thus, the UE 115-a may transmit the data 215 at subframe index 4 of the first ten-subframe cycle (e.g., the subframe cycle 405-a), and the base station 105-a may receive the data 215 at subframe index 4 of the first ten-subframe cycle (e.g., the subframe cycle 405-a). The UE 115-a may determine, based in part on the data 215 being transmitted on the subframe index 4 of the first ten-subframe cycle (e.g., the subframe cycle 405-a), that the third subframe for monitoring the feedback 220, from the base station 105-a, is at subframe index 0 of a second ten-subframe cycle (e.g., a subframe cycle 405-b) subsequent to the first ten-subframe cycle (e.g., the subframe cycle 405-a), in accordance with Table B. That is, the base station 105-a may transmit the feedback 220 at subframe index 0 of the second ten-subframe cycle (e.g., the subframe cycle 405-b), and the UE 115-a may monitor and receive the feedback 220 at subframe index 0 of the second ten-subframe cycle (e.g., the subframe cycle 405-b). Thus, the grant 210 received on the subframe index 0 may schedule the data 215 (e.g., schedule PUSCH) on the subframe index 4. The transmission timeline pattern may repeat over subframe cycle 405-c and subframe cycle 405-d.

In some examples, additionally or alternatively, in accordance with the transmission timeline 400 the UE 115-a may identify that the grant 210 is received on subframe index 1 of a first ten-subframe cycle (e.g., a subframe cycle 405-a), in accordance with Table A. For example, the base station 105-a may transmit the grant 210 on subframe index 1 of the first ten-subframe cycle (e.g., the subframe cycle 405-a). In some examples, the grant 210 may also include an uplink index field, which may be fixed to one more static bit values (e.g., '10'). In some examples, the value of the uplink index field in the grant 210 may be assumed (for example, as '10'), and the uplink index field may be used as an uplink downlink assignment index field.

The UE 115-a may also determine, based in part on the grant 210 being received on the subframe index 1 of the first ten-subframe cycle (e.g., the subframe cycle 405-a), that the second subframe for transmitting the data 215 is at subframe index 7 of the first ten-subframe cycle (e.g., the subframe cycle 405-a), in accordance with Table A. Thus, the UE 115-a may transmit the data 215 at subframe index 7 of the first ten-subframe cycle (e.g., the subframe cycle 405-a), and the base station 105-a may receive the data 215 at subframe index 7 of the first ten-subframe cycle (e.g., the subframe cycle 405-a). The UE 115-a may determine, based in part on the data 215 being transmitted on the subframe index 7 of the first ten-subframe cycle (e.g., the subframe cycle 405-a), that the third subframe for monitoring the feedback 220, from the base station 105-a, is at subframe index 1 of a second ten-subframe cycle (e.g., a subframe cycle 405-b) subsequent to the first ten-subframe cycle (e.g., the subframe cycle 405-a), in accordance with Table B. That is, the base station 105-a may transmit the feedback 220 at subframe index 1 of the second ten-subframe cycle (e.g., the subframe cycle 405-b), and the UE 115-a may monitor and receive the feedback 220 at subframe index 1 of the second ten-subframe cycle (e.g., the subframe cycle 405-b). Thus, the grant 210 received on the subframe index 1 may schedule the data 215 (e.g., PUSCH) on the subframe index 7.

In some other examples, in accordance with the transmission timeline 400, the UE 115-a may identify that the grant 210 is received on subframe index 1 of a first ten-subframe cycle (e.g., a subframe cycle 405-a), in accordance with Table A or Table C. For example, the base station 105-a may transmit the grant 210 on subframe index 1 of the first ten-subframe cycle (e.g., the subframe cycle 405-a). In some examples, the grant 210 may also include an uplink index field, which may be fixed to one more static bit values (e.g., '11'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 1 of the first ten-subframe cycle (e.g., the subframe cycle 405-a) and on a value of an uplink index field in the uplink grant, that the second subframe for transmitting the data 215 is at subframe index 7 or subframe index 8 of the first ten-subframe cycle (e.g., the subframe cycle 405-a), in accordance with Table A or Table C. Thus, the UE 115-a may transmit the data 215 at subframe index 7 or subframe index 8 of the first ten-subframe cycle (e.g., the subframe cycle 405-a), and the base station 105-a may receive the data 215 at subframe index 7 of subframe index 8 of the first ten-subframe cycle (e.g., the subframe cycle 405-a).

The UE 115-a may determine, based in part on the data 215 being transmitted on the subframe index 7 or the subframe index 8 of the first ten-subframe cycle (e.g., the subframe cycle 405-a), that the third subframe for monitoring the feedback 220, from the base station 105-a, is at subframe index 1 or subframe 5 of a second ten-subframe cycle (e.g., a subframe cycle 405-b) subsequent to the first ten-subframe cycle (e.g., the subframe cycle 405-a), in accordance with Table B or Table D. That is, the base station 105-a may transmit the feedback 220 at subframe index 1 or subframe index 5 of the second ten-subframe cycle (e.g., the subframe cycle 405-b), and the UE 115-a may monitor and receive the feedback 220 at subframe index 1 or subframe index 5 of the second ten-subframe cycle (e.g., the subframe cycle 405-b). Thus, the grant 210 received on the subframe index 1 may schedule the data 215 (e.g., schedule PUSCH) on the subframe index 7 or the subframe index 8.

In some examples, additionally or alternatively, in accordance with the transmission timeline 400, the UE 115-a may identify that the grant 210 is received on subframe index 6 of a first ten-subframe cycle (e.g., a subframe cycle 405-a), in accordance with Table A. For example, the base station 105-a may transmit the grant 210 on subframe index 6 of the first ten-subframe cycle (e.g., the subframe cycle 405-a). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 6 of the first ten-subframe cycle (e.g., the subframe cycle 405-a), that the second subframe for transmitting the data 215 is at subframe index 2 of a second ten-subframe cycle (e.g., a subframe cycle 405-b) subsequent to the first ten-subframe cycle (e.g., the subframe cycle 405-a), in accordance with Table A. Thus, the UE 115-a may transmit the data 215 at subframe index 2 of the second ten-subframe cycle (e.g., the subframe cycle 405-b), and the base station 105-*a* may receive the data 215 at subframe index 2 of the second ten-subframe cycle (e.g., the subframe cycle 405-*b*).

The UE 115-*a* may determine, based in part on the data 215 being transmitted on the subframe index 2 of the second ten-subframe cycle (e.g., the subframe cycle 405-*b*), that the third subframe for monitoring the feedback 220, from the base station 105-*a*, is at subframe index 6 of the second ten-subframe cycle (e.g., a subframe cycle 405-*b*) subsequent to the first ten-subframe cycle (e.g., the subframe cycle 405-*a*), in accordance with Table B. In other words, the base station 105-*a* may transmit the feedback 220 at subframe index 6 of the second ten-subframe cycle (e.g., the subframe cycle 405-*b*), and the UE 115-*a* may monitor and receive the feedback 220 at subframe index 6 of the second ten-subframe cycle (e.g., the subframe cycle 405-*b*). Thus, the grant 210 received on the subframe index 6 may schedule the data 215 (e.g., PUSCH) on the subframe index 2. The transmission timeline pattern may repeat over subframe cycle 405-*c* and subframe cycle 405-*d*.

In some other examples, additionally or alternatively, in accordance with the transmission timeline 400, the UE 115-*a* may identify that the grant 210 is received on subframe index 6 of a first ten-subframe cycle (e.g., a subframe cycle 405-*a*), in accordance with Table A or Table C. For example, the base station 105-*a* may transmit the grant 210 on subframe index 6 of the first ten-subframe cycle (e.g., the subframe cycle 405-*a*). In some examples, the grant 210 may include an uplink index field, which may be fixed to one more static bit values (e.g., '11'). In some examples, the value of the uplink index field in the grant 210 may be assumed (for example, as '10'), and the uplink index field may be used as an uplink downlink assignment index field. The UE 115-*a* may also determine, based in part on the grant 210 being received on the subframe index 6 of the first ten-subframe cycle (e.g., the subframe cycle 405-*a*) and on a value of an uplink index field in the uplink grant, that the second subframe for transmitting the data 215 is at subframe index 2 or subframe index 3 of a second ten-subframe cycle (e.g., a subframe cycle 405-*b*) subsequent to the first ten-subframe cycle (e.g., the subframe cycle 405-*a*), in accordance with Table A or Table C. For example, the UE 115-*a* may transmit the data 215 at subframe index 2 or subframe index 3 of the second ten-subframe cycle (e.g., the subframe cycle 405-*b*), and the base station 105-*a* may receive the data 215 at subframe index 2 or subframe index 3 of the second ten-subframe cycle (e.g., the subframe cycle 405-*b*).

The UE 115-*a* may determine, based in part on the data 215 being transmitted on the subframe index 2 or the subframe index 3 of the second ten-subframe cycle (e.g., the subframe cycle 405-*b*), that the third subframe for monitoring the feedback 220, from the base station 105-*a*, is at subframe index 2 or subframe index 3 of the second ten-subframe cycle (e.g., a subframe cycle 405-*b*) subsequent to the first ten-subframe cycle (e.g., the subframe cycle 405-*a*), in accordance with Table B or Table D. In other words, the base station 105-*a* may transmit the feedback 220 at subframe index 2 or subframe index 3 of the second ten-subframe cycle (e.g., a subframe cycle 405-*b*), and the UE 115-*a* may monitor and receive the feedback 220 at subframe index 2 or subframe index 3 of the second ten-subframe cycle (e.g., a subframe cycle 405-*b*). Thus, the grant 210 received on the subframe index 6 may schedule the data 215 (e.g., PUSCH) on the subframe index 2 or the subframe index 3. The transmission timeline pattern may repeat over subframe cycle 405-*c* and subframe cycle 405-*d*.

In accordance with the transmission timeline 400, additionally or alternatively, the UE 115-*a* may, in some examples, identify that the grant 210 is received on subframe index 5 of a first ten-subframe cycle (e.g., a subframe cycle 405-*a*), in accordance with Table A or Table C. For example, the base station 105-*a* may transmit the grant 210 on subframe index 5 of the first ten-subframe cycle (e.g., the subframe cycle 405-*a*). In some examples, the grant 210 may include an uplink index field, which may be fixed to one more static bit values (e.g., '10' or '11'). In some examples, the value of the uplink index field in the grant 210 may be assumed (for example, as '10'), and the uplink index field may be used as an uplink downlink assignment index field. The UE 115-*a* may also determine, based in part on the grant 210 being received on the subframe index 5 of the first ten-subframe cycle (e.g., the subframe cycle 405-*a*), that the second subframe for transmitting the data 215 is at subframe index 9 of the first ten-subframe cycle (e.g., the subframe cycle 405-*a*), in accordance with Table A or Table C. For example, the UE 115-*a* may transmit the data 215 at subframe index 9 of the first ten-subframe cycle (e.g., the subframe cycle 405-*a*), and the base station 105-*a* may receive the data 215 at subframe index 9 of the first ten-subframe cycle (e.g., the subframe cycle 405-*a*).

The UE 115-*a* may determine, based in part on the data 215 being transmitted on the subframe index 9 of the first ten-subframe cycle (e.g., the subframe cycle 405-*a*), that the third subframe for monitoring the feedback 220, from the base station 105-*a*, is at subframe index 5 of a second ten-subframe cycle (e.g., a subframe cycle 405-*b*) subsequent to the first ten-subframe cycle (e.g., the subframe cycle 405-*a*), in accordance with Table B or Table D. For example, the base station 105-*a* may transmit the feedback 220 at subframe index 5 of the second ten-subframe cycle (e.g., the subframe cycle 405-*b*), and the UE 115-*a* may monitor and receive the feedback 220 at subframe index 5 of the second ten-subframe cycle (e.g., the subframe cycle 405-*b*). Thus, the grant 210 received on the subframe index 5 may schedule the data 215 (e.g., PUSCH) on the subframe index 9. The transmission timeline pattern may repeat over subframe cycle 405-*c* and subframe cycle 405-*d*.

Figure 5:
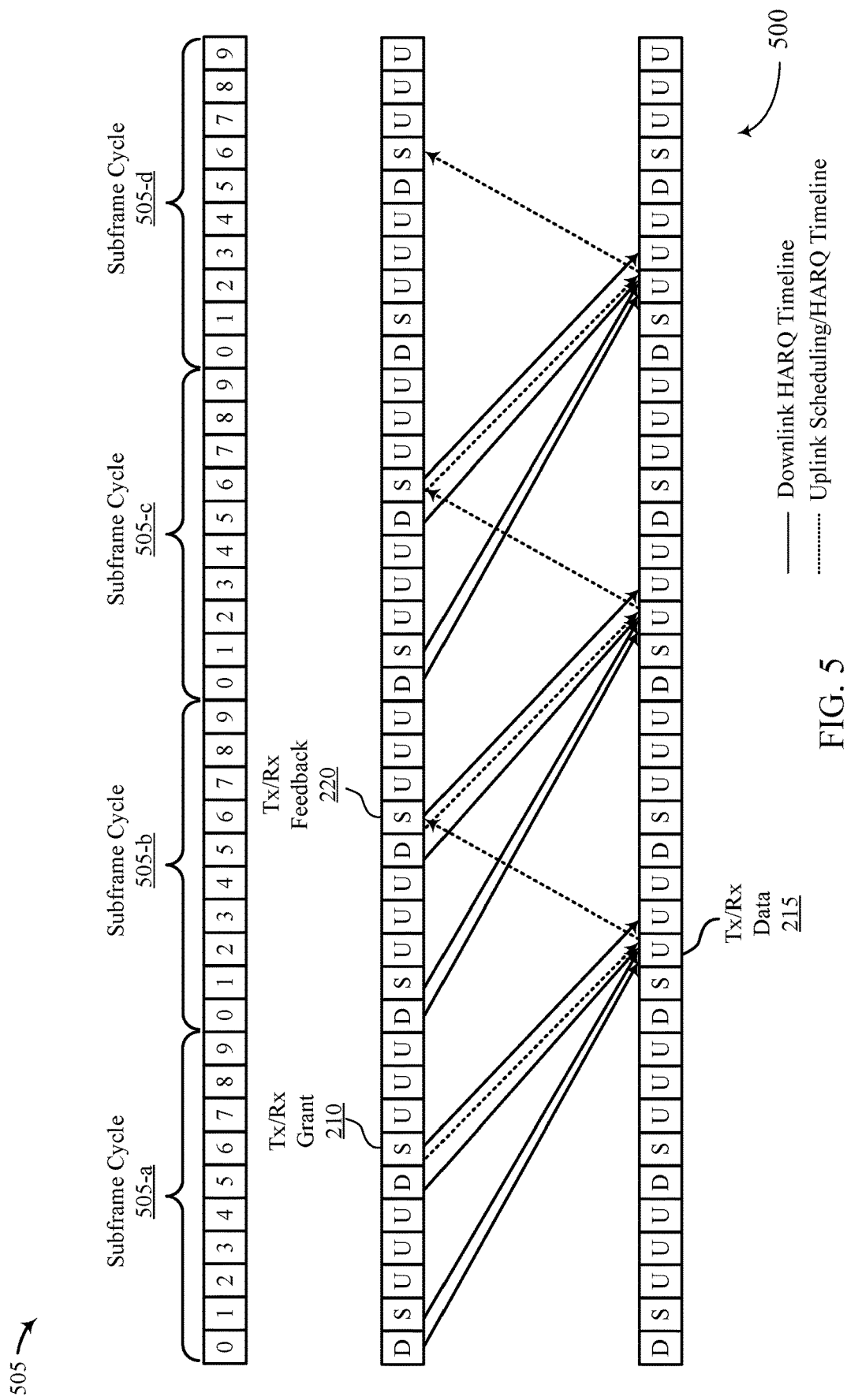

FIG. 5 illustrates an example of a transmission timeline 500 that supports uplink RTT for EN-DC in accordance with aspects of the present disclosure. In some examples, the transmission timeline 500 may also implement aspects of the wireless communications systems 100 and 200, as described with reference to FIG. 2. For example, the transmission timeline 500 may be based on a configuration by the base station 105-*a*, the base station 105-*b* or the UE 115-*a*, and implemented by the UE 115-*a*. In the example of FIG. 5, the transmission timeline 500 may correspond to a primary cell TDD UL-DL configuration relating to a configuration index 0 and a DL-reference UL-DL configuration relating to a configuration index 4, as shown in Tables A through D. The transmission timeline 500 may, in some examples, correspond to a number of subframe cycles 505, with each subframe in a cycle having a subframe index ranging from 0 to 9. In some examples, the transmission timeline 500, in the example of FIG. 5, may be illustrative of a transmission timeline for when the UE 115-*a* is configured with non-dynamic power sharing capability. As such, uplink data (e.g., scheduled on LTE PUSCH) may be scheduled exclusively on a subframe index 2. In other words, there may be no available subframe index to transmit the grant 210 (e.g., an uplink grant) scheduling the data 215 (e.g., schedule PUSCH) on a subframe index 3.

In accordance with the transmission timeline 500, the UE 115-a may identify that the grant 210 is received on subframe index 6 of a first ten-subframe cycle (e.g., a subframe cycle 505-a), in accordance with Table A or Table C. For example, the base station 105-a may transmit the grant 210 on subframe index 6 of the first ten-subframe cycle (e.g., the subframe cycle 505-a). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 6 of the first ten-subframe cycle (e.g., the subframe cycle 505-a), that the second subframe for transmitting the data 215 is at subframe index 2 of a second ten-subframe cycle (e.g., a subframe cycle 505-b) subsequent to the first ten-subframe cycle (e.g., the subframe cycle 505-a), in accordance with Table A or Table C. For example, the UE 115-a may transmit the data 215 at subframe index 2 of the second ten-subframe cycle (e.g., the subframe cycle 505-b), and the base station 105-a may receive the data 215 at subframe index 5 of the second ten-subframe cycle (e.g., the subframe cycle 505-b).

The UE 115-a may determine, based in part on the data 215 being transmitted on the subframe index 2 of the second ten-subframe cycle (e.g., the subframe cycle 505-b), that the third subframe for monitoring the feedback 220, from the base station 105-a, is at subframe index 6 of the second ten-subframe cycle (e.g., a subframe cycle 505-b) subsequent to the first ten-subframe cycle (e.g., the subframe cycle 505-a), in accordance with Table B or Table D. For example, the base station 105-a may transmit the feedback 220 at subframe index 6 of the second ten-subframe cycle (e.g., the subframe cycle 505-b), and the UE 115-a may monitor and receive the feedback 220 at subframe index 6 of the second ten-subframe cycle (e.g., the subframe cycle 505-b). Thus, the grant 210 received on the subframe index 6 may schedule the data 215 (e.g., schedule PUSCH) on the subframe index 2. The transmission timeline pattern may repeat over subframe cycle 505-c and subframe cycle 505-d.

Figure 6:
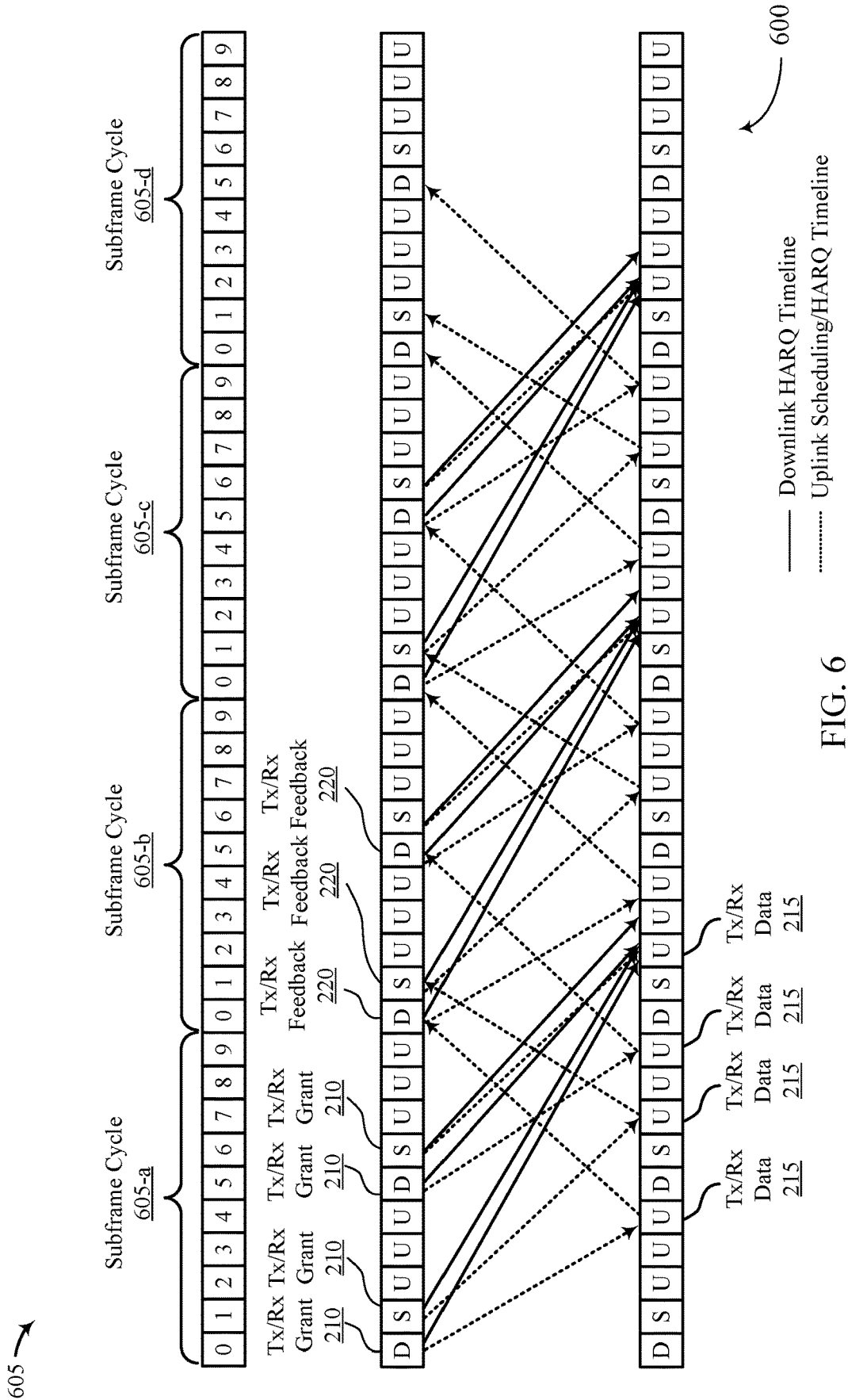

FIG. 6 illustrates an example of a transmission timeline 600 that supports uplink RTT for EN-DC in accordance with aspects of the present disclosure. In some examples, the transmission timeline 600 may also implement aspects of the wireless communications systems 100 and 200, as described with reference to FIG. 2. For example, the transmission timeline 600 may be based on a configuration by the base station 105-a, the base station 105-b or the UE 115-a, and implemented by the UE 115-a. In the example of FIG. 6, the transmission timeline 600 may correspond to a primary cell TDD UL-DL configuration relating to a configuration index 0 and a DL-reference UL-DL configuration relating to a configuration index 4, as shown in Tables A through D. The transmission timeline 600 may, in some examples, correspond to a number of subframe cycles 605, with each subframe in a cycle having a subframe index ranging from 0 to 9. In some examples, the transmission timeline 600, in the example of FIG. 6, may be illustrative of a transmission timeline for when the UE 115-a is configured with dynamic power sharing capability. As such, uplink data (e.g., LTE PUSCH) may be scheduled exclusively on one or more of a subframe index 2, a subframe index 4, a subframe index 7, or a subframe index 9 of a ten-subframe cycle. In other words, there may be no subframes available to transmit the grant 210 for scheduling PUSCH (e.g., uplink data) on a subframe index 3 of the ten-subframe cycle. Alternatively, the transmission timeline 400 may support scheduling of uplink data on one or more of a subframe index 2, a subframe index 3, or a subframe index 7 of a ten-subframe cycle.

In some examples, in accordance with the transmission timeline 600, the UE 115-a may identify that the grant 210 is received on subframe index 6 of a first ten-subframe cycle (e.g., a subframe cycle 605-a), in accordance with Table A or Table C. For example, the base station 105-a may transmit the grant 210 on subframe index 6 of the first ten-subframe cycle (e.g., the subframe cycle 605-a). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 6 of the first ten-subframe cycle (e.g., the subframe cycle 605-a), that the second subframe for transmitting the data 215 is at subframe index 2 of a second ten-subframe cycle (e.g., a subframe cycle 605-b) subsequent to the first ten-subframe cycle (e.g., the subframe cycle 605-a), in accordance with Table A or Table C. The UE 115-a may transmit the data 215 at subframe index 2 of the second ten-subframe cycle (e.g., the subframe cycle 605-b), and the base station 105-a may receive the data 215 at subframe index 2 of the second ten-subframe cycle (e.g., the subframe cycle 605-b).

The UE 115-a may determine, based in part on the data 215 being transmitted on the subframe index 2 of the second ten-subframe cycle (e.g., the subframe cycle 605-b), that the third subframe for monitoring the feedback 220, from the base station 105-a, is at subframe index 6 of the second ten-subframe cycle (e.g., a subframe cycle 605-b) subsequent to the first ten-subframe cycle (e.g., the subframe cycle 605-a), in accordance with Table B or Table D. That is, the base station 105-a may transmit the feedback 220 at subframe index 6 of the second ten-subframe cycle (e.g., the subframe cycle 605-b), and the UE 115-a may monitor and receive the feedback 220 at subframe index 6 of the second ten-subframe cycle (e.g., the subframe cycle 605-b). Thus, the grant 210 received on the subframe index 6 may schedule the data 215 (e.g., via PUSCH) on the subframe index 2. The transmission timeline pattern may repeat over subframe cycle 605-c and 605-d.

In some other examples, in accordance with the transmission timeline 600, additionally or alternatively, the UE 115-a may identify that the grant 210 is received on subframe index 0 of a first ten-subframe cycle (e.g., a subframe cycle 605-a), in accordance with Table A. For example, the base station 105-a may transmit the grant 210 on subframe index 0 of the first ten-subframe cycle (e.g., the subframe cycle 605-a). The UE 115-a may also determine, based in part on the grant 210 being received on the subframe index 0 of the first ten-subframe cycle (e.g., the subframe cycle 605-a), that the second subframe for transmitting the data 215 is at subframe index 4 of the first ten-subframe cycle (e.g., the subframe cycle 605-a). The UE 115-a may transmit the data 215 at subframe index 4 of the first ten-subframe cycle (e.g., the subframe cycle 605-a), and the base station 105-a may receive the data 215 at subframe index 4 of the first ten-subframe cycle (e.g., the subframe cycle 605-a).

The UE 115-a may determine, based in part on the data 215 being transmitted on the subframe index 4 of the first ten-subframe cycle (e.g., the subframe cycle 605-a), that the third subframe for monitoring the feedback 220, from the base station 105-a, is at subframe index 0 of a second ten-subframe cycle (e.g., a subframe cycle 605-*b*) subsequent to the first ten-subframe cycle (e.g., the subframe cycle 605-*a*), and in accordance with Table B. For example, the base station 105-*a* may transmit the feedback 220 at subframe index 0 of the second ten-subframe cycle (e.g., the subframe cycle 605-*b*), and the UE 115-*a* may monitor and receive the feedback 220 at subframe index 0 of the second ten-subframe cycle (e.g., the subframe cycle 605-*b*). Thus, the grant 210 received on the subframe index 0 may schedule the data 215 (e.g., via PUSCH) on the subframe index 4. The transmission timeline pattern may repeat over subframe cycle 605-*c* and 605-*d*.

In other examples, additionally or alternatively, in accordance with the transmission timeline 600, the UE 115-*a* may identify that the grant 210 is received on subframe index 1 of a first ten-subframe cycle (e.g., a subframe cycle 605-*a*), in accordance with Table A or Table C. For example, the base station 105-*a* may transmit the grant 210 on subframe index 1 of the first ten-subframe cycle (e.g., the subframe cycle 605-*a*). The UE 115-*a* may also determine, based in part on the grant 210 being received on the subframe index 1 of the first ten-subframe cycle (e.g., the subframe cycle 605-*a*), that the second subframe for transmitting the data 215 is at subframe index 7 of the first ten-subframe cycle (e.g., the subframe cycle 605-*a*), in accordance with Table A or Table C. For example, the UE 115-*a* may transmit the data 215 at subframe index 7 of the first ten-subframe cycle (e.g., the subframe cycle 605-*a*), and the base station 105-*a* may receive the data 215 at subframe index 7 of the first ten-subframe cycle (e.g., the subframe cycle 605-*a*). The UE 115-*a* may determine, based in part on the data 215 being transmitted on the subframe index 7 of the first ten-subframe cycle (e.g., the subframe cycle 605-*a*), that the third subframe for monitoring the feedback 220, from the base station 105-*a*, is at subframe index 1 of a second ten-subframe cycle (e.g., a subframe cycle 605-*b*) subsequent to the first ten-subframe cycle (e.g., the subframe cycle 605-*a*), in accordance with Table B or Table D. Thus, the grant 210 received on the subframe index 1 may schedule the data 215 (e.g., via PUSCH) on the subframe index 7. The transmission timeline pattern may repeat over subframe cycle 605-*c* and 605-*d*.

In some other examples, additionally or alternatively, in accordance with the transmission timeline 600, the UE 115-*a* may identify that the grant 210 is received on subframe index 5 of a first ten-subframe cycle (e.g., a subframe cycle 605-*a*), in accordance with Table A or Table C. For example, the base station 105-*a* may transmit the grant 210 on subframe index 5 of the first ten-subframe cycle (e.g., the subframe cycle 605-*a*). The UE 115-*a* may also determine, based in part on the grant 210 being received on the subframe index 5 of the first ten-subframe cycle (e.g., the subframe cycle 605-*a*), that the second subframe for transmitting the data 215 is at subframe index 9 of the first ten-subframe cycle (e.g., the subframe cycle 605-*a*), in accordance with Table A or Table C. For example, the UE 115-*a* may transmit the data 215 at subframe index 9 of the first ten-subframe cycle (e.g., the subframe cycle 605-*a*), and the base station 105-*a* may receive the data 215 at subframe index 9 of the first ten-subframe cycle (e.g., the subframe cycle 605-*a*). The UE 115-*a* may determine, based in part on the data 215 being transmitted on the subframe index 9 of the first ten-subframe cycle (e.g., the subframe cycle 605-*a*), that the third subframe for monitoring the feedback 220, from the base station 105-*a*, is at subframe index 5 of a second ten-subframe cycle (e.g., a subframe cycle 605-*b*) subsequent to the first ten-subframe cycle (e.g., the subframe cycle 605-*a*), in accordance with Table B or Table D. Thus, the grant 210 received on the subframe index 5 may schedule the data 215 (e.g., via PUSCH) on the subframe index 9. The transmission timeline pattern may repeat over subframe cycle 605-*c* and 605-*d*.

Figure 7:
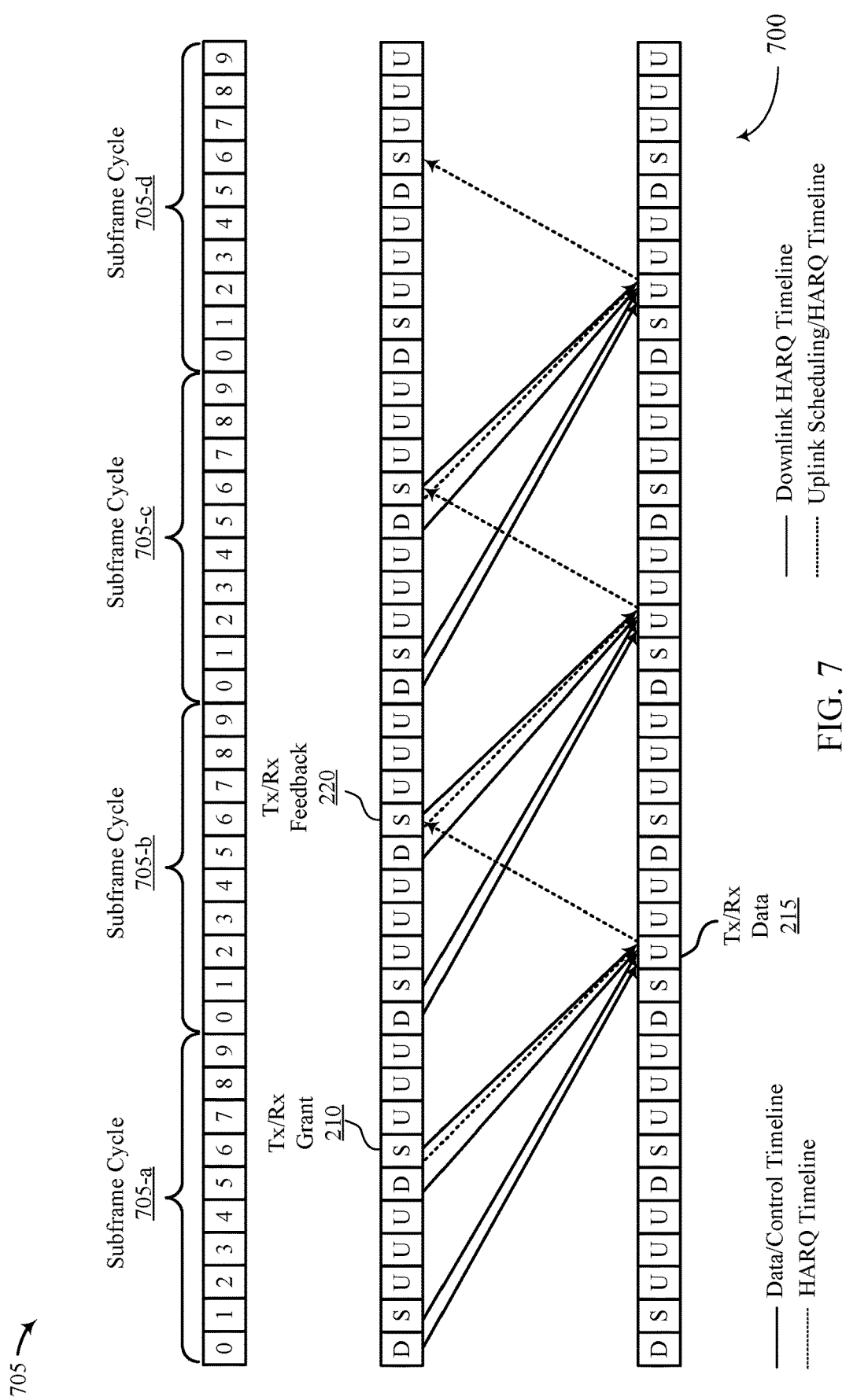

FIG. 7 illustrates an example of a transmission timeline 700 that supports uplink RTT for EN-DC in accordance with aspects of the present disclosure. In some examples, the transmission timeline 700 may also implement aspects of the wireless communications systems 100 and 200, as described with reference to FIG. 2. For example, the transmission timeline 700 may be based on a configuration by the base station 105-*a*, the base station 105-*b* or the UE 115-*a*, and implemented by the UE 115-*a*. In the example of FIG. 7, the transmission timeline 700 may correspond to a primary cell TDD UL-DL configuration relating to a configuration index 0 and a DL-reference UL-DL configuration relating to a configuration index 5, as shown in Tables A through D. The transmission timeline 700 may, in some examples, correspond to a number of subframe cycles 705, with each subframe in a cycle having a subframe index ranging from 0 to 9. In some examples, the transmission timeline 700, in the example of FIG. 7, may be illustrative of a transmission timeline for when the UE 115-*a* is configured with non-dynamic power sharing capability. As such, uplink data (e.g., LTE PUSCH) may be scheduled exclusively on a subframe index 2 of a ten-subframe cycle.

In some examples, in accordance with the transmission timeline 700, the UE 115-*a* may identify that the grant 210 is received on subframe index 6 of a first ten-subframe cycle (e.g., a subframe cycle 705-*a*), by referencing Table A or Table C. For example, the base station 105-*a* may transmit the grant 210 on subframe index 6 of the first ten-subframe cycle (e.g., the subframe cycle 705-*a*). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-*a* may also determine, based in part on the grant 210 being received on the subframe index 6 of the first ten-subframe cycle (e.g., the subframe cycle 705-*a*), that the second subframe for transmitting the data 215 is at subframe index 2 of a second ten-subframe cycle (e.g., a subframe cycle 705-*b*) subsequent to the first ten-subframe cycle (e.g., the subframe cycle 705-*a*), by referencing Table A or Table C. For example, the UE 115-*a* may transmit the data 215 at subframe index 2 of the second ten-subframe cycle (e.g., the subframe cycle 705-*b*), and the base station 105-*a* may receive the data 215 at subframe index 2 of the second ten-subframe cycle (e.g., the subframe cycle 705-*b*). The UE 115-*a* may determine, based in part on the data 215 being transmitted on the subframe index 2 of the second ten-subframe cycle (e.g., the subframe cycle 705-*b*), that the third subframe for monitoring the feedback 220, from the base station 105-*a*, is at subframe index 6 of the second ten-subframe cycle (e.g., a subframe cycle 705-*b*) subsequent to the first ten-subframe cycle (e.g., the subframe cycle 705-*a*), by referencing Table B or Table D. Thus, the grant 210 received on the subframe index 6 may schedule the data 215 (e.g., via PUSCH) on the subframe index 2. The transmission timeline pattern may repeat over subframe cycle 705-*c* and 705-*d*.

Figure 8:
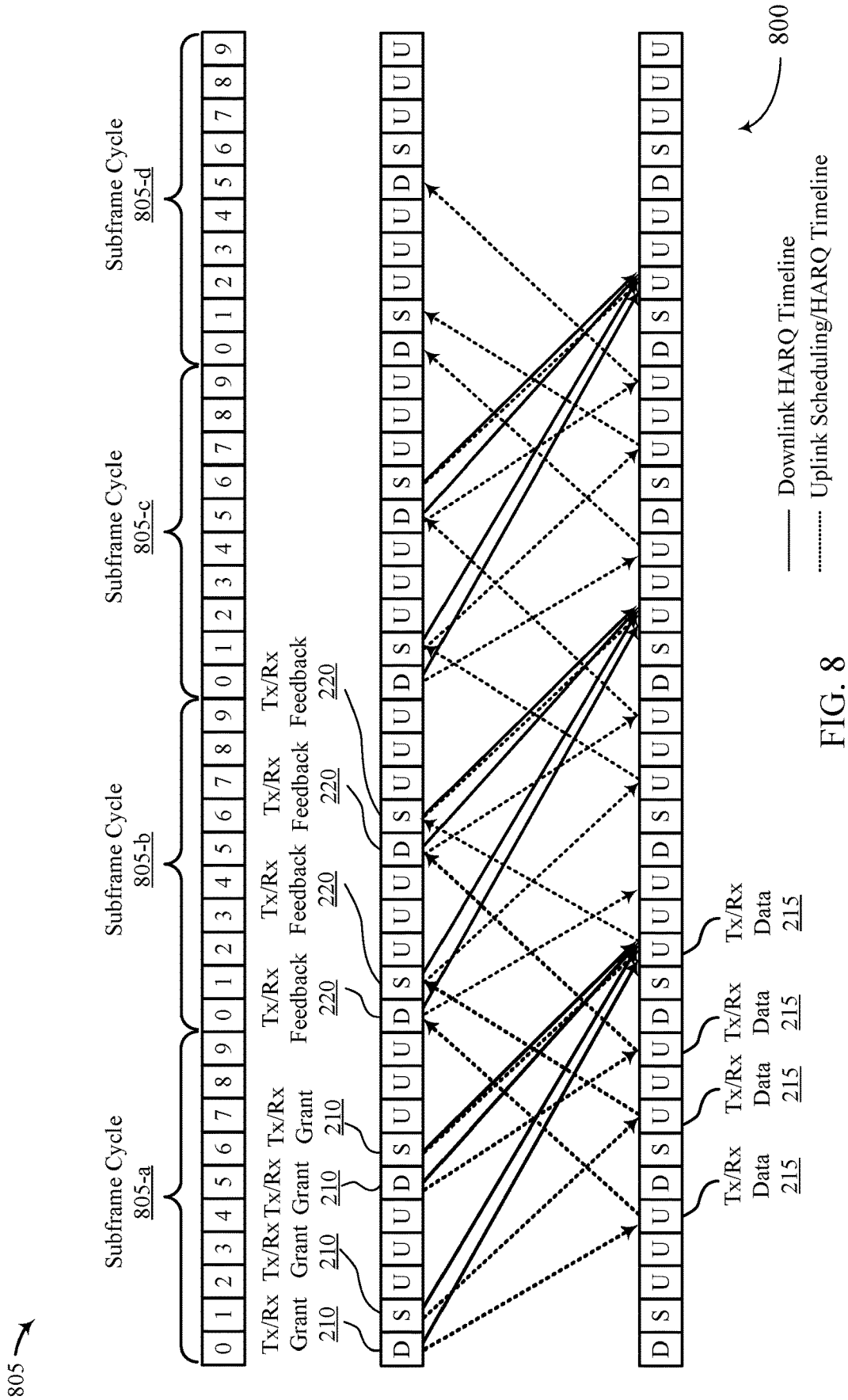

FIG. 8 illustrates an example of a transmission timeline 800 that supports uplink RTT for EN-DC in accordance with aspects of the present disclosure. In some examples, the transmission timeline 800 may also implement aspects of the wireless communications systems 100 and 200, as described with reference to FIG. 2. For example, the transmission timeline 800 may be based on a configuration by the base station 105-a, the base station 105-b or the UE 115-a, and implemented by the UE 115-a. In the example of FIG. 8, the transmission timeline 800 may correspond to a primary cell TDD UL-DL configuration relating to a configuration index 0 and a DL-reference UL-DL configuration relating to a configuration index 5, as shown in Tables A through D. The transmission timeline 800 may, in some examples, correspond to a number of subframe cycles 805, with each subframe in a cycle having a subframe index ranging from 0 to 9. In some examples, the transmission timeline 800, in the example of FIG. 8, may be illustrative of a transmission timeline for when the UE 115-a is configured with dynamic power sharing capability. As such, uplink data (e.g., LTE PUSCH) may be scheduled exclusively on one or more of a subframe index 2, a subframe index 4, a subframe index 7, or a subframe index 9 of a ten-subframe cycle. In other words, there may be no subframes available to transmit the grant 210 for scheduling PUSCH (e.g., uplink data) on a subframe index 3 and a subframe index 8 of the ten-subframe cycle.

In some examples, in accordance with the transmission timeline 800, the UE 115-a may identify that the grant 210 is received on subframe index 6 of a first ten-subframe cycle (e.g., a subframe cycle 805-a), by referencing Table A or Table C. For example, the base station 105-a may transmit the grant 210 on subframe index 6 of the first ten-subframe cycle (e.g., the subframe cycle 805-a). In some examples, the grant 210 may include an uplink index field, which may be fixed to one more static bit values (e.g., '10'). In some examples, the value of the uplink index field in the grant 210 may be assumed (for example, as '10'), and the uplink index field may be used as an uplink downlink assignment index field. The UE 115-a may also determine, based in part on the grant 210 being received on the subframe index 6 of the first ten-subframe cycle (e.g., the subframe cycle 805-a), that the second subframe for transmitting the data 215 is at subframe index 2 of a second ten-subframe cycle (e.g., a subframe cycle 805-b) subsequent to the first ten-subframe cycle (e.g., the subframe cycle 805-a), by referencing Table A or Table C. The UE 115-a may transmit the data 215 at subframe index 2 of the second ten-subframe cycle (e.g., the subframe cycle 805-b), and the base station 105-a may receive the data 215 at subframe index 2 of the second ten-subframe cycle (e.g., the subframe cycle 805-b). The UE 115-a may determine, based in part on the data 215 being transmitted on the subframe index 2 of the second ten-subframe cycle (e.g., the subframe cycle 805-b), that the third subframe for monitoring the feedback 220, from the base station 105-a, is at subframe index 6 of the second ten-subframe cycle (e.g., a subframe cycle 805-b) subsequent to the first ten-subframe cycle (e.g., the subframe cycle 805-a), by referencing Table B or Table D. The base station 105-a may transmit the feedback 220 at subframe index 6 of the second ten-subframe cycle (e.g., the subframe cycle 805-b), and the UE 115-a may monitor and receive the feedback 220 at subframe index 6 of the second ten-subframe cycle (e.g., the subframe cycle 805-b). Thus, the grant 210 received on the subframe index 6 may schedule the data 215 (e.g., via PUSCH) on the subframe index 2. The transmission timeline pattern may repeat over subframe cycle 805-c and subframe cycle 805-d.

In some other examples, in accordance with the transmission timeline 800, additionally or alternatively, the UE 115-a may identify that the grant 210 is received on subframe index 0 of a first ten-subframe cycle (e.g., a subframe cycle 805-a) by referencing Table A or Table C. For example, the base station 105-a may transmit the grant 210 on subframe index 0 of the first ten-subframe cycle (e.g., the subframe cycle 805-a). The UE 115-a may also determine, based in part on the grant 210 being received on the subframe index 0 of the first ten-subframe cycle (e.g., the subframe cycle 805-a), that the second subframe for transmitting the data 215 is at subframe index 4 of the first ten-subframe cycle (e.g., the subframe cycle 805-a), by referencing Table A or Table C. The UE 115-a may transmit the data 215 at subframe index 4 of the first ten-subframe cycle (e.g., the subframe cycle 805-a), and the base station 105-a may receive the data 215 at subframe index 4 of the first ten-subframe cycle (e.g., the subframe cycle 805-a). The UE 115-a may determine, based in part on the data 215 being transmitted on the subframe index 4 of the first ten-subframe cycle (e.g., the subframe cycle 805-a), that the third subframe for monitoring the feedback 220, from the base station 105-a, is at subframe index 0 of a second ten-subframe cycle (e.g., a subframe cycle 805-b) subsequent to the first ten-subframe cycle (e.g., the subframe cycle 805-a), by referencing Table B or Table D. For example, the base station 105-a may transmit the feedback 220 at subframe index 0 of the second ten-subframe cycle (e.g., the subframe cycle 805-b), and the UE 115-a may monitor and receive the feedback 220 at subframe index 0 of the second ten-subframe cycle (e.g., the subframe cycle 805-b). Thus, the grant 210 received on the subframe index 0 may schedule the data 215 (e.g., via PUSCH) on the subframe index 4. The transmission timeline pattern may repeat over subframe cycle 805-c and subframe cycle 805-d.

In other examples, additionally or alternatively, in accordance with the transmission timeline 800, the UE 115-a may identify that the grant 210 is received on subframe index 1 of a first ten-subframe cycle (e.g., a subframe cycle 805-a) by referencing Table A or Table C. For example, the base station 105-a may transmit the grant 210 on subframe index 1 of the first ten-subframe cycle (e.g., the subframe cycle 805-a). The UE 115-a may also determine, based in part on the grant 210 being received on the subframe index 1 of the first ten-subframe cycle (e.g., the subframe cycle 805-a), that the second subframe for transmitting the data 215 is at subframe index 7 of the first ten-subframe cycle (e.g., the subframe cycle 805-a), by referencing Table A or Table C. As such, the UE 115-a may determine, based in part on the data 215 being transmitted on the subframe index 7 of the first ten-subframe cycle (e.g., the subframe cycle 805-a), that the third subframe for monitoring the feedback 220, from the base station 105-a, is at subframe index 1 of a second ten-subframe cycle (e.g., a subframe cycle 805-b) subsequent to the first ten-subframe cycle (e.g., the subframe cycle 805-a), by referencing Table B or Table D. Thus, the grant 210 received on the subframe index 1 may schedule the data 215 (e.g., via PUSCH) on the subframe index 7. The transmission timeline pattern may repeat over subframe cycle 805-c and subframe cycle 805-d.

In some examples, additionally or alternatively, in accordance with the transmission timeline 800, the UE 115-a may identify that the grant 210 is received on subframe index 5 of a first ten-subframe cycle (e.g., a subframe cycle 805-a) by referencing Table A or Table C. For example, the base station 105-a may transmit the grant 210 on subframe index 5 of the first ten-subframe cycle (e.g., the subframe cycle 805-a). The UE 115-a may also determine, based in part on the grant 210 being received on the subframe index 5 of the first ten-subframe cycle (e.g., the subframe cycle 805-a), that the second subframe for transmitting the data 215 is at subframe index 9 of the first ten-subframe cycle (e.g., the subframe cycle 805-*a*). As such, the UE 115-*a* may determine, based in part on the data 215 being transmitted on the subframe index 9 of the first ten-subframe cycle (e.g., the subframe cycle 805-*a*), that the third subframe for monitoring the feedback 220, from the base station 105-*a*, is at subframe index 5 of a second ten-subframe cycle (e.g., a subframe cycle 805-*b*) subsequent to the first ten-subframe cycle (e.g., the subframe cycle 805-*a*), by referencing Table B or Table D. Thus, the grant 210 received on the subframe index 5 may schedule the data 215 (e.g., via PUSCH) on the subframe index 9. The transmission timeline pattern may repeat over subframe cycle 805-*c* and subframe cycle 805-*d*.

With reference to FIGS. 3 through 8, by identifying that the UE 115-*a* is a dynamic power sharing capable UE, the UE 115-*a* may identify, from the one or more combinations and based on the UE 115-*a* being a dynamic power sharing capable UE, that the UE 115-*a* is configured to receive the grant 210 on any one of a subframe index 0, 1, 5, or 6 of a first ten-subframe cycle. The UE 115-*a* may also identify, from the one or more combinations and based on the UE 115-*a* being a dynamic power sharing capable UE, that the UE 115-*a* is configured to transmit the data 215 on any one of a subframe index 4, 7, or 9 of the first ten-subframe cycle or subframe index 2 of a second ten-subframe cycle subsequent to the first ten-subframe cycle. The UE 115-*a* may also identify, from the one or more combinations and based on the UE 115-*a* being a dynamic power sharing capable UE, that the UE 115-*a* is configured to monitor for the feedback 220 associated with transmission of the uplink data on any one of a subframe index 0, 1, 5, or 6 of the second ten-subframe cycle.

In some examples, additionally or alternatively, by identifying that the UE 115-*a* is a non-dynamic power sharing capable UE, the UE 115-*a* may identify, from the one or more combinations and based on the UE 115-*a* being a non-dynamic power sharing capable UE, that the UE 115-*a* is configured to receive the grant 210 on any one of a subframe index 1 or 6 of a first ten-subframe cycle when the DL-reference UL-DL configuration corresponds to a configuration index 2. The UE 115-*a* may also identify, from the one or more combinations and based on the UE 115-*a* being a non-dynamic power sharing capable UE, that the UE 115-*a* is configured to transmit the data 215 on any one of a subframe index 7 of the first ten-subframe cycle or subframe index 2 of a second ten-subframe cycle subsequent to the first ten-subframe cycle when the DL-reference UL-DL configuration corresponds to a configuration index 2. The UE 115-*a* may also identify, from the one or more combinations and based on the UE 115-*a* being a non-dynamic power sharing capable UE, that the UE 115-*a* is configured to monitor for the feedback 220 associated with transmission of the data 215 on any one of a subframe index 1 or 6 of the second ten-subframe cycle when the DL-reference UL-DL configuration corresponds to a configuration index 2.

In some other examples, additionally or alternatively, by identifying that the UE 115-*a* is a non-dynamic power sharing capable UE, the UE 115-*a* may identify, from the one or more combinations and based on the UE 115-*a* being a non-dynamic power sharing capable UE, that the UE 115-*a* is configured to receive the grant 210 on a subframe index 6 of a first ten-subframe cycle when the DL-reference UL-DL configuration corresponds to a configuration index 4 or 5. The UE 115-*a* may also identify, from the one or more combinations and based on the UE 115-*a* being a non-dynamic power sharing capable UE, that the UE 115-*a* is configured to transmit the data 215 on subframe index 2 of a second ten-subframe cycle subsequent to the first ten-subframe cycle when the DL-reference UL-DL configuration corresponds to a configuration index 4 or 5. The UE 115-*a* may also identify, from the one or more combinations and based on the UE 115-*a* being a non-dynamic power sharing capable UE, that the UE 115-*a* is configured to monitor for the feedback 220 associated with transmission of the data 215 on subframe index 6 of the second ten-subframe cycle when the DL-reference UL-DL configuration corresponds to a configuration index 4 or 5.

Figure 9:
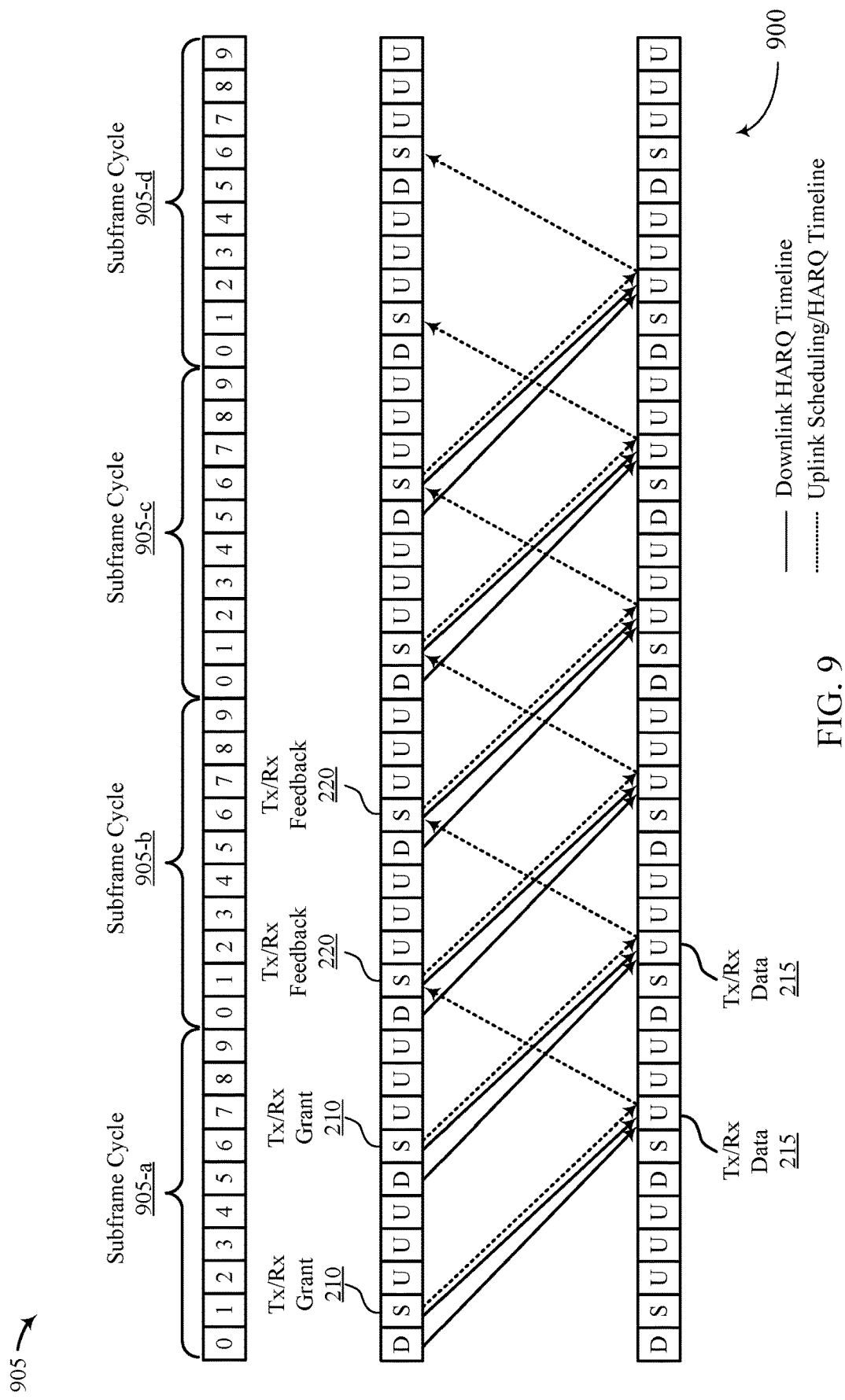

FIG. 9 illustrates an example of a transmission timeline 900 that supports uplink RTT for EN-DC in accordance with aspects of the present disclosure. In some examples, the transmission timeline 900 may also implement aspects of the wireless communications systems 100 and 200, as described with reference to FIG. 2. For example, the transmission timeline 900 may be based on a configuration by the base station 105-*a*, the base station 105-*b* or the UE 115-*a*, and implemented by the UE 115-*a*. In the example of FIG. 9, the transmission timeline 900 may correspond to a primary cell TDD UL-DL configuration relating to a configuration index 6 and a DL-reference UL-DL configuration relating to a configuration index 2, as shown in Tables A through D. The transmission timeline 900 may, in some examples, correspond to a number of subframe cycles 905, with each subframe in a cycle having a subframe index ranging from 0 to 9. In some examples, the transmission timeline 900 in the example of FIG. 9, may be illustrative of a transmission timeline for when the UE 115-*a* is configured with non-dynamic power sharing capability. As such, uplink data (e.g., scheduled on LTE PUSCH) may be scheduled on one or more of a subframe index 2 or a subframe index 7 of a ten-subframe cycle.

In some examples, in accordance with the transmission timeline 900, the UE 115-*a* may identify that the grant 210 is received on subframe index 1 of a first ten-subframe cycle (e.g., a subframe cycle 905-*a*), for example, by referencing Table A or Table C. The base station 105-*a* may transmit the grant 210 on subframe index 1 of the first ten-subframe cycle (e.g., the subframe cycle 905-*a*). The UE 115-*a* may also determine, based in part on the grant 210 being received on the subframe index 1 of the first ten-subframe cycle (e.g., the subframe cycle 905-*a*), that the second subframe for transmitting the data 215 is at subframe index 7 of the first ten-subframe cycle (e.g., the subframe cycle 905-*a*) for example, by referencing Table A or Table C. The UE 115-*a* may transmit the data 215 at subframe index 7 of the first ten-subframe cycle (e.g., the subframe cycle 905-*a*), and the base station 105-*a* may receive the data 215 at subframe index 7 of the first ten-subframe cycle (e.g., the subframe cycle 905-*a*). The UE 115-*a* may determine, based in part on the data 215 being transmitted on the subframe index 7 of the first ten-subframe cycle (e.g., the subframe cycle 905-*a*), that the third subframe for monitoring the feedback 220, from the base station 105-*a*, is at subframe index 1 of a second ten-subframe cycle (e.g., a subframe cycle 905-*b*) subsequent to the first ten-subframe cycle (e.g., the subframe cycle 905-*a*), for example, by referencing Table C or Table D. The base station 105-*a* may transmit the feedback 220 at subframe index 1 of the second ten-subframe cycle (e.g., the subframe cycle 905-*b*), and the UE 115-*a* may monitor and receive the feedback 220 at subframe index 1 of the second ten-subframe cycle (e.g., the subframe cycle 905-*b*). Thus, the grant 210 received on the subframe index 1 may schedule the data 215 (e.g., PUSCH) on the subframe index 7. The transmission timeline pattern may repeat over subframe cycle 905-*c* and subframe cycle 905-*d*.

In some other examples, additionally or alternatively, in accordance with the transmission timeline 900, the UE 115-*a* may identify that the grant 210 is received on subframe index 6 of a first ten-subframe cycle (e.g., a subframe cycle 905-*a*), for example, by referencing Table A or Table C. The base station 105-*a* may transmit the grant 210 on subframe index 6 of the first ten-subframe cycle (e.g., the subframe cycle 905-*a*). The UE 115-*a* may also determine, based in part on the grant 210 being received on the subframe index 6 of the first ten-subframe cycle (e.g., the subframe cycle 905-*a*), that the second subframe for transmitting the data 215 is at subframe index 2 of a second ten-subframe cycle (e.g., a subframe cycle 905-*b*) subsequent to the first ten-subframe cycle (e.g., the subframe cycle 905-*a*), for example, by referencing Table A or Table C. The UE 115-*a* may thus transmit the data 215 at subframe index 2 of the second ten-subframe cycle (e.g., the subframe cycle 905-*b*), and the base station 105-*a* may receive the data 215 at subframe index 2 of the second ten-subframe cycle (e.g., the subframe cycle 905-*b*). The UE 115-*a* may also determine, based in part on the data 215 being transmitted on the subframe index 2 of the second ten-subframe cycle (e.g., the subframe cycle 905-*b*), that the third subframe for monitoring the feedback 220, from the base station 105-*a*, is at subframe index 6 of the second ten-subframe cycle (e.g., the subframe cycle 905-*b*) subsequent to the first ten-subframe cycle (e.g., the subframe cycle 905-*a*), for example, by referencing Table B or Table D. the base station 105-*a* may thus transmit the feedback 220 at subframe index 6 of the second ten-subframe cycle (e.g., the subframe cycle 905-*b*), and the UE 115-*a* may monitor and receive the feedback 220 at subframe index 6 of the second ten-subframe cycle (e.g., the subframe cycle 905-*b*). Thus, the grant 210 received on the subframe index 6 may schedule the data 215 (e.g., PUSCH) on the subframe index 2.

Figure 10:
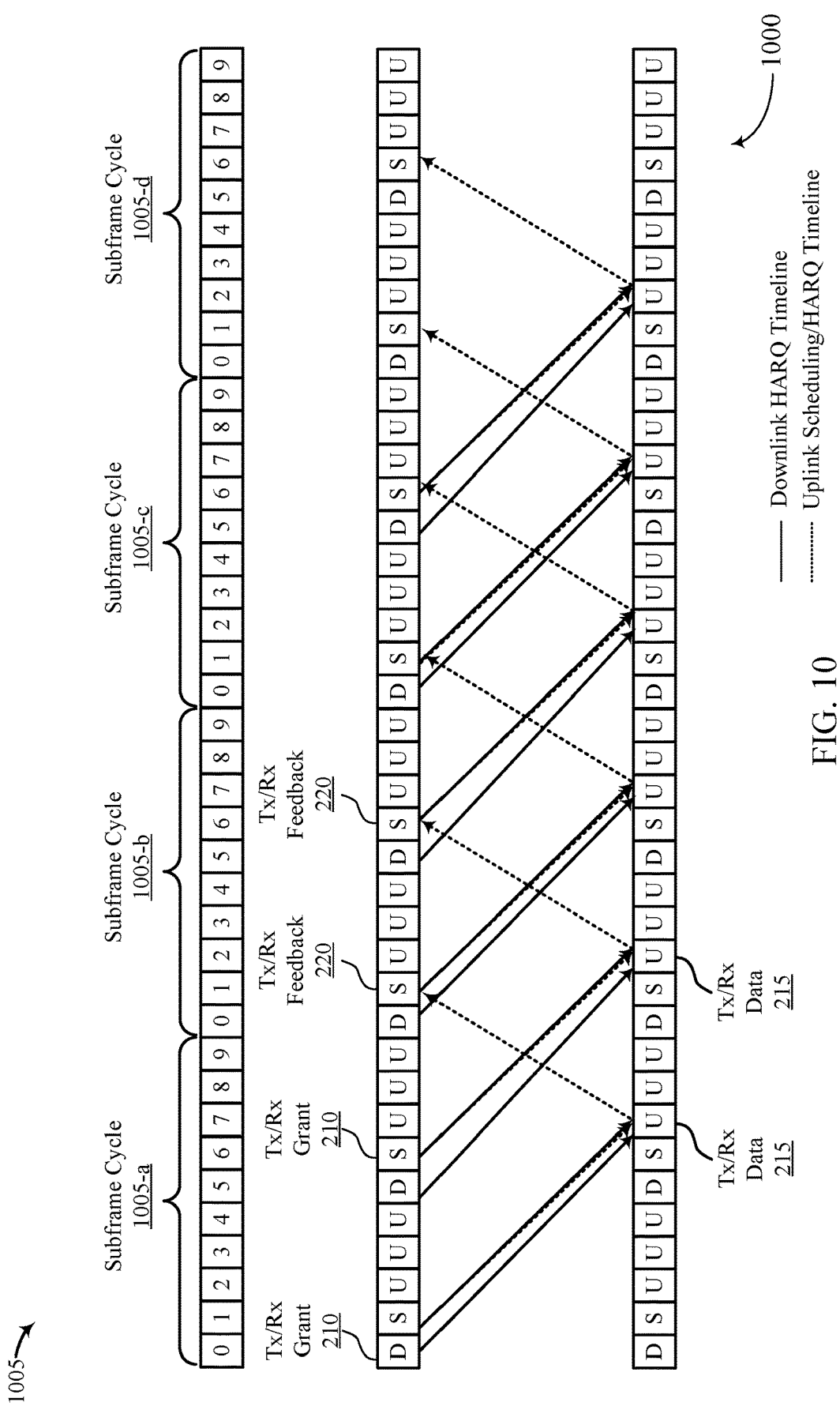

FIG. 10 illustrates an example of a transmission timeline 1000 that supports uplink RTT for EN-DC in accordance with aspects of the present disclosure. In some examples, the transmission timeline 1000 may also implement aspects of the wireless communications systems 100 and 200, as described with reference to FIG. 2. For example, the transmission timeline 1000 may be based on a configuration by the base station 105-*a*, the base station 105-*b* or the UE 115-*a*, and implemented by the UE 115-*a*. In the example of FIG. 10, the transmission timeline 1000 may correspond to a primary cell TDD UL-DL configuration relating to a configuration index 6 and a DL-reference UL-DL configuration relating to a configuration index 2, as shown in Tables A through D. The transmission timeline 1000 may, in some examples, correspond to a number of subframe cycles 1005, with each subframe in a cycle having a subframe index ranging from 0 to 9. In some examples, the transmission timeline 1000 in the example of FIG. 10, may be illustrative of a transmission timeline for when the UE 115-*a* is configured with dynamic power sharing capability. As such, uplink data (e.g., LTE PUSCH) may be scheduled on one or more of a subframe index 2, a subframe index 4, or a subframe index 7 of a ten-subframe cycle. As such, there may be no subframes available that can schedule PUSCH on a subframe index 3 and a subframe index 8 of the ten-subframe cycle.

In some examples, in accordance with the transmission timeline 1000, the UE 115-*a* may identify, for example by referencing Table A or Table C, that the grant 210 is received on subframe index 1 of a first ten-subframe cycle (e.g., a subframe cycle 1005-*a*). The base station 105-*a* may transmit the grant 210 on subframe index 1 of the first ten-subframe cycle (e.g., the subframe cycle 1005-*a*). The UE 115-*a* may also determine, based in part on the grant 210 being received on the subframe index 1 of the first ten-subframe cycle (e.g., the subframe cycle 1005-*a*), that the second subframe for transmitting the data 215 is at subframe index 7 of the first ten-subframe cycle (e.g., the subframe cycle 1005-*a*), for example by referencing Table A or Table C. The UE 115-*a* may transmit the data 215 at subframe index 7 of the first ten-subframe cycle (e.g., the subframe cycle 1005-*a*), and the base station 105-*a* may receive the data 215 at subframe index 7 of the first ten-subframe cycle (e.g., the subframe cycle 1005-*a*). The UE 115-*a* may determine, based in part on the data 215 being transmitted on the subframe index 7 of the first ten-subframe cycle (e.g., the subframe cycle 1005-*a*), that the third subframe for monitoring the feedback 220, from the base station 105-*a*, is at subframe index 1 of a second ten-subframe cycle (e.g., a subframe cycle 1005-*b*) subsequent to the first ten-subframe cycle (e.g., the subframe cycle 1005-*a*), by referencing Table B or Table D. The base station 105-*a* may transmit the feedback 220 at subframe index 1 of the second ten-subframe cycle (e.g., the subframe cycle 1005-*b*), and the UE 115-*a* may monitor and receive the feedback 220 at subframe index 1 of the second ten-subframe cycle (e.g., the subframe cycle 1005-*b*). Thus, the grant 210 received on the subframe index 1 may schedule the data 215 (e.g., PUSCH) on the subframe index 7. The transmission timeline pattern may repeat over subframe cycle 1005-*c* and 1005-*d*.

In some other examples, additionally or alternatively, in accordance with the transmission timeline 1000, the UE 115-*a* may identify, for example by referencing Table A or Table C, that the grant 210 is received on subframe index 6 of a first ten-subframe cycle (e.g., a subframe cycle 1005-*a*). The UE 115-*a* may also determine, based in part on the grant 210 being received on the subframe index 6 of the first ten-subframe cycle (e.g., the subframe cycle 1005-*a*), that the second subframe for transmitting the data 215 is at subframe index 2 of a second ten-subframe cycle (e.g., a subframe cycle 1005-*b*) subsequent to the first ten-subframe cycle (e.g., the subframe cycle 1005-*a*), for example by referencing Table A or Table C. The UE 115-*a* may transmit the data 215 at subframe index 2 of the second ten-subframe cycle (e.g., the subframe cycle 1005-*b*), and the base station 105-*a* may receive the data 215 at subframe index 2 of the second ten-subframe cycle (e.g., the subframe cycle 1005-*b*). The UE 115-*a* may determine, based in part on the data 215 being transmitted on the subframe index 2 of the second ten-subframe cycle (e.g., the subframe cycle 1005-*b*), that the third subframe for monitoring the feedback 220, from the base station 105-*a*, is at subframe index 6 of the second ten-subframe cycle (e.g., the subframe cycle 1005-*b*) subsequent to the first ten-subframe cycle (e.g., the subframe cycle 1005-*a*), by referencing Table B or Table D. The base station 105-*a* may transmit the feedback 220 at subframe index 6 of the second ten-subframe cycle (e.g., the subframe cycle 1005-*b*), and the UE 115-*a* may monitor and receive the feedback 220 at subframe index 6 of the second ten-subframe cycle (e.g., the subframe cycle 1005-*b*). Thus, the grant 210 received on the subframe index 6 may schedule the data 215 (e.g., PUSCH) on the subframe index 2.

Figure 11:
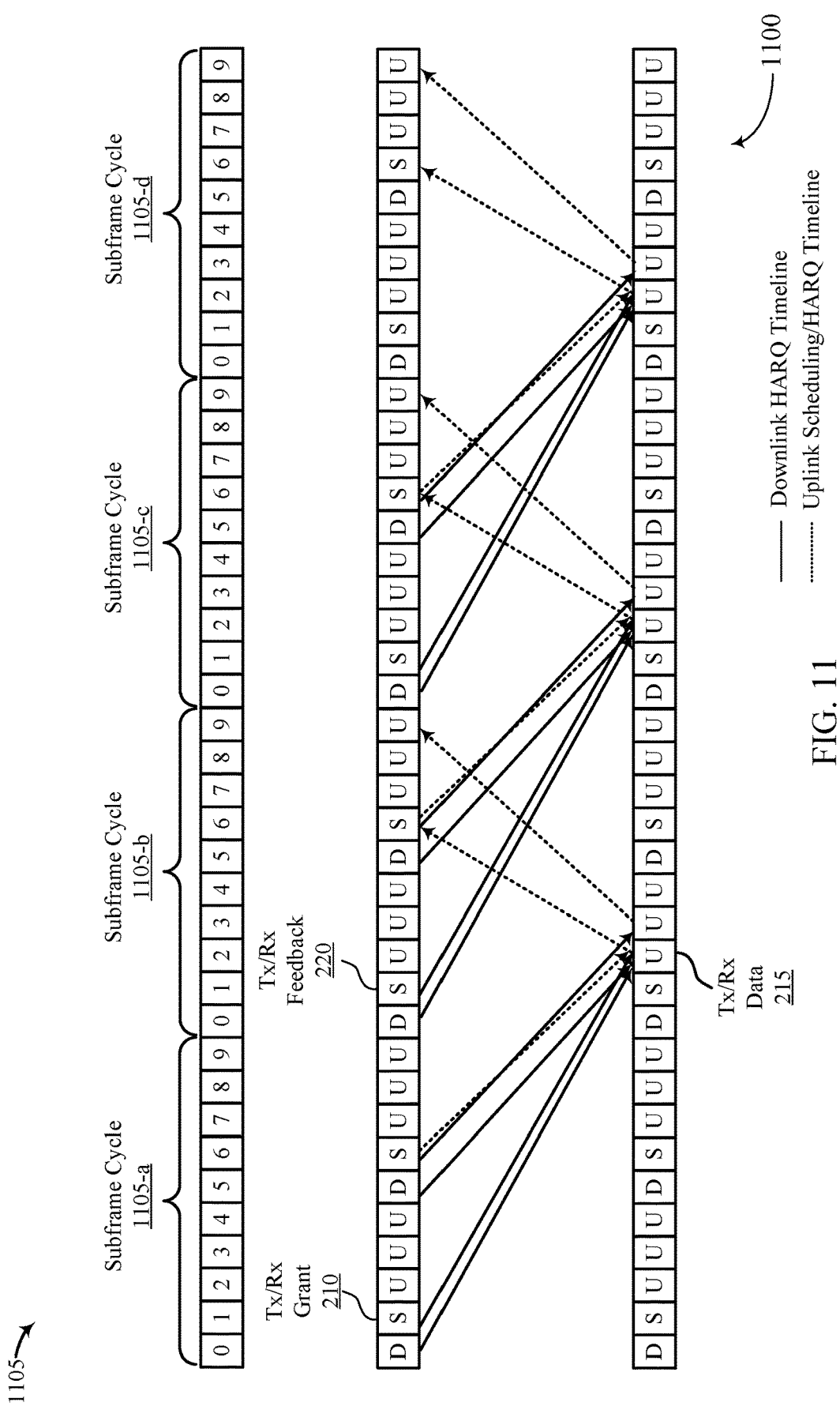

FIG. 11 illustrates an example of a transmission timeline 1100 that supports uplink RTT for EN-DC in accordance with aspects of the present disclosure. In some examples, the transmission timeline 1100 may also implement aspects of the wireless communications systems 100 and 200, as described with reference to FIG. 2. For example, the transmission timeline 1100 may be based on a configuration by the base station 105-*a*, the base station 105-*b* or the UE 115-*a*, and implemented by the UE 115-*a*. In the example of FIG. 11, the transmission timeline 1100 may correspond to a primary cell TDD UL-DL configuration relating to a configuration index 6 and a DL-reference UL-DL configuration relating to a configuration index 4, as shown in Tables A through D. The transmission timeline 1100 may, in some examples, correspond to a number of subframe cycles 1105, with each subframe in a cycle having a subframe index ranging from 0 to 9. In some examples, the transmission timeline 1100 in the example of FIG. 11, may be illustrative of a transmission timeline for when the UE 115-*a* is configured with non-dynamic power sharing capability. As such, uplink data (e.g., LTE PUSCH) may be scheduled on a subframe index 2 of a ten-subframe cycle. Thus, there may be no subframe available that can schedule PUSCH on a subframe index 3 of the ten-subframe cycle.

In some examples, in accordance with the transmission timeline 1100, the UE 115-*a* may identify, by referencing Table A or Table C, that the grant 210 is received on subframe index 6 of a first ten-subframe cycle (e.g., a subframe cycle 1105-*a*). The base station 105-*a* may transmit the grant 210 on subframe index 6 of the first ten-subframe cycle (e.g., the subframe cycle 1105-*a*). The UE 115-*a* may also determine, based in part on the grant 210 being received on the subframe index 6 of the first ten-subframe cycle (e.g., the subframe cycle 1105-*a*), that the second subframe for transmitting the data 215 is at subframe index 2 of a second ten-subframe cycle (e.g., a subframe cycle 1105-*b*) subsequent to the first ten-subframe cycle (e.g., the subframe cycle 1105-*a*). For example, the UE 115-*a* may determine, by referencing Table A or Table C, that the second subframe for transmitting the data 215 is at subframe index 2 of the second ten-subframe cycle (e.g., the subframe cycle 1105-*b*) subsequent to the first ten-subframe cycle (e.g., the subframe cycle 1105-*a*). The UE 115-*a* may transmit the data 215 at subframe index 2 of the second ten-subframe cycle (e.g., the subframe cycle 1105-*b*), and the base station 105-*a* may receive the data 215 at subframe index 2 of the second ten-subframe cycle (e.g., the subframe cycle 1105-*b*). The UE 115-*a* may determine, based in part on the data 215 being transmitted on the subframe index 2 of the second ten-subframe cycle (e.g., the subframe cycle 1105-*b*), that the third subframe for monitoring the feedback 220, from the base station 105-*a*, is at subframe index 6 of the second ten-subframe cycle (e.g., the subframe cycle 1105-*b*) subsequent to the first ten-subframe cycle (e.g., the subframe cycle 1105-*a*). For example, the UE 115-*a* may determine, by referencing Table B or Table D, that the third subframe for monitoring the feedback 220, from the base station 105-*a*, is at subframe index 6 of the second ten-subframe cycle (e.g., the subframe cycle 1105-*b*) subsequent to the first ten-subframe cycle (e.g., the subframe cycle 1105-*a*). The base station 105-*a* may transmit the feedback 220 at subframe index 6 of the second ten-subframe cycle (e.g., the subframe cycle 1105-*b*), and the UE 115-*a* may monitor and receive the feedback 220 at subframe index 6 of the second ten-subframe cycle (e.g., the subframe cycle 1105-*b*). Thus, the grant 210 received on the subframe index 6 may schedule the data 215 (e.g., PUSCH) on the subframe index 2.

Figure 12:
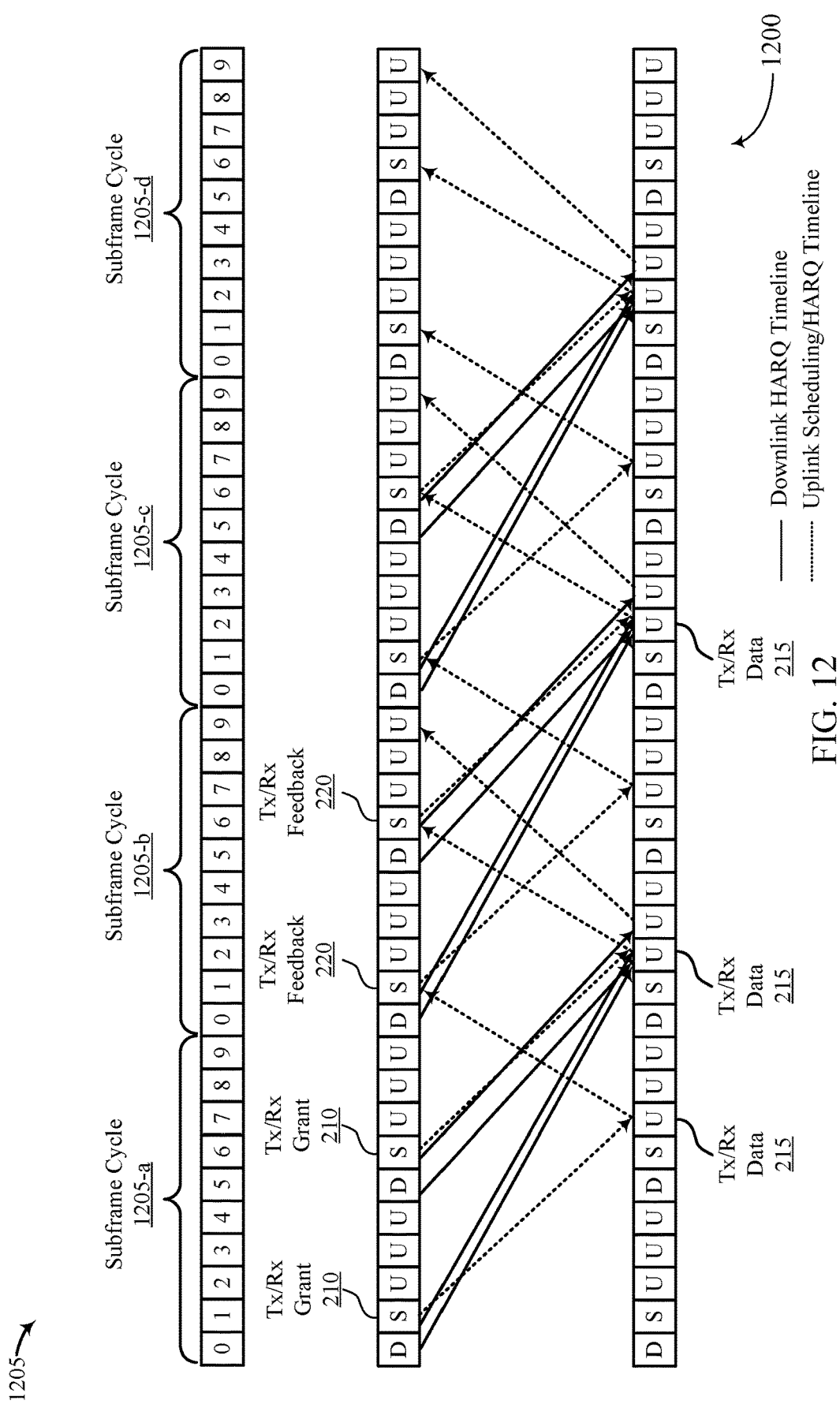

FIG. 12 illustrates an example of a transmission timeline 1200 that supports uplink RTT for EN-DC in accordance with aspects of the present disclosure. In some examples, the transmission timeline 1200 may also implement aspects of the wireless communications systems 100 and 200, as described with reference to FIG. 2. For example, the transmission timeline 1200 may be based on a configuration by the base station 105-*a*, the base station 105-*b* or the UE 115-*a*, and implemented by the UE 115-*a*. In the example of FIG. 12, the transmission timeline 1200 may correspond to a primary cell TDD UL-DL configuration relating to a configuration index 6 and a DL-reference UL-DL configuration relating to a configuration index 4, as shown in Tables A through D. The transmission timeline 1200 may, in some examples, correspond to a number of subframe cycles 1205, with each subframe in a cycle having a subframe index ranging from 0 to 9. In some examples, the transmission timeline 1200 in the example of FIG. 12, may be illustrative of a transmission timeline for when the UE 115-*a* is configured with dynamic power sharing capability. As such, uplink data (e.g., scheduled on LTE PUSCH) may be scheduled on a subframe index 2, a subframe index 4, or a subframe index 7 of a ten-subframe cycle. Therefore, there may be no subframe available that can schedule PUSCH on a subframe index 3 and a subframe index 8 of the ten-subframe cycle.

In accordance with the transmission timeline 1200, the UE 115-*a* may, in some examples, identify that the grant 210 is received on subframe index 6 of a first ten-subframe cycle (e.g., a subframe cycle 1205-*a*). For example, the UE 115-*a* may identify, by referencing Table A or Table C, that the grant 210 is received on subframe index 6 of the first ten-subframe cycle (e.g., the subframe cycle 1205-*a*). The base station 105-*a* may transmit the grant 210 on subframe index 6 of the first ten-subframe cycle (e.g., the subframe cycle 1205-*a*). The UE 115-*a* may also determine, based in part on the grant 210 being received on the subframe index 6 of the first ten-subframe cycle (e.g., the subframe cycle 1205-*a*), that the second subframe for transmitting the data 215 is at subframe index 2 of a second ten-subframe cycle (e.g., a subframe cycle 1205-*b*) subsequent to the first ten-subframe cycle (e.g., the subframe cycle 1205-*a*). For example, the UE 115-*a* may determine, by referencing Table A or Table C, that the second subframe for transmitting the data 215 is at subframe index 2 of the second ten-subframe cycle (e.g., the subframe cycle 1205-*b*) subsequent to the first ten-subframe cycle (e.g., the subframe cycle 1205-*a*). The UE 115-*a* may thus transmit the data 215 at subframe index 2 of the second ten-subframe cycle (e.g., the subframe cycle 1205-*b*), and the base station 105-*a* may receive the data 215 at subframe index 2 of the second ten-subframe cycle (e.g., the subframe cycle 1205-*b*).

The UE 115-*a* may determine, based in part on the data 215 being transmitted on the subframe index 2 of the second ten-subframe cycle (e.g., the subframe cycle 1205-*b*), that the third subframe for monitoring the feedback 220, from the base station 105-*a*, is at subframe index 6 of the second ten-subframe cycle (e.g., the subframe cycle 1205-*b*) subsequent to the first ten-subframe cycle (e.g., the subframe cycle 1205-*a*). For example, the UE 115-*a* may determine, by referencing Table B or Table D, that the third subframe for monitoring the feedback 220, from the base station 105-*a*, is at subframe index 6 of the second ten-subframe cycle (e.g., the subframe cycle 1205-*b*) subsequent to the first ten-subframe cycle (e.g., the subframe cycle 1205-*a*). The base station 105-*a* may thus transmit the feedback 220 at subframe index 6 of the second ten-subframe cycle (e.g., the subframe cycle 1205-*b*), and the UE 115-*a* may monitor and receive the feedback 220 at subframe index 6 of the second ten-subframe cycle (e.g., the subframe cycle 1205-*b*). Thus, the grant 210 received on the subframe index 6 may schedule the data 215 (e.g., PUSCH) on the subframe index 2.

In some other examples, in accordance with the transmission timeline 1200, the UE 115-*a* may identify that the grant 210 is received on subframe index 1 of a first ten-subframe cycle (e.g., a subframe cycle 1205-*a*). For example, the UE 115-*a* may identify, by referencing Table A or Table C, that the grant 210 is received on subframe index 1 of the first ten-subframe cycle (e.g., the subframe cycle 1205-*a*). The base station 105-*a* may transmit the grant 210 on subframe index 1 of the first ten-subframe cycle (e.g., the subframe cycle 1205-*b*). The UE 115-*a* may also determine, based in part on the grant 210 being received on the subframe index 1 of the first ten-subframe cycle (e.g., the subframe cycle 1205-*a*), that the second subframe for transmitting the data 215 is at subframe index 7 of the first ten-subframe cycle (e.g., the subframe cycle 1205-*a*). For example, the UE 115-*a* may determine, by referencing Table A or Table C, that the second subframe for transmitting the data 215 is at subframe index 7 of the first ten-subframe cycle (e.g., the subframe cycle 1205-*a*). The UE 115-*a* may transmit the data 215 at subframe index 7 of the first ten-subframe cycle (e.g., the subframe cycle 1205-*a*), and the base station 105-*a* may receive the data 215 at subframe index 7 of the first ten-subframe cycle (e.g., the subframe cycle 1205-*a*).

The UE 115-*a* may determine, based in part on the data 215 being transmitted on the subframe index 7 of the first ten-subframe cycle (e.g., the subframe cycle 1205-*a*), that the third subframe for monitoring the feedback 220, from the base station 105-*a*, is at subframe index 1 of a second ten-subframe cycle (e.g., a subframe cycle 1205-*b*) subsequent to the first ten-subframe cycle (e.g., the subframe cycle 1205-*a*). For example, the UE 115-*a* may determine, by referencing Table B or Table D, that the third subframe for monitoring the feedback 220, from the base station 105-*a*, is at subframe index 1 of a second ten-subframe cycle (e.g., a subframe cycle 1205-*b*) subsequent to the first ten-subframe cycle (e.g., the subframe cycle 1205-*a*). The base station 105-*a* may transmit the feedback 220 at subframe index 1 of the second ten-subframe cycle (e.g., the subframe cycle 1205-*b*), and the UE 115-*a* may monitor and receive the feedback 220 at subframe index 1 of the second ten-subframe cycle (e.g., the subframe cycle 1205-*b*). Thus, the grant 210 received on the subframe index 1 may schedule the data 215 (e.g., PUSCH) on the subframe index 7. The transmission timeline pattern may repeat over subframe cycle 1205-*c* and 1205-*d*.

In other examples, in accordance with the transmission timeline 1200, the UE 115-*a* may identify that the grant 210 is received on subframe index 9 of a first ten-subframe cycle (e.g., a subframe cycle 1205-*a*). For example, the UE 115-*a* may identify, by referencing Table A or Table C, that the grant 210 is received on subframe index 9 of the first ten-subframe cycle (e.g., the subframe cycle 1205-*a*). The base station 105-*a* may transmit the grant 210 on subframe index 9 of the first ten-subframe cycle (e.g., the subframe cycle 1205-*a*). The UE 115-*a* may also determine, based in part on the grant 210 being received on the subframe index 9 of the first ten-subframe cycle (e.g., the subframe cycle 1205-*a*), that the second subframe for transmitting the data 215 is at subframe index 4 of a second ten-subframe cycle (e.g., the subframe cycle 1205-*b*) subsequent to the first ten-subframe cycle (e.g., the subframe cycle 1205-*a*). For example, the UE 115-*a* may determine, by referencing Table A or Table C, that the second subframe for transmitting the data 215 is at subframe index 4 of the second ten-subframe cycle (e.g., the subframe cycle 1205-*b*) subsequent to the first ten-subframe cycle (e.g., the subframe cycle 1205-*a*).

The UE 115-*a* may transmit the data 215 at subframe index 4 of the second ten-subframe cycle (e.g., the subframe cycle 1205-*b*), and the base station 105-*a* may receive the data 215 at subframe index 4 of the second ten-subframe cycle (e.g., the subframe cycle 1205-*b*). The UE 115-*a* may determine, based in part on the data 215 being transmitted on the subframe index 4 of the second ten-subframe cycle (e.g., the subframe cycle 1205-*b*), that the third subframe for monitoring the feedback 220, from the base station 105-*a*, is at subframe index 9 of the second ten-subframe cycle (e.g., the subframe cycle 1205-*b*) subsequent to the first ten-subframe cycle (e.g., the subframe cycle 1205-*a*). For example, the UE 115-*a* may determine, by referencing Table B or Table D, that the third subframe for monitoring the feedback 220, from the base station 105-*a*, is at subframe index 9 of the second ten-subframe cycle (e.g., the subframe cycle 1205-*b*) subsequent to the first ten-subframe cycle (e.g., the subframe cycle 1205-*a*). The base station 105-*a* may thus transmit the feedback 220 at subframe index 9 of the second ten-subframe cycle (e.g., the subframe cycle 1205-*b*), and the UE 115-*a* may monitor and receive the feedback 220 at subframe index 9 of the second ten-subframe cycle (e.g., the subframe cycle 1205-*b*). Thus, the grant 210 received on the subframe index 9 may schedule the data 215 (e.g., PUSCH) on the subframe index 4. The transmission timeline pattern may repeat over subframe cycle 1205-*c* and subframe cycle 1205-*d*.

Figure 13:
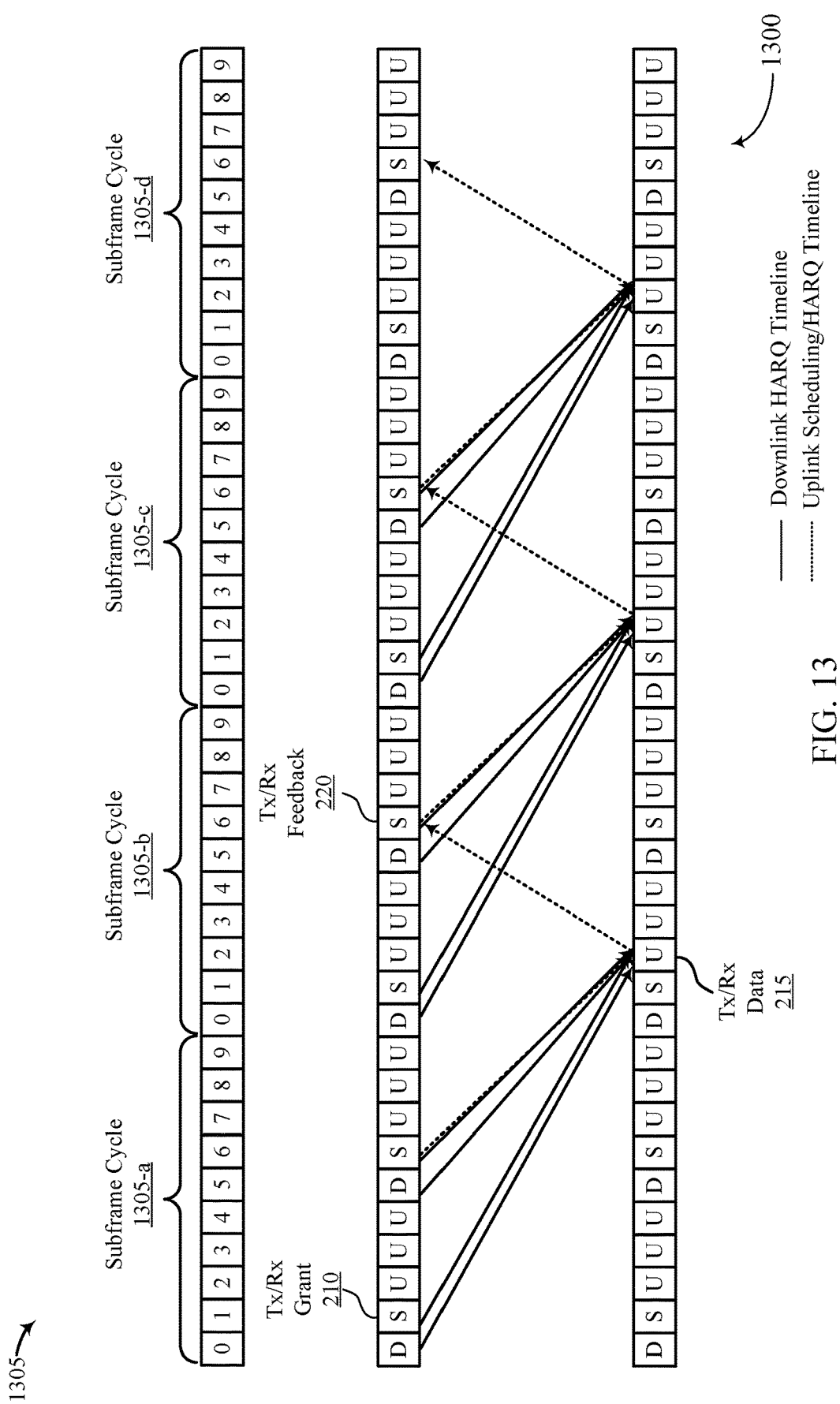

FIG. 13 illustrates an example of a transmission timeline 1300 that supports uplink RTT for EN-DC in accordance with aspects of the present disclosure. In some examples, the transmission timeline 1300 may also implement aspects of the wireless communications systems 100 and 200, as described with reference to FIG. 2. For example, the transmission timeline 1300 may be based on a configuration by the base station 105-*a*, the base station 105-*b* or the UE 115-*a*, and implemented by the UE 115-*a*. In the example of FIG. 13, the transmission timeline 1300 may correspond to a primary cell TDD UL-DL configuration relating to a configuration index 6 and a DL-reference UL-DL configuration relating to a configuration index 5, as shown in Tables A through D. The transmission timeline 1300 may, in some examples, correspond to a number of subframe cycles 1305, with each subframe in a cycle having a subframe index ranging from 0 to 9. In some examples, the transmission timeline 1300 in the example of FIG. 13, may be illustrative of a transmission timeline for when the UE 115-*a* is configured with non-dynamic power sharing capability. As such, uplink data (e.g., LTE PUSCH) may be scheduled on a subframe index 2 of a ten-subframe cycle.

In accordance with the transmission timeline 1300, the UE 115-*a* may identify that the grant 210 is received on subframe index 6 of a first ten-subframe cycle (e.g., a subframe cycle 1305-*a*). For example, the UE 115-*a* may identify, by referencing Table A or Table C, that the grant 210 is received on subframe index 6 of the first ten-subframe cycle (e.g., a subframe cycle 1305-*a*). The base station 105-*a* may transmit the grant 210 on subframe index 6 of the first ten-subframe cycle (e.g., the subframe cycle 1305-*a*). The UE 115-*a* may also determine, based in part on the grant 210 being received on the subframe index 6 of the first ten-subframe cycle (e.g., the subframe cycle 1305-*a*), that the second subframe for transmitting the data 215 is at subframe index 2 of a second ten-subframe cycle (e.g., a subframe cycle 1305-*b*) subsequent to the first ten-subframe cycle (e.g., the subframe cycle 1305-*a*). For example, the UE 115-*a* may determine, by referencing Table A or Table C, that the second subframe for transmitting the data 215 is at subframe index 2 of the second ten-subframe cycle (e.g., a subframe cycle 1305-*b*) subsequent to the first ten-subframe cycle (e.g., the subframe cycle 1305-*a*). The UE 115-*a* may transmit the data 215 at subframe index 2 of the second ten-subframe cycle (e.g., the subframe cycle 1205-*b*), and the base station 105-*a* may receive the data 215 at subframe index 2 of the second ten-subframe cycle (e.g., the subframe cycle 1205-*b*).

The UE 115-*a* may determine, based in part on the data 215 being transmitted on the subframe index 2 of the second ten-subframe cycle (e.g., the subframe cycle 1305-*b*), that the third subframe for monitoring the feedback 220, from the base station 105-*a*, is at subframe index 6 of the second ten-subframe cycle (e.g., the subframe cycle 1305-*b*) subsequent to the first ten-subframe cycle (e.g., the subframe cycle 1305-*a*). For example, the UE 115-*a* may determine, by referencing Table B or Table D, that the third subframe for monitoring the feedback 220, from the base station 105-*a*, is at subframe index 6 of the second ten-subframe cycle (e.g., the subframe cycle 1305-*b*) subsequent to the first ten-subframe cycle (e.g., the subframe cycle 1305-*a*). The base station 105-*a* may transmit the feedback 220 at subframe index 6 of the second ten-subframe cycle (e.g., the subframe cycle 1305-*b*), and the UE 115-*a* may monitor and receive the feedback 220 at subframe index 6 of the second ten-subframe cycle (e.g., the subframe cycle 1305-*b*). Thus, the grant 210 received on the subframe index 6 may schedule the data 215 (e.g., PUSCH) on the subframe index 2.

Figure 14:
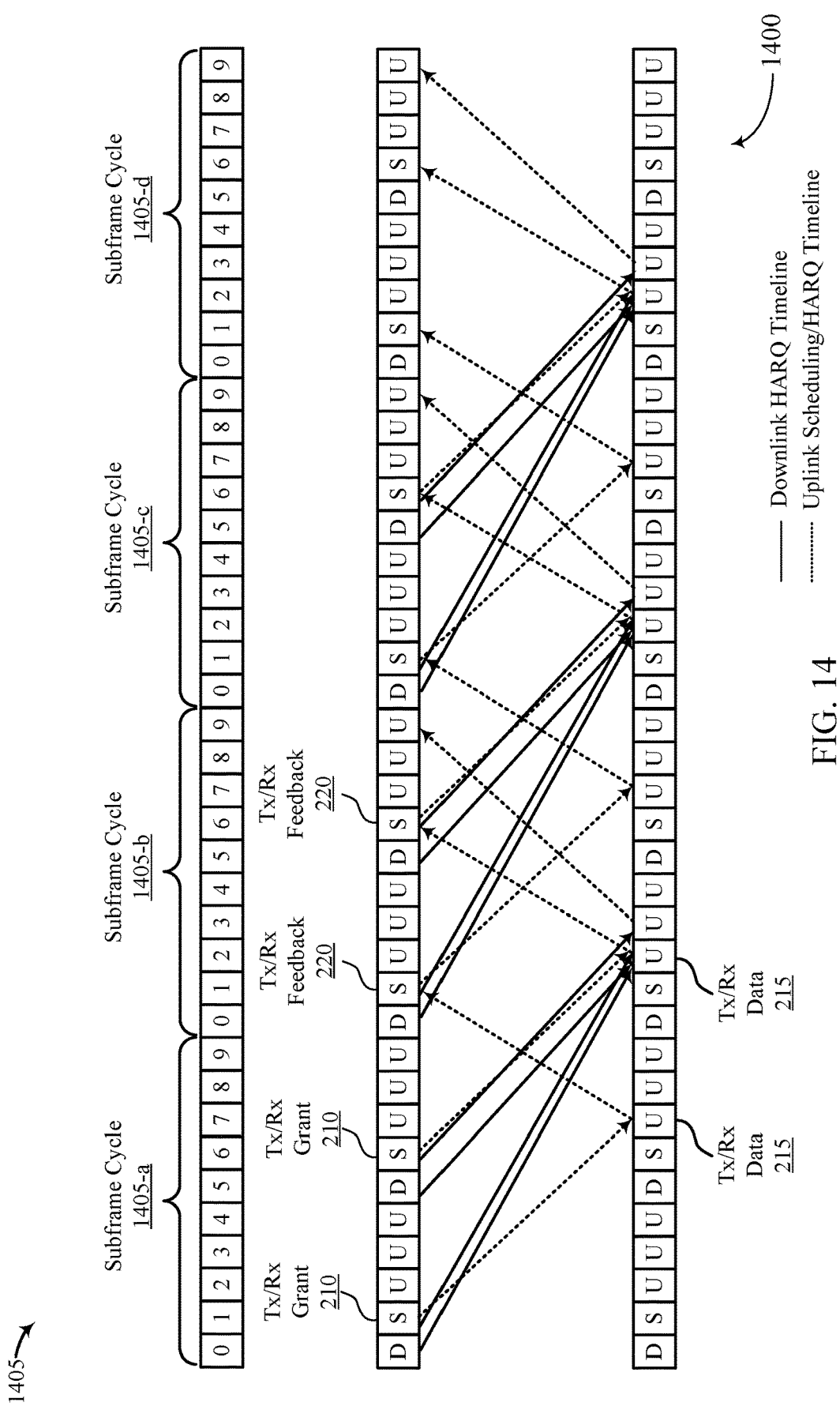

FIG. 14 illustrates an example of a transmission timeline 1400 that supports uplink RTT for EN-DC in accordance with aspects of the present disclosure. In some examples, the transmission timeline 1400 may also implement aspects of the wireless communications systems 100 and 200, as described with reference to FIG. 2. For example, the transmission timeline 1400 may be based on a configuration by the base station 105-*a*, the base station 105-*b* or the UE 115-*a*, and implemented by the UE 115-*a*. In the example of FIG. 14, the transmission timeline 1400 may correspond to a primary cell TDD UL-DL configuration relating to a configuration index 6 and a DL-reference UL-DL configuration relating to a configuration index 5, as shown in Tables A through D. The transmission timeline 1400 may, in some examples, correspond to a number of subframe cycles 1405, with each subframe in a cycle having a subframe index ranging from 0 to 9. In some examples, the transmission timeline 1400 in the example of FIG. 14, may be illustrative of a transmission timeline for when the UE 115-*a* is configured with dynamic power sharing capability. As such, uplink data (e.g., LTE PUSCH) may be scheduled on a subframe index 2, a subframe index 4, or a subframe index 7 of a ten-subframe cycle. Thus, there may be no subframes available to transmit the grant 210 for scheduling PUSCH (e.g., uplink data) on a subframe index 3 and a subframe index 8 of the ten-subframe cycle.

In accordance with the transmission timeline 1400, the UE 115-*a* may identify that the grant 210 is received on subframe index 6 of a first ten-subframe cycle (e.g., a subframe cycle 1405-*a*). For example, the UE 115-*a* may identify, by referencing Table A or Table C, that the grant 210 is received on subframe index 6 of the first ten-subframe cycle (e.g., a subframe cycle 1405-*a*). The base station 105-*a* may transmit the grant 210 on subframe index 6 of the first ten-subframe cycle (e.g., the subframe cycle 1405-*a*). The UE 115-*a* may also determine, based in part on the grant 210 being received on the subframe index 6 of the first ten-subframe cycle (e.g., the subframe cycle 1405-*a*), that the second subframe for transmitting the data 215 is at subframe index 2 of a second ten-subframe cycle (e.g., a subframe cycle 1405-*b*) subsequent to the first ten-subframe cycle (e.g., the subframe cycle 1405-*a*). For example, the UE 115-*a* may determine, by referencing Table A or Table C, that the second subframe for transmitting the data 215 is at subframe index 2 of the second ten-subframe cycle (e.g., the subframe cycle 1405-*b*) subsequent to the first ten-subframe cycle (e.g., the subframe cycle 1405-*a*). The UE 115-*a* may transmit the data 215 at subframe index 2 of the second ten-subframe cycle (e.g., the subframe cycle 1405-*b*), and the base station 105-*a* may receive the data 215 at subframe index 2 of the second ten-subframe cycle (e.g., the subframe cycle 1405-*b*).

The UE 115-*a* may determine, based in part on the data 215 being transmitted on the subframe index 2 of the second ten-subframe cycle (e.g., the subframe cycle 1405-*b*), that the third subframe for monitoring the feedback 220, from the base station 105-*a*, is at subframe index 6 of the second ten-subframe cycle (e.g., the subframe cycle 1405-*b*) subsequent to the first ten-subframe cycle (e.g., the subframe cycle 1405-*a*). For example, the UE 115-*a* may determine, by referencing Table B or Table D, that the third subframe for monitoring the feedback 220, from the base station 105-*a*, is at subframe index 6 of the second ten-subframe cycle (e.g., the subframe cycle 1405-*b*) subsequent to the first ten-subframe cycle (e.g., the subframe cycle 1405-*a*). The base station 105-*a* may transmit the feedback 220 at subframe index 6 of the second ten-subframe cycle (e.g., the subframe cycle 1405-*b*), and the UE 115-*a* may monitor and receive the feedback 220 at subframe index 6 of the second ten-subframe cycle (e.g., the subframe cycle 1405-*b*). Thus, the grant 210 received on the subframe index 6 may schedule the data 215 (e.g., PUSCH) on the subframe index 2.

In some examples, in accordance with the transmission timeline 1400, the UE 115-*a* may identify that the grant 210 is received on subframe index 1 of a first ten-subframe cycle (e.g., a subframe cycle 1405-*a*). For example, the UE 115-*a* may identify, by referencing Table A or Table C, that the grant 210 is received on subframe index 1 of the first ten-subframe cycle (e.g., the subframe cycle 1405-*a*). The base station 105-*a* may transmit the grant 210 on subframe index 1 of the first ten-subframe cycle (e.g., the subframe cycle 1405-*a*). The UE 115-*a* may also determine, based in part on the grant 210 being received on the subframe index 1 of the first ten-subframe cycle (e.g., the subframe cycle 1405-*a*), that the second subframe for transmitting the data 215 is at subframe index 7 of the first ten-subframe cycle (e.g., the subframe cycle 1405-*a*). For example, the UE 115-*a* may determine, by referencing Table A or Table C, that the second subframe for transmitting the data 215 is at subframe index 7 of the first ten-subframe cycle (e.g., the subframe cycle 1405-*a*). The UE 115-*a* may transmit the data 215 at subframe index 7 of the first ten-subframe cycle (e.g., the subframe cycle 1405-*a*), and the base station 105-*a* may receive the data 215 at subframe index 7 of the first ten-subframe cycle (e.g., the subframe cycle 1405-*a*).

The UE 115-*a* may determine, based in part on the data 215 being transmitted on the subframe index 7 of the first ten-subframe cycle (e.g., the subframe cycle 1405-*a*), that the third subframe for monitoring the feedback 220, from the base station 105-*a*, is at subframe index 1 of a second ten-subframe cycle (e.g., a subframe cycle 1405-*b*) subsequent to the first ten-subframe cycle (e.g., the subframe cycle 1405-*a*). For example, the UE 115-*a* determine, by referencing Table B or Table D, that the third subframe for monitoring the feedback 220, from the base station 105-*a*, is at subframe index 1 of a second ten-subframe cycle (e.g., the subframe cycle 1405-*b*) subsequent to the first ten-subframe cycle (e.g., the subframe cycle 1405-*a*). The base station 105-*a* may transmit the feedback 220 at subframe index 1 of the second ten-subframe cycle (e.g., the subframe cycle 1405-*b*), and the UE 115-*a* may monitor and receive the feedback 220 at subframe index 1 of the second ten-subframe cycle (e.g., the subframe cycle 1405-*b*). Thus, the grant 210 received on the subframe index 1 may schedule the data 215 (e.g., PUSCH) on the subframe index 7. The transmission timeline pattern may repeat over subframe cycle 1405-*c* and subframe cycle 1405-*d*.

In some other examples, in accordance with the transmission timeline 1400, the UE 115-*a* may identify that the grant 210 is received on subframe index 9 of a first ten-subframe cycle (e.g., a subframe cycle 1405-*a*). For example, the UE 115-*a* may identify, by referencing Table A or Table C, that the grant 210 is received on subframe index 9 of the first ten-subframe cycle (e.g., the subframe cycle 1405-*a*). The base station 105-*a* may transmit the grant 210 on subframe index 9 of the first ten-subframe cycle (e.g., the subframe cycle 1405-*a*). The UE 115-*a* may also determine, based in part on the grant 210 being received on the subframe index 9 of the first ten-subframe cycle (e.g., the subframe cycle 1405-*a*), that the second subframe for transmitting the data 215 is at subframe index 4 of a second ten-subframe cycle (e.g., the subframe cycle 1405-*b*) subsequent to the first ten-subframe cycle (e.g., the subframe cycle 1405-*a*). For example, the UE 115-*a* may determine, by referencing Table A or Table C, that the second subframe for transmitting the data 215 is at subframe index 4 of the second ten-subframe cycle (e.g., the subframe cycle 1405-*b*) subsequent to the first ten-subframe cycle (e.g., the subframe cycle 1405-*a*). The UE 115-*a* may transmit the data 215 at subframe index 4 of the second ten-subframe cycle (e.g., the subframe cycle 1405-*b*), and the base station 105-*a* may receive the data 215 at subframe index 4 of the first ten-subframe cycle (e.g., the subframe cycle 1405-*b*).

The UE 115-*a* may determine, based in part on the data 215 being transmitted on the subframe index 4 of the second ten-subframe cycle (e.g., the subframe cycle 1405-*b*), that the third subframe for monitoring the feedback 220, from the base station 105-*a*, is at subframe index 9 of the second ten-subframe cycle (e.g., the subframe cycle 1405-*b*) subsequent to the first ten-subframe cycle (e.g., the subframe cycle 1405-*a*). For example, the UE 115-*a* may determine, by referencing Table B or Table D, that the third subframe for monitoring the feedback 220, from the base station 105-*a*, is at subframe index 9 of the second ten-subframe cycle (e.g., the subframe cycle 1405-*b*) subsequent to the first ten-subframe cycle (e.g., the subframe cycle 1405-*a*). The base station 105-*a* may transmit the feedback 220 at subframe index 4 of the second ten-subframe cycle (e.g., the subframe cycle 1405-*b*), and the UE 115-*a* may monitor and receive the feedback 220 at subframe index 4 of the second ten-subframe cycle (e.g., the subframe cycle 1405-*b*). Thus, the grant 210 received on the subframe index 9 may schedule the data 215 (e.g., PUSCH) on the subframe index 4. The transmission timeline pattern may repeat over subframe cycle 1405-*c* and subframe cycle 1405-*d*.

With reference to FIGS. 9 through 14, by identifying that the UE 115-*a* is a dynamic power sharing capable UE, the UE 115-*a* may identify, from the one or more combinations and based on the UE 115-*a* being a dynamic power sharing capable UE, that the UE 115-*a* is configured to receive the grant 210 on any one of a subframe index 1, 6, or 9 of a first ten-subframe cycle. The UE 115-*a* may also identify, from the one or more combinations and based on the UE 115-*a* being a dynamic power sharing capable UE, that the UE 115-*a* is configured or scheduled to transmit the data 215 on any one of a subframe index 7 of the first ten-subframe cycle or subframe index 2 or 3 of a second ten-subframe cycle subsequent to the first ten-subframe cycle. The UE 115-*a* may also identify, from the one or more combinations and based on the UE 115-*a* being a dynamic power sharing capable UE, that the UE 115-*a* is configured to monitor for the feedback 220 associated with transmission of the data 215 on any one of a subframe index 1, 6, or 9 of the second ten-subframe cycle.

In some examples, with reference to FIGS. 9 through 14, by identifying that the UE 115-*a* is a non-dynamic power sharing capable UE, the UE 115-*a* may identify, from the one or more combinations and based on the UE 115-*a* being a non-dynamic power sharing capable UE, that the UE 115-*a* is configured to receive the grant 210 on any one of a subframe index 1 or 6 of a first ten-subframe cycle when the DL-reference UL-DL configuration corresponds to a configuration index 2. The UE 115-*a* may also identify, from the one or more combinations and based on the UE 115-*a* being a non-dynamic power sharing capable UE, that the UE 115-*a* is configured or scheduled to transmit the data 215 on any one of a subframe index 7 of the first ten-subframe cycle or subframe index 2 of a second ten-subframe cycle subsequent to the first ten-subframe cycle when the DL-reference UL-DL configuration corresponds to a configuration index 2. The UE 115-*a* may also identify, from the one or more combinations and based on the UE 115-*a* being a non-dynamic power sharing capable UE, that the UE 115-*a* is configured to monitor for the feedback 220 associated with transmission of the data 215 on any one of a subframe index 1 or 6 of the second ten-subframe cycle when the DL-reference UL-DL configuration corresponds to a configuration index 2.

In some other examples, with reference to FIGS. 9 through 14, by identifying that the UE 115-*a* is a non-dynamic power sharing capable UE, the UE 115-*a* may identify, from the one or more combinations and based on the UE 115-*a* being a non-dynamic power sharing capable UE, that the UE 115-*a* is configured to receive the uplink grant on any one of a subframe index 6 or 9 of a first ten-subframe cycle when the DL-reference UL-DL configuration corresponds to a configuration index 4. The UE 115-*a* may also identify, from the one or more combinations and based on the UE 115-*a* being a non-dynamic power sharing capable UE, that the UE 115-*a* is configured or scheduled to transmit the uplink data on any one of a subframe index 2 or 3 of a second ten-subframe cycle subsequent to the first ten-subframe cycle when the DL-reference UL-DL configuration corresponds to a configuration index 4. The UE 115-*a* may also identify, from the one or more combinations and based on the UE 115-*a* being a non-dynamic power sharing capable UE, that the UE 115-*a* is configured to monitor for the feedback associated with transmission of the uplink data on any one of a subframe index 6 or 9 of the second ten-subframe cycle when the DL-reference UL-DL configuration corresponds to a configuration index 4.

In other examples, with reference to FIGS. 9 through 14, by identifying that the UE 115-*a* is a non-dynamic power sharing capable UE, the UE 115-*a* may identify, from the one or more combinations and based on the UE 115-*a* being a non-dynamic power sharing capable UE, that the UE 115-*a* is configured to receive the uplink grant on a subframe index 6 of a first ten-subframe cycle when the DL-reference UL-DL configuration corresponds to a configuration index 5. The UE 115-*a* may also identify, from the one or more combinations and based on the UE 115-*a* being a non-dynamic power sharing capable UE, that the UE 115-*a* is configured or scheduled to transmit the uplink data on subframe index 2 of a second ten-subframe cycle subsequent to the first ten-subframe cycle when the DL-reference UL-DL configuration corresponds to a configuration index 5. The UE 115-*a* may also identify, from the one or more combinations and based on the UE 115-*a* being a non-dynamic power sharing capable UE, that the UE 115-*a* is configured to monitor for the feedback associated with transmission of the uplink data on subframe index 6 of the second ten-subframe cycle when the DL-reference UL-DL configuration corresponds to a configuration index 5.

The base station 105-*a* may therefore configure the UE 115-*a* with a primary cell TDD UL-DL configuration and a DL-reference UL-DL configuration. The base station 105-*a* and the UE 115-*a* thus support one or more features for improvements to power consumption, spectral efficiency, higher data rates and, in some examples, may promote enhanced efficiency for multicast operations, among other benefits.

Figure 15:
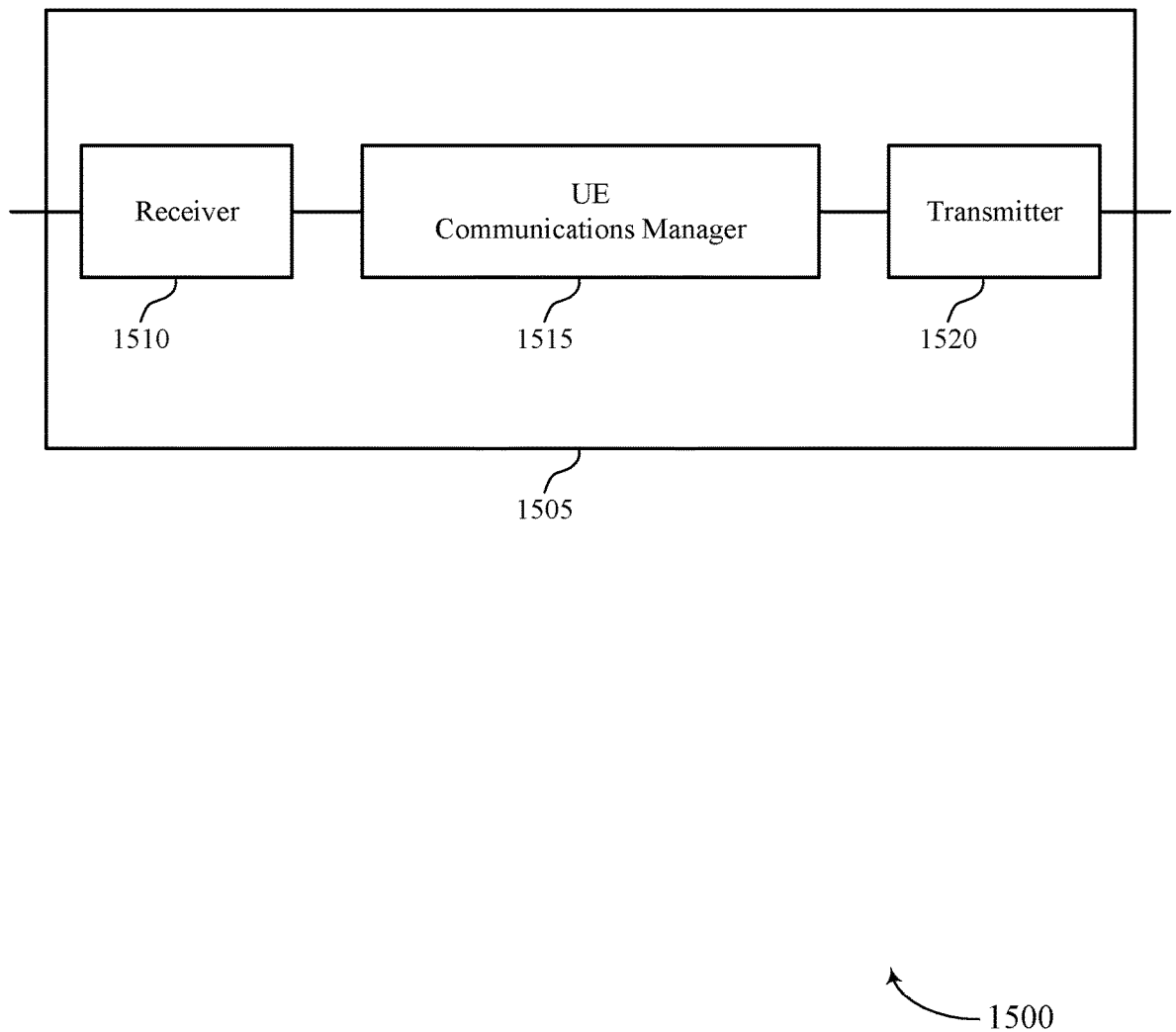
FIGS. 15 and 16 show block diagrams of devices that support uplink RTT for EN-DC in accordance with aspects of the present disclosure.

FIG. 15 shows a block diagram 1500 of a device 1505 that supports uplink RTT for EN-DC in accordance with aspects of the present disclosure. The device 1505 may be an example of aspects of a UE 115 as described herein. The device 1505 may include a receiver 1510, a UE communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to uplink RTT for EN-DC, etc.). Information may be passed on to other components of the device 1505. The receiver 1510 may be an example of aspects of the transceiver 1820 described with reference to FIG. 18. The receiver 1510 may utilize a single antenna or a set of antennas.

The UE communications manager 1515 may receive, from a base station and while operating in a dual connectivity mode, an uplink grant in a first subframe of a set of subframes, the uplink grant scheduling transmission of uplink data, determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, and communicate with the base station in accordance with the transmission timelines. In some cases, the configuration index 0 and the configuration index 6 both include an uplink-to-downlink subframe ratio that is greater than or equal to one. The UE communications manager 1515 may be an example of aspects of the UE communications manager 1810 described herein.

The UE communications manager 1515 may enable to the device 1505 to communicate with a base station in accordance with transmission timelines corresponding to one or more combinations of a primary cell TDD UL-DL configuration and a DL-reference UL-DL configuration. In some implementations, the primary cell TDD UL-DL configuration corresponds to a configuration index 0 or a configuration index 6 and the DL-reference configuration corresponds to one of a configuration index 2, a configuration index 4, or a configuration index 5. Based on implementing the one or more combinations, one or more processors of the device 1505 (for example, processor(s) controlling or incorporated with the UE communications manager 1515) may experience reduced power consumption and promote enhanced efficiency for high reliability and low latency communication operations, among other benefits.

The UE communications manager 1515, or its sub-components, may be implemented in hardware, code (e.g., software or firmware) executed by a processor, or any combination thereof. If implemented in code executed by a processor, the functions of the UE communications manager 1515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 1515, or its sub-components, may be physically located at various positions, including being distributed such that portions of functions are implemented at different physical locations by one or more physical components. In some examples, the UE communications manager 1515, or its sub-components, may be a separate and distinct component in accordance with various aspects of the present disclosure. In some examples, the UE communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
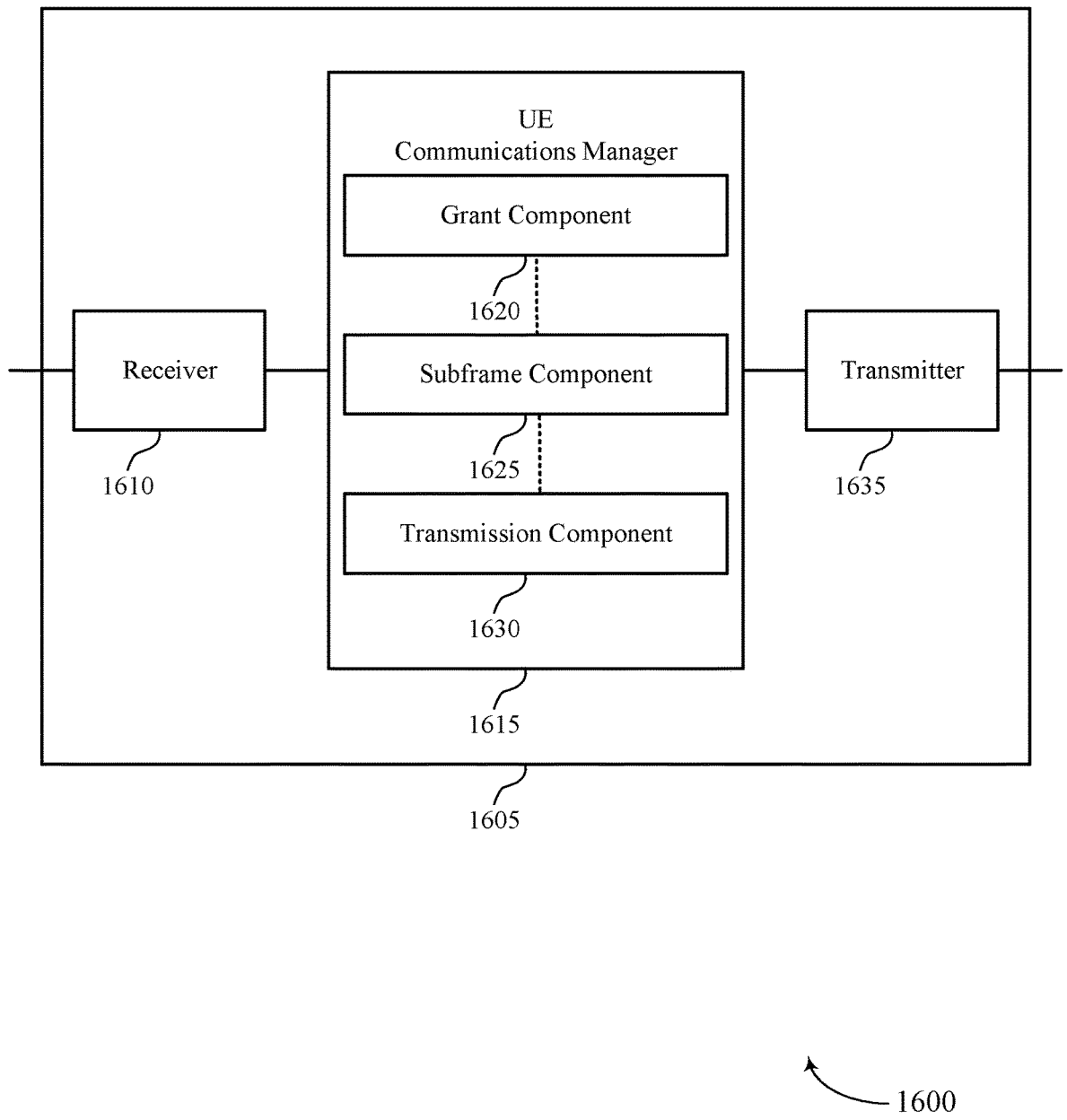

FIG. 16 shows a block diagram 1600 of a device 1605 that supports uplink RTT for EN-DC in accordance with aspects of the present disclosure. The device 1605 may be an example of aspects of a device 1505, or a UE 115 as described herein. The device 1605 may include a receiver 1610, a UE communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to uplink RTT for EN-DC, etc.). Information may be passed on to other components of the device 1605. The receiver 1610 may be an example of aspects of the transceiver 1820 described with reference to FIG. 18. The receiver 1610 may utilize a single antenna or a set of antennas.

The UE communications manager 1615 may be an example of aspects of the UE communications manager 1515 as described herein. The UE communications manager 1615 may include a grant component 1620, a subframe component 1625, and a transmission component 1630. The UE communications manager 1615 may be an example of aspects of the UE communications manager 1810 described herein.

The grant component 1620 may receive, from a base station and while operating in a dual connectivity mode, an uplink grant in a first subframe of a set of subframes, the uplink grant scheduling transmission of uplink data. The subframe component 1625 may determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle. In some cases, the configuration index 0 and the configuration index 6 both include an uplink-to-downlink subframe ratio that is greater than or equal to one. The transmission component 1630 may communicate with the base station in accordance with the transmission timelines.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
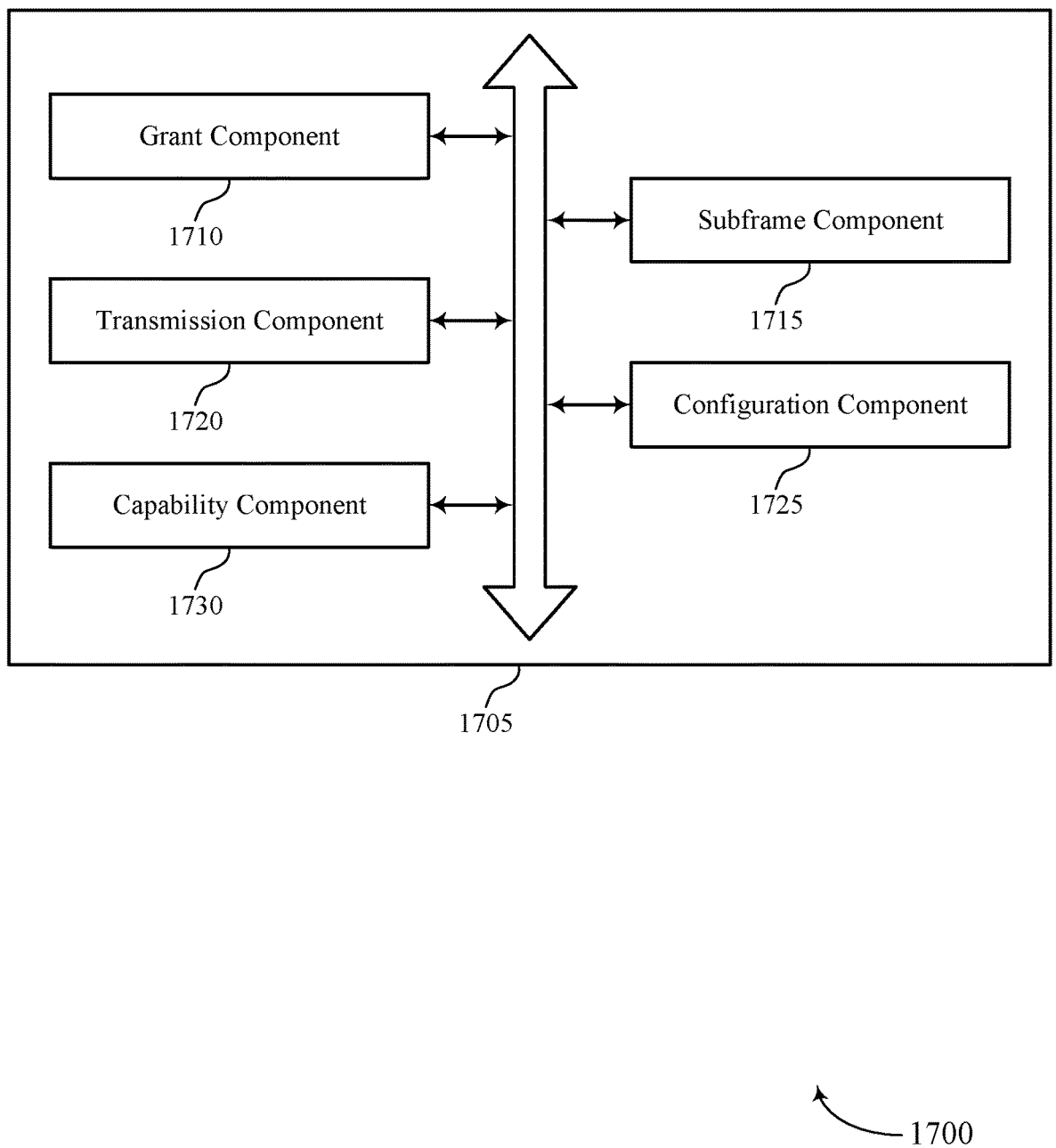
FIG. 17 shows a block diagram of a UE communications manager that supports uplink RTT for EN-DC in accordance with aspects of the present disclosure.

FIG. 17 shows a block diagram 1700 of a UE communications manager 1705 that supports uplink RTT for EN-DC in accordance with aspects of the present disclosure. The UE communications manager 1705 may be an example of aspects of a UE communications manager 1515, a UE communications manager 1615, or a UE communications manager 1810 described herein. The UE communications manager 1705 may include a grant component 1710, a subframe component 1715, a transmission component 1720, a configuration component 1725, and a capability component 1730. Each of these modules may communicate, directly or indirectly, with one another (e.g., via one or more buses).

The grant component 1710 may receive, from a base station and while operating in a dual connectivity mode, an uplink grant in a first subframe of a set of subframes, the uplink grant scheduling transmission of uplink data. In some cases, an uplink index field in the uplink grant includes an uplink downlink assignment index. In some cases, an uplink index field in the uplink grant includes one or more static bit values.

The subframe component 1715 may determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle. In some cases, the configuration index 0 and the configuration index 6 both include an uplink-to-downlink subframe ratio that is greater than or equal to one. In some cases, the uplink-to-downlink ratio of the configuration index 0 and the configuration index 6 may be different than an uplink-to-downlink ratio of a configuration index ranging from 1 to 5. In some examples, the subframe component 1715 may identify that the uplink grant is received on subframe index 0 of a first ten-subframe cycle. In some examples, the subframe component 1715 may determine, based on the uplink grant being received on subframe index 0 of the first ten-subframe cycle, that the second subframe for transmitting the uplink data is at subframe index 4 of the first ten-subframe cycle.

In some examples, the subframe component 1715 may determine, based on the uplink data being transmitted on subframe index 4 of the first ten-subframe cycle, that the third subframe for monitoring the feedback is at subframe index 0 of a second ten-subframe cycle subsequent to the first ten-subframe cycle. In some examples, the subframe component 1715 may identify that the uplink grant is received on subframe index 1 of a first ten-subframe cycle. In some examples, the subframe component 1715 may determine, based on the uplink grant being received on subframe index 1 of the first ten-subframe cycle, that the second subframe for transmitting the uplink data is at subframe index 7 of the first ten-subframe cycle. In some examples, the subframe component 1715 may determine, based on the uplink data being transmitted on subframe index 7 of the first ten-subframe cycle, that the third subframe for monitoring the feedback is at subframe index 1 of a second ten-subframe cycle subsequent to the first ten-subframe cycle.

In some examples, the subframe component 1715 may determine, based on the uplink grant being received on subframe index 1 of the first ten-subframe cycle and on a value of an uplink index field in the uplink grant, that the second subframe for transmitting the uplink data is either at subframe index 7 or subframe index 8 of the first ten-subframe cycle. In some examples, the subframe component 1715 may determine, based on the uplink data being transmitted on subframe index 7 or subframe index 8 of the first ten-subframe cycle, that the third subframe for monitoring the feedback is at either subframe index 1 or subframe index 5 of a second ten-subframe cycle subsequent to the first ten-subframe cycle.

In some examples, the subframe component 1715 may identify that the uplink grant is received on subframe index 5 of a first ten-subframe cycle. In some examples, the subframe component 1715 may determine, based on the uplink grant being received on subframe index 5 of the first ten-subframe cycle, that the second subframe for transmitting the uplink data is at subframe index 9 of the first ten-subframe cycle. In some examples, the subframe component 1715 may determine, based on the uplink data being transmitted on subframe index 9 of the first ten-subframe cycle, that the third subframe for monitoring the feedback is at subframe index 5 of a second ten-subframe cycle subsequent to the first ten-subframe cycle.

In some examples, the subframe component 1715 may identify that the uplink grant is received on subframe index 6 of a first ten-subframe cycle. In some examples, the subframe component 1715 may determine, based on the uplink grant being received on subframe index 6 of the first ten-subframe cycle, that the second subframe for transmitting the uplink data is at subframe index 2 of a second ten-subframe cycle subsequent to the first ten-subframe cycle. In some examples, the subframe component 1715 may determine, based on the uplink data being transmitted on subframe index 2 of the first ten-subframe cycle, that the third subframe for monitoring the feedback is at subframe index 6 of the second ten-subframe cycle subsequent.

In some examples, the subframe component 1715 may determine, based on the uplink grant being received on subframe index 6 of the first ten-subframe cycle and on a value of an uplink index field in the uplink grant, that the second subframe for transmitting the uplink data is either at subframe index 2 or subframe index 3 of a second ten-subframe cycle subsequent to the first ten-subframe cycle. In some examples, the subframe component 1715 may determine, based on the uplink data being transmitted on either subframe index 2 or subframe index 3 of the second ten-subframe cycle, that the third subframe for monitoring the feedback is either at subframe index 6 or at subframe index 0 of a third ten-subframe cycle subsequent to the second ten-subframe cycle.

In some examples, the subframe component 1715 may determine, based on the uplink data being transmitted on subframe index 2 of the first ten-subframe cycle, that the third subframe for monitoring the feedback is at subframe index 6 of a second ten-subframe cycle subsequent to the first ten-subframe cycle. In some examples, the subframe component 1715 may identify that the uplink grant is received on subframe index 9 of a first ten-subframe cycle. In some examples, the subframe component 1715 may determine, based on the uplink grant being received on subframe index 9 of the first ten-subframe cycle, that the second subframe for transmitting the uplink data is at subframe index 3 of a second ten-subframe cycle subsequent to the first ten-subframe cycle. In some examples, the subframe component 1715 may determine, based on the uplink data being transmitted on subframe index 3 of the second ten-subframe cycle, that the third subframe for monitoring the feedback is at subframe index 9 of the second ten-subframe cycle.

The transmission component 1720 may communicate with the base station in accordance with the transmission timelines. In some examples, the transmission component 1720 may identify, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9.

The configuration component 1725 may identify that the primary cell TDD UL-DL configuration corresponds to the configuration index 0. In some examples, the configuration component 1725 may identify that the DL-reference UL-DL configuration corresponds to one of a configuration index 2, a configuration index 4, or a configuration index 5. In some examples, the configuration component 1725 may identify that the primary cell TDD UL-DL configuration corresponds to the configuration index 6. The capability component 1730 may identify that the UE is a dynamic power sharing capable UE.

In some examples, the capability component 1730 may identify, from the combinations and based on the UE being a dynamic power sharing capable UE, that the UE is configured to receive the uplink grant on any one of a subframe index 0, 1, 5, or 6 of a first ten-subframe cycle. In some examples, the capability component 1730 may identify, from the combinations, that the UE is configured to transmit the uplink data on any one of a subframe index 4, 7, or 9 of the first ten-subframe cycle or subframe index 2 of a second ten-subframe cycle subsequent to the first ten-subframe cycle. In some examples, the capability component 1730 may identify, from the combinations, that the UE is configured to monitor for the feedback associated with transmission of the uplink data on any one of a subframe index 0, 1, 5, or 6 of the second ten-subframe cycle.

In some examples, the capability component 1730 may identify that the UE is a non-dynamic power sharing capable UE. In some examples, the capability component 1730 may identify, from the combinations and based on the UE being a non-dynamic power sharing capable UE, that the UE is configured to receive the uplink grant on any one of a subframe index 1 or 6 of a first ten-subframe cycle when the DL-reference UL-DL configuration corresponds to a configuration index 2. In some examples, the capability component 1730 may identify, from the combinations, that the UE is configured to transmit the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2. In some examples, the capability component 1730 may identify, from the combinations, that the UE is configured to monitor for the feedback associated with transmission of the uplink data on any one of a subframe index 1 or 6 of the second ten-subframe cycle when the DL-reference UL-DL configuration corresponds to the configuration index 2.

In some examples, the capability component 1730 may identify, from the combinations and based on the UE being a non-dynamic power sharing capable UE, that the UE is configured to receive the uplink grant on a subframe index 6 of a first ten-subframe cycle when the DL-reference UL-DL configuration corresponds to a configuration index 4 or 5. In some examples, the capability component 1730 may identify, from the combinations, that the UE is configured to transmit the uplink data on subframe index 2 of a second ten-subframe cycle subsequent to the first ten-subframe cycle when the DL-reference UL-DL configuration corresponds to the configuration index 4 or 5. In some examples, the capability component 1730 may identify, from the combinations, that the UE is configured to monitor for the feedback associated with transmission of the uplink data on subframe index 6 of the second ten-subframe cycle when the DL-reference UL-DL configuration corresponds to the configuration index 4 or 5.

In some examples, the capability component 1730 may identify, from the combinations and based on the UE being a dynamic power sharing capable UE, that the UE is configured to receive the uplink grant on any one of a subframe index 1, 6, or 9 of a first ten-subframe cycle. In some examples, the capability component 1730 may identify, from the combinations, that the UE is configured to transmit the uplink data on any one of a subframe index 7 of the first ten-subframe cycle or subframe index 2 or 3 of a second ten-subframe cycle subsequent to the first ten-subframe cycle. In some examples, the capability component 1730 may identify, from the combinations, that the UE is configured to monitor for the feedback associated with transmission of the uplink data on any one of a subframe index 1, 6, or 9 of the second ten-subframe cycle.

In some examples, the capability component 1730 may identify, from the combinations and based on the UE being a non-dynamic power sharing capable UE, that the UE is configured to receive the uplink grant on any one of a subframe index 6 or 9 of a first ten-subframe cycle when the DL-reference UL-DL configuration corresponds to a configuration index 4. In some examples, the capability component 1730 may identify, from the combinations, that the UE is configured to transmit the uplink data on any one of a subframe index 2 or 3 of a second ten-subframe cycle subsequent to the first ten-subframe cycle when the DL-reference UL-DL configuration corresponds to the configuration index 4. In some examples, the capability component 1730 may identify, from the combinations, that the UE is configured to monitor for the feedback associated with transmission of the uplink data on any one of a subframe index 6 or 9 of the second ten-subframe cycle when the DL-reference UL-DL configuration corresponds to the configuration index 4.

In some examples, the capability component 1730 may identify, from the combinations and based on the UE being a non-dynamic power sharing capable UE, that the UE is configured to receive the uplink grant on a subframe index 6 of a first ten-subframe cycle when the DL-reference UL-DL configuration corresponds to a configuration index 5. In some examples, the capability component 1730 may identify, from the combinations, that the UE is configured to transmit the uplink data on subframe index 2 of a second ten-subframe cycle subsequent to the first ten-subframe cycle when the DL-reference UL-DL configuration corresponds to the configuration index 5. In some examples, the capability component 1730 may identify, from the combinations, that the UE is configured to monitor for the feedback associated with transmission of the uplink data on subframe index 6 of the second ten-subframe cycle when the DL-reference UL-DL configuration corresponds to the configuration index 5.

In some examples, the capability component 1730 may identify a dynamic power sharing capability of the UE. In some examples, the capability component 1730 may transmit, to the base station, UE capability information including an indication of the dynamic power sharing capability of the UE. In some examples, the capability component 1730 may receive, via signaling from the base station, an indication of the primary cell TDD UL-DL configuration and the DL-reference UL-DL configuration based on the UE capability information. In some cases, the signaling includes UE specific radio resource control signaling. In some cases, the signaling includes a dynamic control signaling. In some cases, the dynamic control signaling includes downlink control information.

Figure 18:
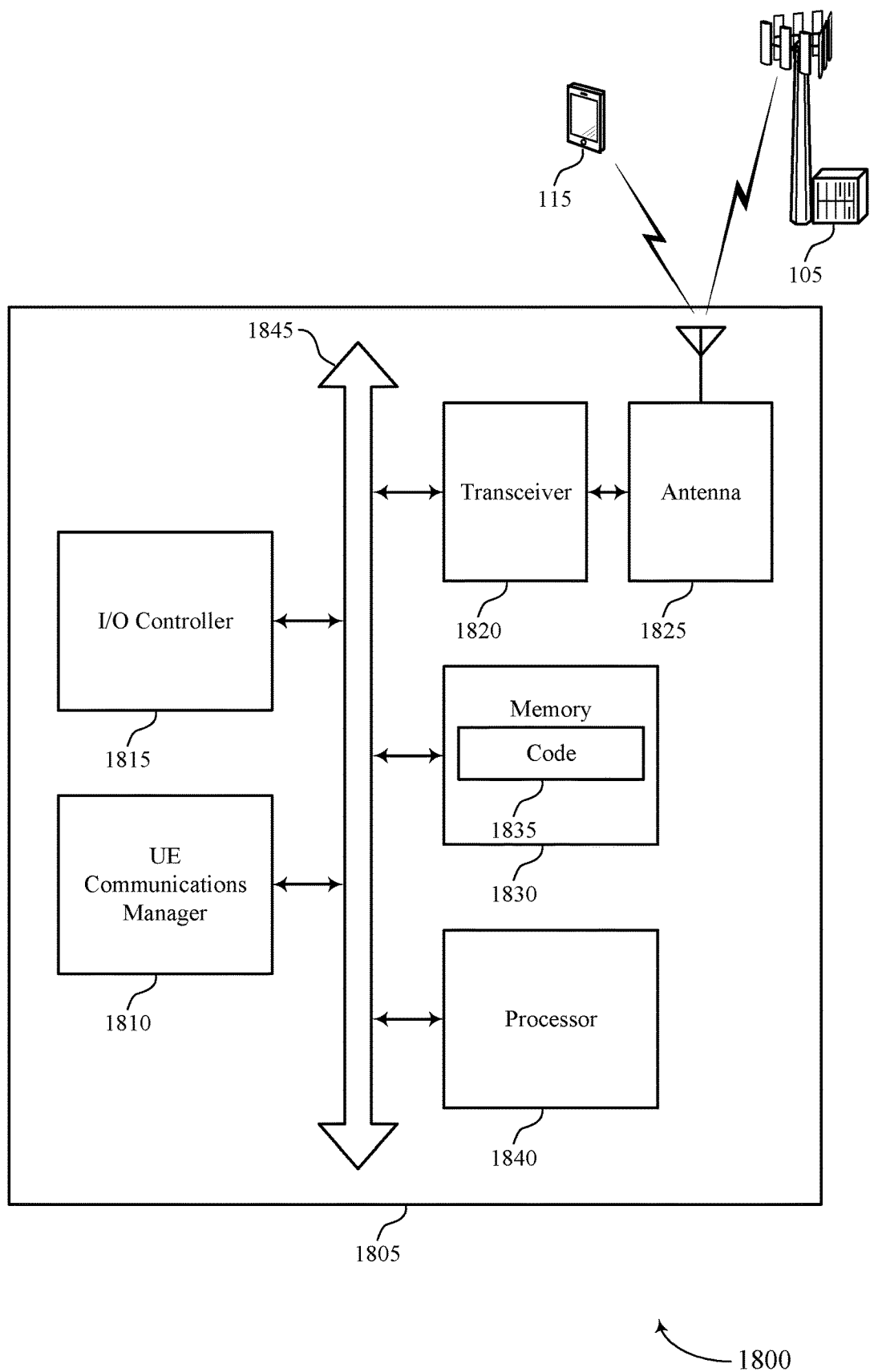
FIG. 18 shows a diagram of a system including a device that supports uplink RTT for EN-DC in accordance with aspects of the present disclosure.

FIG. 18 shows a diagram of a system 1800 including a device 1805 that supports uplink RTT for EN-DC in accordance with aspects of the present disclosure. The device 1805 may be an example of or include the components of device 1505, device 1605, or a UE 115 as described herein. The device 1805 may include components for bi-directional voice and data communications including components for transmitting and receiving communications, including a UE communications manager 1810, an I/O controller 1815, a transceiver 1820, an antenna 1825, memory 1830, and a processor 1840. These components may be in electronic communication via one or more buses (e.g., bus 1845).

The UE communications manager 1810 may receive, from a base station and while operating in a dual connectivity mode, an uplink grant in a first subframe of a set of subframes, the uplink grant scheduling transmission of uplink data, determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, and communicate with the base station in accordance with the transmission timelines. In some cases, the configuration index 0 and the configuration index 6 both include an uplink-to-downlink subframe ratio that is greater than or equal to one.

The UE communications manager 1810 may enable the device 1805 to communicate with a base station in accordance with transmission timelines corresponding to one or more combinations of a primary cell TDD UL-DL configuration and a DL-reference UL-DL configuration. In some implementations, the primary cell TDD UL-DL configuration corresponds to a configuration index 0 or a configuration index 6 and the DL-reference configuration corresponds to one of a configuration index 2, a configuration index 4, or a configuration index 5. Based on implementing the one or more combinations, one or more processors of the device 1805 (for example, processor(s) controlling or incorporated with the UE communications manager 1810) may experience reduced power consumption and promote enhanced efficiency for high reliability and low latency communication operations, among other benefits.

The I/O controller 1815 may manage input and output signals for the device 1805. The I/O controller 1815 may also manage peripherals not integrated into the device 1805. In some cases, the I/O controller 1815 may represent a physical connection or port to an external peripheral. In some cases, the I/O controller 1815 may utilize an operating system such as iOS®, ANDROID®, MS-DOS®, MS-WINDOWS®, OS/2®, UNIX®, LINUX®, or another known operating system. In other cases, the I/O controller 1815 may represent or interact with a modem, a keyboard, a mouse, a touchscreen, or a similar device. In some cases, the I/O controller 1815 may be implemented as part of a processor. In some cases, a user may interact with the device 1805 via the I/O controller 1815 or via hardware components controlled by the I/O controller 1815.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas. In some cases, the device 1805 may include a single antenna 1825. However, in some cases, the device 1805 may have more than one antenna 1825, which may be capable of concurrently transmitting or receiving multiple wireless transmissions.

The memory 1830 may include random-access memory (RAM) and read-only memory (ROM). The memory 1830 may store computer-readable, computer-executable code 1835 including instructions that, when executed, cause the processor to perform various functions described herein. In some cases, the memory 1830 may contain, among other things, a basic input/output system (BIOS) which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting uplink RTT for EN-DC).

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
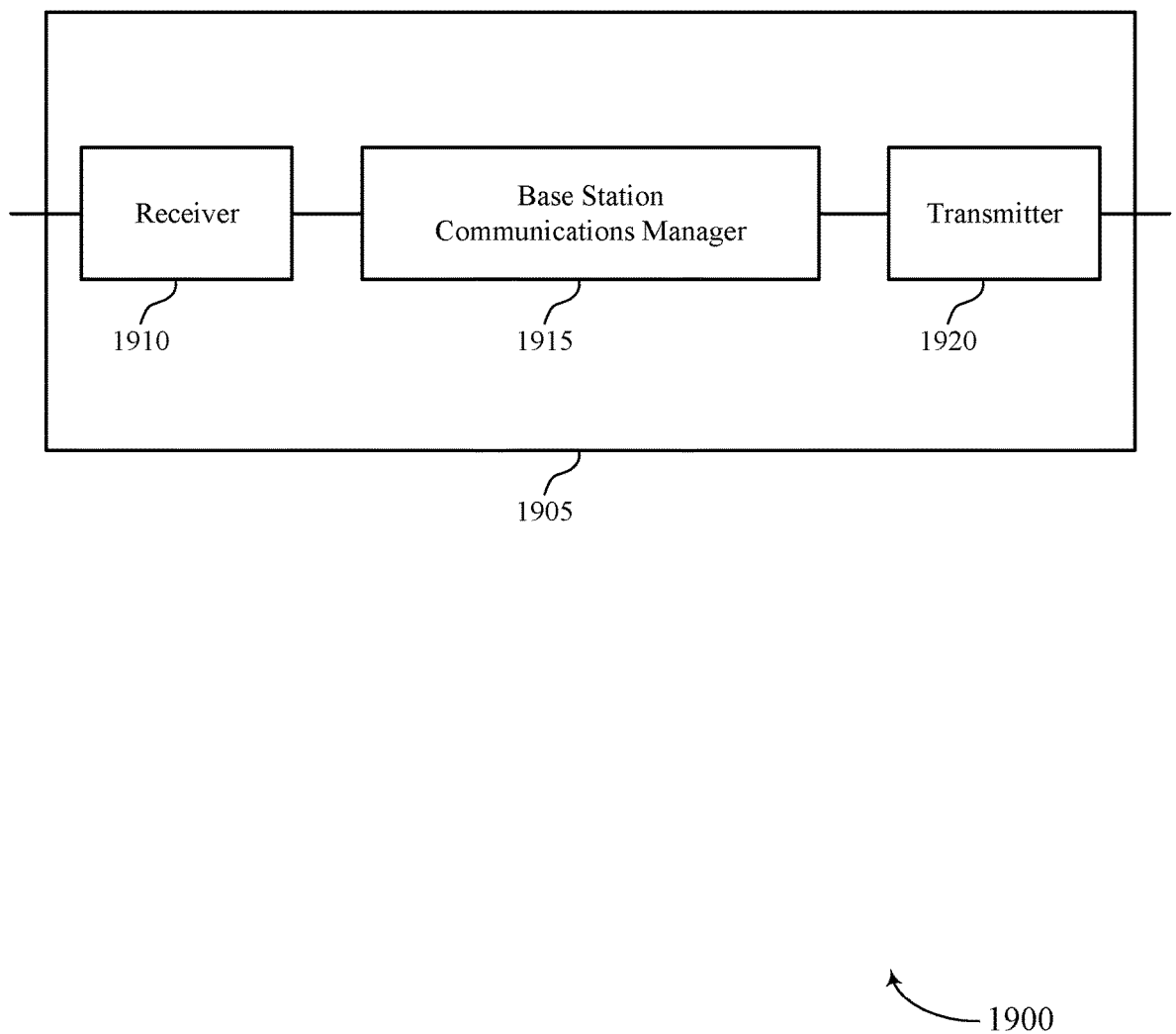
FIGS. 19 and 20 show block diagrams of devices that support uplink RTT for EN-DC in accordance with aspects of the present disclosure.

FIG. 19 shows a block diagram 1900 of a device 1905 that supports uplink RTT for EN-DC in accordance with aspects of the present disclosure. The device 1905 may be an example of aspects of a base station 105 as described herein. The device 1905 may include a receiver 1910, a base station communications manager 1915, and a transmitter 1920. The device 1905 may also include a processor. Each of these components may be in communication with one another (e.g., via one or more buses).

The receiver 1910 may receive information such as packets, user data, or control information associated with various information channels (e.g., control channels, data channels, and information related to uplink RTT for EN-DC, etc.). Information may be passed on to other components of the device 1905. The receiver 1910 may be an example of aspects of the transceiver 2220 described with reference to FIG. 22. The receiver 1910 may utilize a single antenna or a set of antennas.

The base station communications manager 1915 may configure a UE with a primary cell TDD UL-DL configuration corresponding to a configuration index 0 or a configuration index 6 and a DL-reference UL-DL configuration, transmit, to the UE, an uplink grant in a first subframe of a set of subframes, the uplink grant scheduling transmission of uplink data, determine a second subframe of the set of subframes to receive the uplink data and a third subframe of the set of subframes to transmit feedback associated with reception of the uplink data, the second subframe and the third subframe being determined based on combinations of the primary cell TDD UL-DL configuration and the DL-reference UL-DL configuration, the combinations corresponding to transmission timelines, each of the combinations having at least three uplink transmission subframes or three downlink monitoring subframes within a ten-subframe cycle, and communicate with the UE in accordance with the transmission timelines. In some cases, the configuration index 0 and the configuration index 6 both include an uplink-to-downlink subframe ratio that is greater than or equal to one. The base station communications manager 1915 may be an example of aspects of the base station communications manager 2210 described herein.

The base station communications manager 1915, or its sub-components, may be implemented in hardware, code (e.g., software or firmware) executed by a processor, or any combination thereof. If implemented in code executed by a processor, the functions of the base station communications manager 1915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1915, or its sub-components, may be physically located at various positions, including being distributed such that portions of functions are implemented at different physical locations by one or more physical components. In some examples, the base station communications manager 1915, or its sub-components, may be a separate and distinct component in accordance with various aspects of the present disclosure. In some examples, the base station communications manager 1915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1920 may transmit signals generated by other components of the device 1905. In some examples, the transmitter 1920 may be collocated with a receiver 1910 in a transceiver module. For example, the transmitter 1920 may be an example of aspects of the transceiver 2220 described with reference to FIG. 22. The transmitter 1920 may utilize a single antenna or a set of antennas.

Figure 20:
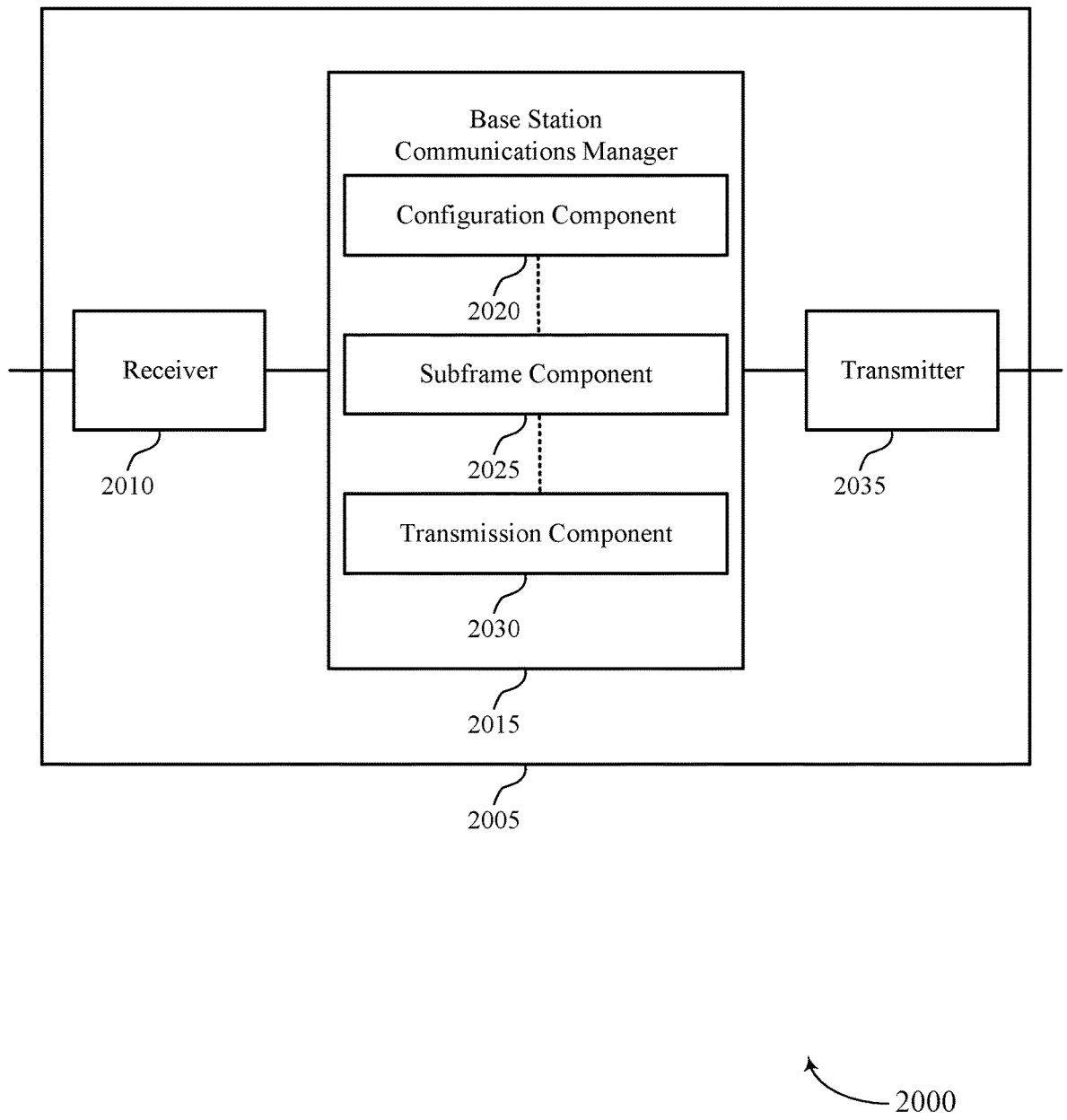

FIG. 20 shows a block diagram 2000 of a device 2005 that supports uplink RTT for EN-DC in accordance with aspects of the present disclosure. The device 2005 may be an example of aspects of a device 1905, or a base station 105 as described herein. The device 2005 may include a receiver 2010, a base station communications manager 2015, and a transmitter 2035. The device 2005 may also include a processor. Each of these components may be in communication with one another (e.g., via one or more buses).

The receiver 2010 may receive information such as packets, user data, or control information associated with various information channels (e.g., control channels, data channels, and information related to uplink RTT for EN-DC, etc.). Information may be passed on to other components of the device 2005. The receiver 2010 may be an example of aspects of the transceiver 2220 described with reference to FIG. 22. The receiver 2010 may utilize a single antenna or a set of antennas.

The base station communications manager 2015 may be an example of aspects of the base station communications manager 1915 as described herein. The base station communications manager 2015 may include a configuration component 2020, a subframe component 2025, and a transmission component 2030. The base station communications manager 2015 may be an example of aspects of the base station communications manager 2210 described herein.

The configuration component 2020 may configure a UE with a primary cell TDD UL-DL configuration corresponding to a configuration index 0 or a configuration index 6 and a DL-reference UL-DL configuration. The subframe component 2025 may transmit, to the UE, an uplink grant in a first subframe of a set of subframes, the uplink grant scheduling transmission of uplink data and determine a second subframe of the set of subframes to receive the uplink data and a third subframe of the set of subframes to transmit feedback associated with reception of the uplink data, the second subframe and the third subframe being determined based on combinations of the primary cell TDD UL-DL configuration and the DL-reference UL-DL configuration, the combinations corresponding to transmission timelines, each of the combinations having at least three uplink transmission subframes or three downlink monitoring subframes within a ten-subframe cycle. The transmission component 2030 may communicate with the UE in accordance with the transmission timelines. In some cases, the configuration index 0 and the configuration index 6 both include an uplink-to-downlink subframe ratio that is greater than or equal to one.

The transmitter 2035 may transmit signals generated by other components of the device 2005. In some examples, the transmitter 2035 may be collocated with a receiver 2010 in a transceiver module. For example, the transmitter 2035 may be an example of aspects of the transceiver 2220 described with reference to FIG. 22. The transmitter 2035 may utilize a single antenna or a set of antennas.

Figure 21:
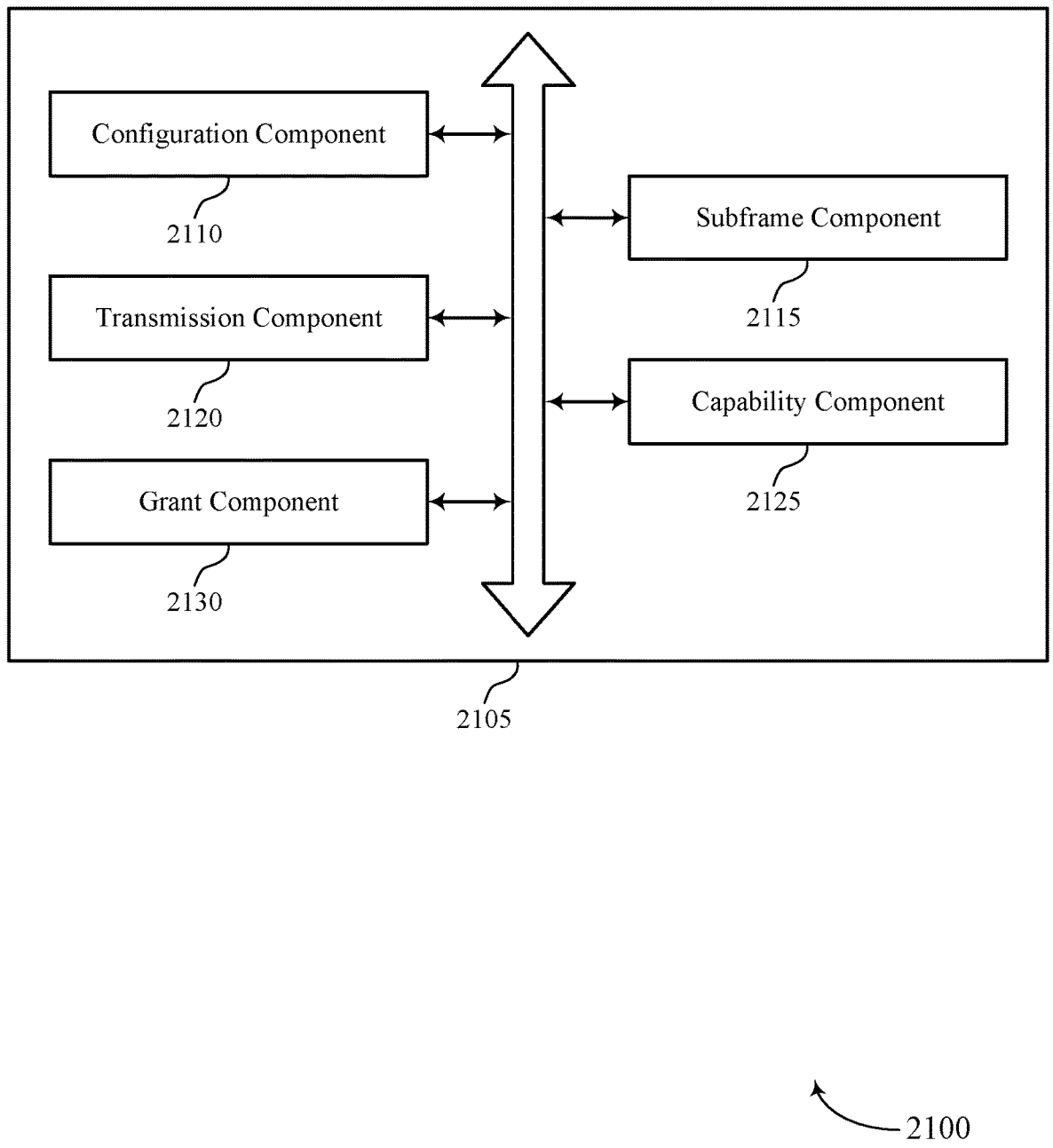
FIG. 21 shows a block diagram of a base station communications manager that supports uplink RTT for EN-DC in accordance with aspects of the present disclosure.

FIG. 21 shows a block diagram 2100 of a base station communications manager 2105 that supports uplink RTT for EN-DC in accordance with aspects of the present disclosure. The base station communications manager 2105 may be an example of aspects of a base station communications manager 1915, a base station communications manager 2015, or a base station communications manager 2210 described herein. The base station communications manager 2105 may include a configuration component 2110, a subframe component 2115, a transmission component 2120, a capability component 2125, and a grant component 2130. Each of these modules may communicate, directly or indirectly, with one another (e.g., via one or more buses).

The configuration component 2110 may configure a UE with a primary cell TDD UL-DL configuration and a DL-reference UL-DL configuration. In some examples, the configuration component 2110 may identify that the primary cell TDD UL-DL configuration corresponds to a configuration index 0. In some examples, the configuration component 2110 may identify that the DL-reference uplink-downlink configuration corresponds to one of a configuration index 2, a configuration index 4, or a configuration index 5. In some examples, the configuration component 2110 may identify that the primary cell TDD uplink-downlink configuration corresponds to a configuration index 6.

The subframe component 2115 may transmit, to the UE, an uplink grant in a first subframe of a set of subframes, the uplink grant scheduling transmission of uplink data. In some examples, the subframe component 2115 may determine a second subframe of the set of subframes to receive the uplink data and a third subframe of the set of subframes to transmit feedback associated with reception of the uplink data, the second subframe and the third subframe being determined based on combinations of the primary cell TDD UL-DL configuration and the DL-reference UL-DL configuration, the combinations corresponding to transmission timelines, each of the combinations having at least three uplink transmission subframes or three downlink monitoring subframes within a ten-subframe cycle. In some examples, the subframe component 2115 may identify that the uplink grant is transmitted on subframe index 0 of a first ten-subframe cycle.

In some examples, the subframe component 2115 may determine, based on the uplink grant being transmitted on subframe index 0 of the first ten-subframe cycle, that the second subframe for receiving the uplink data is at subframe index 4 of the first ten-subframe cycle. In some examples, the subframe component 2115 may determine, based on the uplink data being received on subframe index 4 of the first ten-subframe cycle, that the third subframe for transmitting the feedback is at subframe index 0 of a second ten-subframe cycle subsequent to the first ten-subframe cycle. In some cases, the configuration index 0 and the configuration index 6 both include an uplink-to-downlink subframe ratio that is greater than or equal to one. In some cases, the uplink-to-downlink ratio of the configuration index 0 and the configuration index 6 may be different than an uplink-to-downlink ratio of a configuration index ranging from 1 to 5.

In some examples, the subframe component 2115 may identify that the uplink grant is transmitted on subframe index 1 of a first ten-subframe cycle. In some examples, the subframe component 2115 may determine, based on the uplink grant being transmitted on subframe index 1 of the first ten-subframe cycle, that the second subframe for receiving the uplink data is at subframe index 7 of the first ten-subframe cycle. In some examples, the subframe component 2115 may determine, based on the uplink data being received on subframe index 7 of the first ten-subframe cycle, that the third subframe for transmitting the feedback is at subframe index 1 of a second ten-subframe cycle subsequent to the first ten-subframe cycle. In some examples, the subframe component 2115 may determine, based on the uplink grant being transmitted on subframe index 1 of the first ten-subframe cycle and on a value of an uplink index field in the uplink grant, that the second subframe for receiving the uplink data is either at subframe index 7 or subframe index 8 of the first ten-subframe cycle.

In some examples, the subframe component 2115 may determine, based on the uplink data being received on subframe index 1 or subframe index 8 of the first ten-subframe cycle, that the third subframe for transmitting the feedback is at subframe index 1 or subframe index 5 of a second ten-subframe cycle subsequent to the first ten-subframe cycle. In some examples, the subframe component 2115 may identify that the uplink grant is transmitted on subframe index 5 of a first ten-subframe cycle. In some examples, the subframe component 2115 may determine, based on the uplink grant being transmitted on subframe index 5 of the first ten-subframe cycle, that the second subframe for receiving the uplink data is at subframe index 9 of the first ten-subframe cycle. In some examples, the subframe component 2115 may determine, based on the uplink data being received on subframe index 9 of the first ten-subframe cycle, that the third subframe for transmitting the feedback is at subframe index 5 of a second ten-subframe cycle subsequent to the first ten-subframe cycle.

In some examples, the subframe component 2115 may identify that the uplink grant is transmitted on subframe index 6 of a first ten-subframe cycle. In some examples, the subframe component 2115 may determine, based on the uplink grant being transmitted on subframe index 6 of the first ten-subframe cycle, that the second subframe for receiving the uplink data is at subframe index 2 of the first ten-subframe cycle. In some examples, the subframe component 2115 may determine, based on the uplink data being received on subframe index 2 of the first ten-subframe cycle, that the third subframe for transmitting the feedback is at subframe index 6 of a second ten-subframe cycle subsequent to the first ten-subframe cycle. In some examples, the subframe component 2115 may determine, based on the uplink grant being transmitted on subframe index 6 of the first ten-subframe cycle, that the second subframe for receiving the uplink data is at subframe index 2 of a second ten-subframe cycle subsequent to the first ten-subframe cycle.

In some examples, the subframe component 2115 may identify that the uplink grant is transmitted on subframe index 9 of a first ten-subframe cycle. In some examples, the subframe component 2115 may determine, based on the uplink grant being transmitted on subframe index 9 of the first ten-subframe cycle, that the second subframe for receiving the uplink data is at subframe index 3 of a second ten-subframe cycle subsequent to the first ten-subframe cycle. In some examples, the subframe component 2115 may determine, based on the uplink data being received on subframe index 3 of the second ten-subframe cycle, that the third subframe for retransmitting the feedback is at subframe index 9 of the second ten-subframe cycle.

The transmission component 2120 may communicate with the UE in accordance with the transmission timelines. In some examples, the transmission component 2120 may identify, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9. The capability component 2125 may identify that the UE is a dynamic power sharing capable UE.

In some examples, the capability component 2125 may identify, from the combinations and based on the UE being a dynamic power sharing capable UE, that the base station is configured to transmit the uplink grant on any one of a subframe index 0, 1, 5, or 6 of a first ten-subframe cycle. In some examples, the capability component 2125 may identify, from the combinations, that the base station is configured to receive the uplink data on any one of a subframe index 4, 7, or 9 of the first ten-subframe cycle or subframe index 2 of a second ten-subframe cycle subsequent to the first ten-subframe cycle. In some examples, the capability component 2125 may identify, from the combinations, that the base station is configured to transmit the feedback associated with reception of the uplink data on any one of a subframe index 0, 1, 5, or 6 of the second ten-subframe cycle.

In some examples, the capability component 2125 may identify that the UE is a non-dynamic power sharing capable UE. In some examples, the capability component 2125 may identify, from the combinations and based on the UE being a non-dynamic power sharing capable UE, that the base station is configured to transmit the uplink grant on any one of a subframe index 1, or 6 of a first ten-subframe cycle when the DL-reference UL-DL configuration corresponds to a configuration index 2. In some examples, the capability component 2125 may identify, from the combinations, that the base station is configured to receive the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2. In some examples, the capability component 2125 may identify, from the combinations, that the base station is configured to transmit the feedback associated with transmission of the uplink data on any one of a subframe index 1 or 6 of the second ten-subframe cycle when the DL-reference UL-DL configuration corresponds to the configuration index 2.

In some examples, the capability component 2125 may identify, from the combinations and based on the UE being a non-dynamic power sharing capable UE, that the base station is configured to transmit the uplink grant on a subframe index 6 of a first ten-subframe cycle when the DL-reference UL-DL configuration corresponds to a configuration index 4 or 5. In some examples, the capability component 2125 may identify, from the combinations, that the base station is configured to receive the uplink data on subframe index 2 of a second ten-subframe cycle subsequent to the first ten-subframe cycle when the DL-reference UL-DL configuration corresponds to the configuration index 4 or 5. In some examples, the capability component 2125 may identify, from the combinations, that the base station is configured to transmit the feedback associated with reception of the uplink data on subframe index 6 of the second ten-subframe cycle when the DL-reference UL-DL configuration corresponds to the configuration index 4 or 5.

In some examples, the capability component 2125 may identify, from the combinations and based on the UE being a dynamic power sharing capable UE, that the base station is configured to transmit the uplink grant on any one of a subframe index 1, 6, or 9 of a first ten-subframe cycle. In some examples, the capability component 2125 may identify, from the combinations, that the base station is configured to receive the uplink data on any one of a subframe index 7 of the first ten-subframe cycle or subframe index 2 or 3 of a second ten-subframe cycle subsequent to the first ten-subframe cycle. In some examples, the capability component 2125 may identify, from the combinations, that the base station is configured to transmit the feedback associated with reception of the uplink data on any one of a subframe index 1, 6, or 9 of the second ten-subframe cycle.

In some examples, the capability component 2125 may identify, from the combinations and based on the UE being a non-dynamic power sharing capable UE, that the base station is configured to transmit the uplink grant on any one of a subframe index 1 or 6 of a first ten-subframe cycle when the DL-reference UL-DL configuration corresponds to a configuration index 2. In some examples, the capability component 2125 may identify, from the combinations, that the base station is configured to transmit the feedback associated with reception of the uplink data on any one of a subframe index 1 or 6 of the second ten-subframe cycle when the DL-reference UL-DL configuration corresponds to the configuration index 2. In some examples, the capability component 2125 may identify, from the combinations and based on the UE being a non-dynamic power sharing capable UE, that the base station is configured to transmit the uplink grant on any one of a subframe index 6 or 9 of a first ten-subframe cycle when the DL-reference UL-DL configuration corresponds to the configuration index 2.

In some examples, the capability component 2125 may identify, from the combinations, that the base station is configured to receive the uplink data on any one of a subframe index 2 or 3 of a second ten-subframe cycle subsequent to the first ten-subframe cycle when the DL-reference UL-DL configuration corresponds to a configuration index 4. In some examples, the capability component 2125 may identify, from the combinations, that the base station is configured to transmit the feedback associated with reception of the uplink data on any one of a subframe index 6 or 9 of the second ten-subframe cycle when the DL-reference UL-DL configuration corresponds to the configuration index 4. In some examples, the capability component 2125 may identify, from the combinations and based on the UE being a non-dynamic power sharing capable UE, that the base station is configured to transmit the uplink grant on a subframe index 6 of a first ten-subframe cycle when the DL-reference UL-DL configuration corresponds to the configuration index 2.

In some examples, the capability component 2125 may identify, from the combinations, that the base station is configured to receive the uplink data on subframe index 2 of a second ten-subframe cycle subsequent to the first ten-subframe cycle when the DL-reference UL-DL configuration corresponds to a configuration index 5. In some examples, the capability component 2125 may identify, from the combinations, that the base station is configured to transmit the feedback associated with transmission of the uplink data on subframe index 6 of the second ten-subframe cycle when the DL-reference UL-DL configuration corresponds to the configuration index 5.

In some examples, the capability component 2125 may receive UE capability information including an indication of a dynamic power sharing capability of the UE. In some examples, the capability component 2125 may transmit, via signaling to the UE, an indication of the primary cell TDD UL-DL configuration and the DL-reference UL-DL configuration based on the UE capability information. In some cases, the signaling includes a radio resource control signaling. In some cases, the signaling includes a dynamic control signaling. In some cases, the dynamic control signaling includes downlink control information.

The grant component 2130 may configure an uplink index field in the uplink grant. In some cases, an uplink index field in the uplink grant includes an uplink downlink assignment index. In some cases, an uplink index field in the uplink grant includes one or more static bit values.

Figure 22:
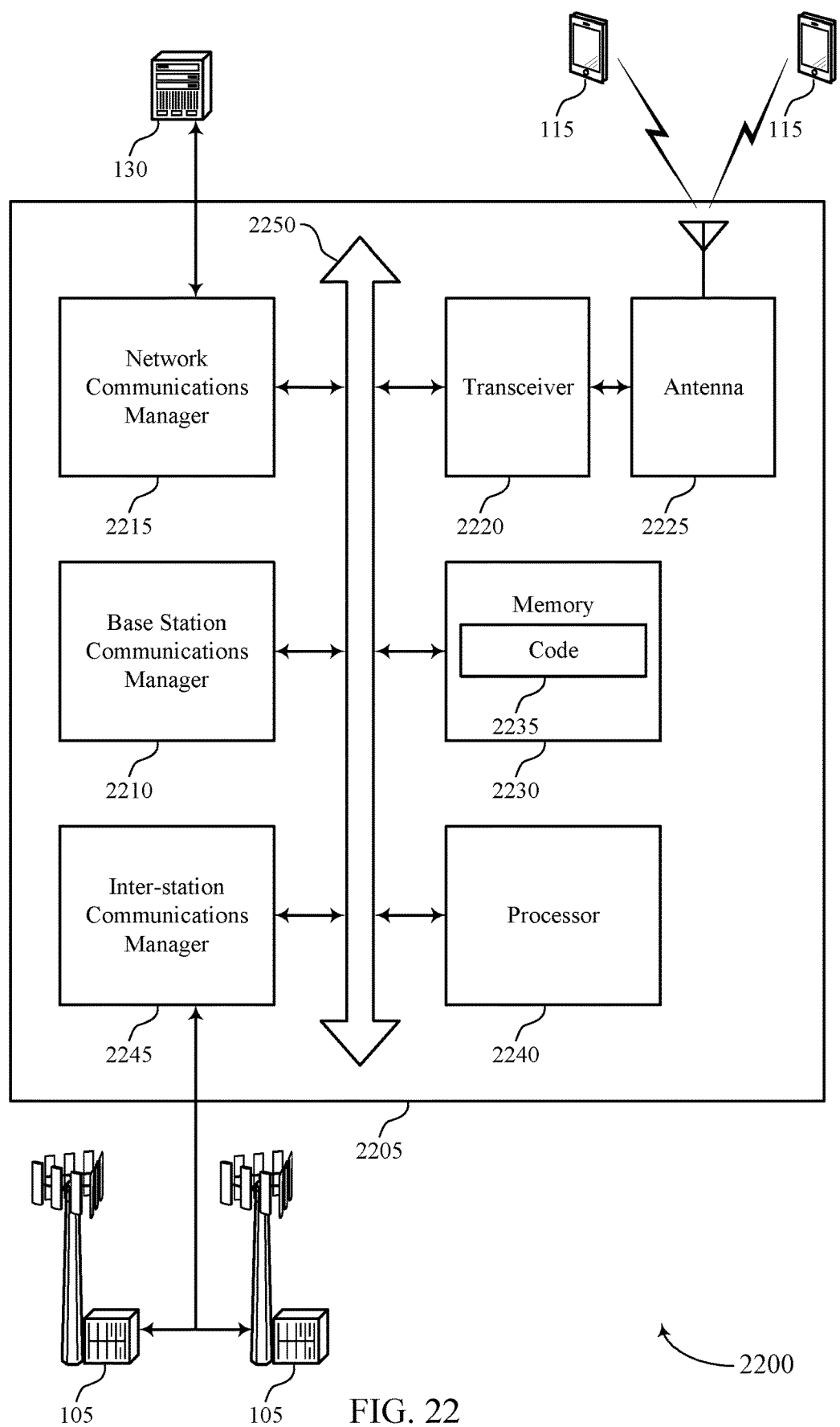
FIG. 22 shows a diagram of a system including a device that supports uplink RTT for EN-DC in accordance with aspects of the present disclosure.

FIG. 22 shows a diagram of a system 2200 including a device 2205 that supports uplink RTT for EN-DC in accordance with aspects of the present disclosure. The device 2205 may be an example of or include the components of device 1905, device 2005, or a base station 105 as described herein. The device 2205 may include components for bi-directional voice and data communications including components for transmitting and receiving communications, including a base station communications manager 2210, a network communications manager 2215, a transceiver 2220, an antenna 2225, memory 2230, a processor 2240, and an inter-station communications manager 2245. These components may be in electronic communication via one or more buses (e.g., bus 2250).

The base station communications manager 2210 may configure a UE with a primary cell TDD UL-DL configuration corresponding to a configuration index 0 or a configuration index 6 and a DL-reference UL-DL configuration, transmit, to the UE, an uplink grant in a first subframe of a set of subframes, the uplink grant scheduling transmission of uplink data, determine a second subframe of the set of subframes to receive the uplink data and a third subframe of the set of subframes to transmit feedback associated with reception of the uplink data, the second subframe and the third subframe being determined based on combinations of the primary cell TDD UL-DL configuration and the DL-reference UL-DL configuration, the combinations corresponding to transmission timelines, each of the combinations having at least three uplink transmission subframes or three downlink monitoring subframes within a ten-subframe cycle, and communicate with the UE in accordance with the transmission timelines. In some cases, the configuration index 0 and the configuration index 6 both include an uplink-to-downlink subframe ratio that is greater than or equal to one.

The network communications manager 2215 may manage communications with the core network (e.g., via one or more wired backhaul links). For example, the network communications manager 2215 may manage the transfer of data communications for client devices, such as one or more UEs 115.

The transceiver 2220 may communicate bi-directionally, via one or more antennas, wired, or wireless links as described above. For example, the transceiver 2220 may represent a wireless transceiver and may communicate bi-directionally with another wireless transceiver. The transceiver 2220 may also include a modem to modulate the packets and provide the modulated packets to the antennas for transmission, and to demodulate packets received from the antennas. In some cases, the device 2205 may include a single antenna 2225. However, in some cases, the device 2205 may have more than one antenna 2225, which may be capable of concurrently transmitting or receiving multiple wireless transmissions.

The memory 2230 may include RAM, ROM, or a combination thereof. The memory 2230 may store computer-readable code 2235 including instructions that, when executed by a processor (e.g., the processor 2240) cause the device to perform various functions described herein. In some cases, the memory 2230 may contain, among other things, a BIOS which may control basic hardware or software operation such as the interaction with peripheral components or devices.

The processor 2240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some cases, a memory controller may be integrated into processor 2240. The processor 2240 may be configured to execute computer-readable instructions stored in a memory (e.g., the memory 2230) to cause the device 2205 to perform various functions (e.g., functions or tasks supporting uplink RTT for EN-DC).

The inter-station communications manager 2245 may manage communications with other base station 105, and may include a controller or scheduler for controlling communications with UEs 115 in cooperation with other base stations 105. For example, the inter-station communications manager 2245 may coordinate scheduling for transmissions to UEs 115 for various interference mitigation techniques such as beamforming or joint transmission. In some examples, the inter-station communications manager 2245 may provide an X2 interface within an LTE/LTE-A wireless communication network technology to provide communication between base stations 105.

The code 2235 may include instructions to implement aspects of the present disclosure, including instructions to support wireless communications. The code 2235 may be stored in a non-transitory computer-readable medium such as system memory or other type of memory. In some cases, the code 2235 may not be directly executable by the processor 2240 but may cause a computer (e.g., when compiled and executed) to perform functions described herein.

Figure 23:
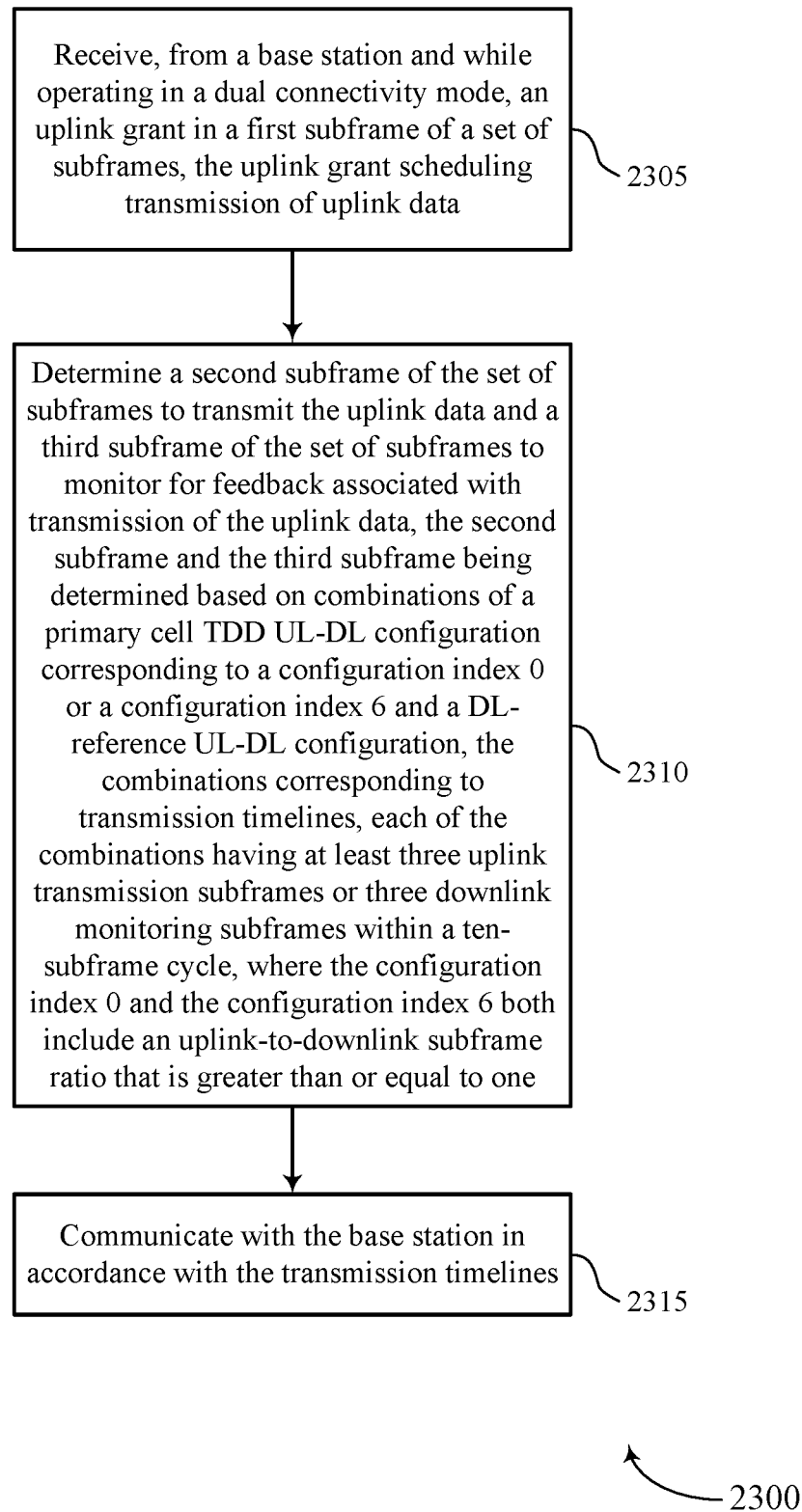
FIGS. 23 through 27 show flowcharts illustrating methods that support uplink RTT for EN-DC in accordance with aspects of the present disclosure.

FIG. 23 shows a flowchart illustrating a method 2300 that supports uplink RTT for EN-DC in accordance with aspects of the present disclosure. The operations of method 2300 may be implemented by a UE 115 or its components as described herein. For example, the operations of method 2300 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2305, the UE may receive, from a base station and while operating in a dual connectivity mode, an uplink grant in a first subframe of a set of subframes, the uplink grant scheduling transmission of uplink data. The operations of 2305 may be performed according to the methods described herein. In some examples, aspects of the operations of 2305 may be performed by a grant component as described with reference to FIGS. 15 through 18.

At 2310, the UE may determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one. The operations of 2310 may be performed according to the methods described herein. In some examples, aspects of the operations of 2310 may be performed by a subframe component as described with reference to FIGS. 15 through 18.

At 2315, the UE may communicate with the base station in accordance with the transmission timelines. The operations of 2315 may be performed according to the methods described herein. In some examples, aspects of the operations of 2315 may be performed by a transmission component as described with reference to FIGS. 15 through 18.

Figure 24:
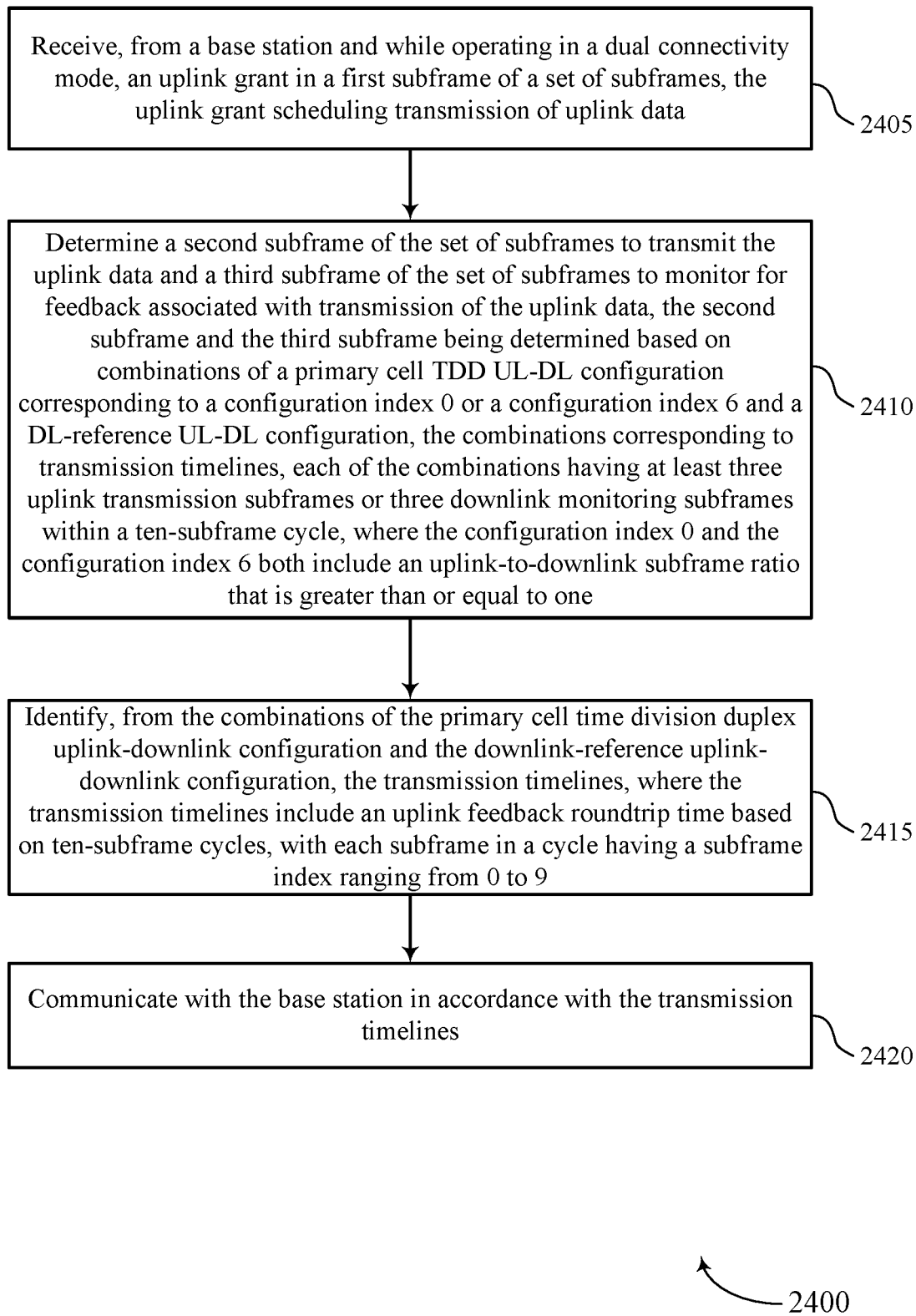

FIG. 24 shows a flowchart illustrating a method 2400 that supports uplink RTT for EN-DC in accordance with aspects of the present disclosure. The operations of method 2400 may be implemented by a UE 115 or its components as described herein. For example, the operations of method 2400 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2405, the UE may receive, from a base station and while operating in a dual connectivity mode, an uplink grant in a first subframe of a set of subframes, the uplink grant scheduling transmission of uplink data. The operations of 2405 may be performed according to the methods described herein. In some examples, aspects of the operations of 2405 may be performed by a grant component as described with reference to FIGS. 15 through 18.

At 2410, the UE may determine a second subframe of the set of subframes to transmit the uplink data and a third subframe of the set of subframes to monitor for feedback associated with transmission of the uplink data, the second subframe and the third subframe being determined based on combinations of a primary cell TDD uplink-downlink configuration corresponding to a configuration index 0 or a configuration index 6 and a DL-reference uplink-downlink configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one. The operations of 2410 may be performed according to the methods described herein. In some examples, aspects of the operations of 2410 may be performed by a subframe component as described with reference to FIGS. 15 through 18.

At 2415, the UE may identify, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9. The operations of 2415 may be performed according to the methods described herein. In some examples, aspects of the operations of 2415 may be performed by a transmission component as described with reference to FIGS. 15 through 18.

At 2420, the UE may communicate with the base station in accordance with the transmission timelines. The operations of 2420 may be performed according to the methods described herein. In some examples, aspects of the operations of 2420 may be performed by a transmission component as described with reference to FIGS. 15 through 18.

Figure 25:
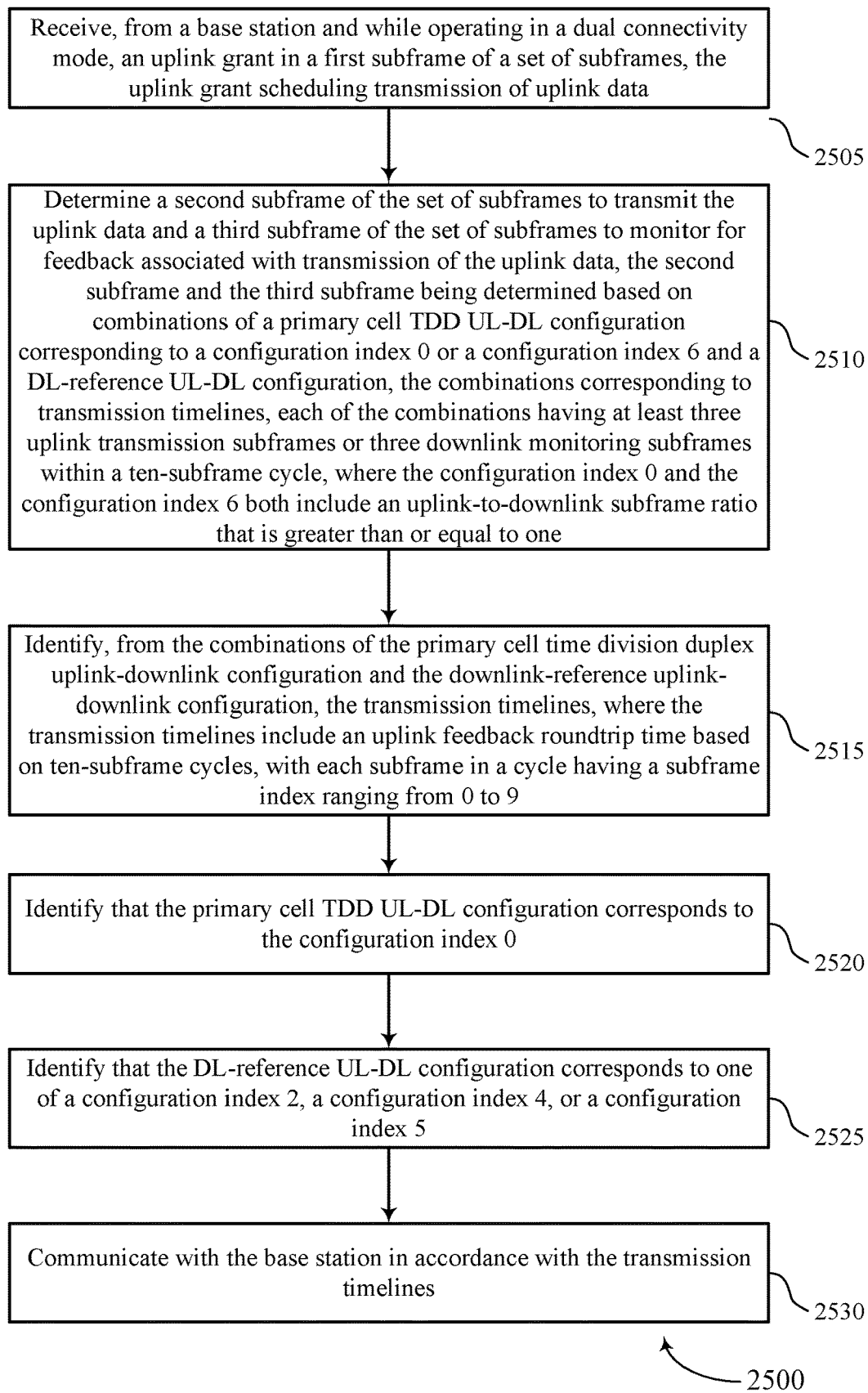

FIG. 25 shows a flowchart illustrating a method 2500 that supports uplink RTT for EN-DC in accordance with aspects of the present disclosure. The operations of method 2500 may be implemented by a UE 115 or its components as described herein. For example, the operations of method 2500 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2505, the UE may receive, from a base station and while operating in a dual connectivity mode, an uplink grant in a first subframe of a set of subframes, the uplink grant scheduling transmission of uplink data. The operations of 2505 may be performed according to the methods described herein. In some examples, aspects of the operations of 2505 may be performed by a grant component as described with reference to FIGS. 15 through 18.

At 2510, the UE may determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one. The operations of 2510 may be performed according to the methods described herein. In some examples, aspects of the operations of 2510 may be performed by a subframe component as described with reference to FIGS. 15 through 18.

At 2515, the UE may identify, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9. The operations of 2515 may be performed according to the methods described herein. In some examples, aspects of the operations of 2515 may be performed by a transmission component as described with reference to FIGS. 15 through 18.

At 2520, the UE may identify that the primary cell TDD UL-DL configuration corresponds to the configuration index 0. The operations of 2520 may be performed according to the methods described herein. In some examples, aspects of the operations of 2520 may be performed by a configuration component as described with reference to FIGS. 15 through 18.

At 2525, the UE may identify that the DL-reference UL-DL configuration corresponds to one of a configuration index 2, a configuration index 4, or a configuration index 5. The operations of 2525 may be performed according to the methods described herein. In some examples, aspects of the operations of 2525 may be performed by a configuration component as described with reference to FIGS. 15 through 18.

At 2530, the UE may communicate with the base station in accordance with the transmission timelines. The operations of 2530 may be performed according to the methods described herein. In some examples, aspects of the operations of 2530 may be performed by a transmission component as described with reference to FIGS. 15 through 18.

Figure 26:
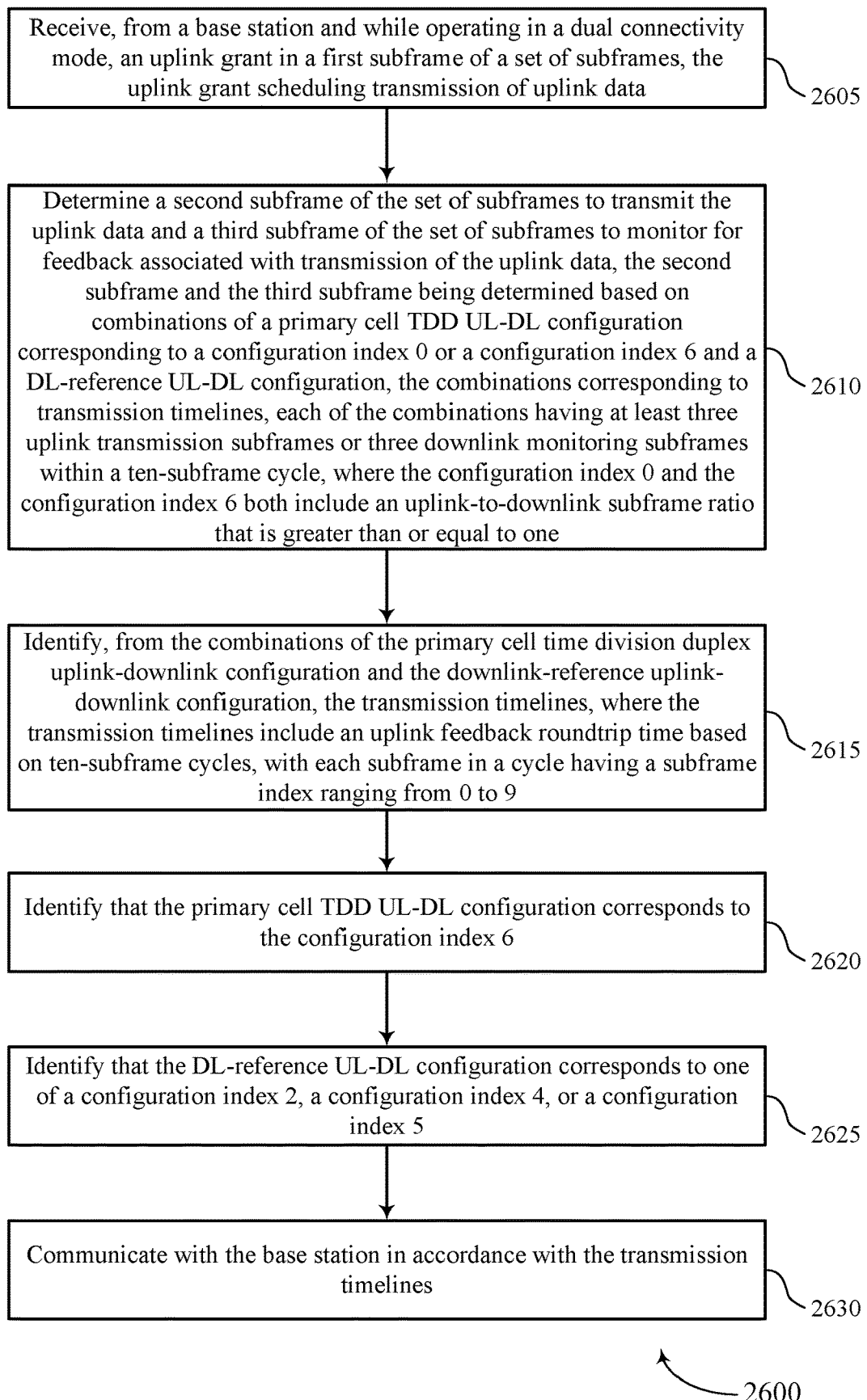

FIG. 26 shows a flowchart illustrating a method 2600 that supports uplink RTT for EN-DC in accordance with aspects of the present disclosure. The operations of method 2600 may be implemented by a UE 115 or its components as described herein. For example, the operations of method 2600 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2605, the UE may receive, from a base station and while operating in a dual connectivity mode, an uplink grant in a first subframe of a set of subframes, the uplink grant scheduling transmission of uplink data. The operations of 2605 may be performed according to the methods described herein. In some examples, aspects of the operations of 2605 may be performed by a grant component as described with reference to FIGS. 15 through 18.

At 2610, the UE may determine a second subframe of the set of subframes to transmit the uplink data and a third subframe of the set of subframes to monitor for feedback associated with transmission of the uplink data, the second subframe and the third subframe being determined based on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one. The operations of 2610 may be performed according to the methods described herein. In some examples, aspects of the operations of 2610 may be performed by a subframe component as described with reference to FIGS. 15 through 18.

At 2615, the UE may identify, from the combinations of the primary cell TDD UL-DL configuration and the DL-reference UL-DL configuration, the transmission timelines, where the transmission timelines include an uplink feedback roundtrip time based on ten-subframe cycles, with each subframe in a cycle having a subframe index ranging from 0 to 9. The operations of 2615 may be performed according to the methods described herein. In some examples, aspects of the operations of 2615 may be performed by a transmission component as described with reference to FIGS. 15 through 18.

At 2620, the UE may identify that the primary cell TDD UL-DL configuration corresponds to the configuration index 6. The operations of 2620 may be performed according to the methods described herein. In some examples, aspects of the operations of 2620 may be performed by a configuration component as described with reference to FIGS. 15 through 18.

At 2625, the UE may identify that the DL-reference UL-DL configuration corresponds to one of a configuration index 2, a configuration index 4, or a configuration index 5. The operations of 2625 may be performed according to the methods described herein. In some examples, aspects of the operations of 2625 may be performed by a configuration component as described with reference to FIGS. 15 through 18.

At 2630, the UE may communicate with the base station in accordance with the transmission timelines. The operations of 2630 may be performed according to the methods described herein. In some examples, aspects of the operations of 2630 may be performed by a transmission component as described with reference to FIGS. 15 through 18.

Figure 27:
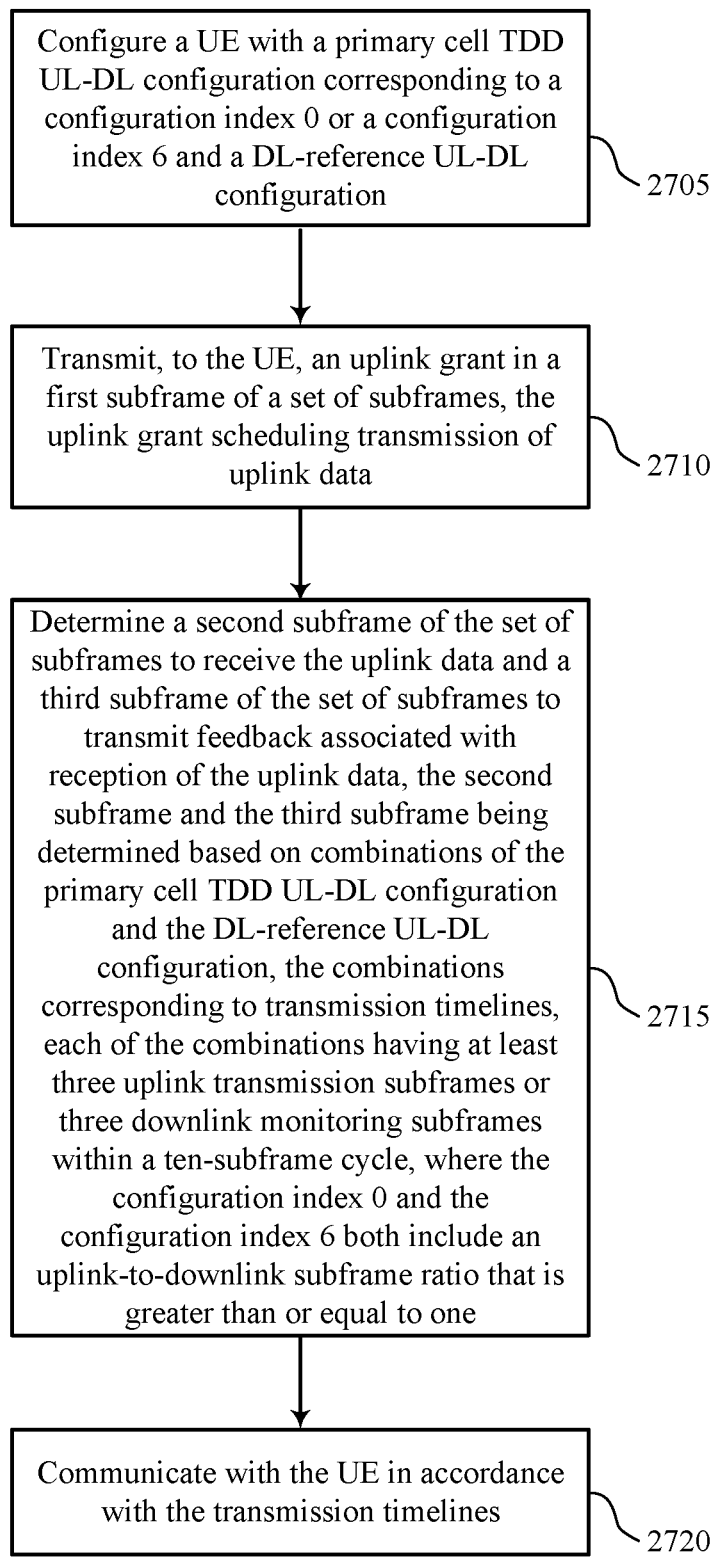

FIG. 27 shows a flowchart illustrating a method 2700 that supports uplink RTT for EN-DC in accordance with aspects of the present disclosure. The operations of method 2700 may be implemented by a base station 105 or its components as described herein. For example, the operations of method 2700 may be performed by a communications manager as described with reference to FIGS. 19 through 22. In some examples, a base station may execute a set of instructions to control the functional elements of the base station to perform the functions described below. Additionally or alternatively, a base station may perform aspects of the functions described below using special-purpose hardware.

At 2705, the base station may configure a UE with a primary cell TDD UL-DL configuration corresponding to a configuration index 0 or a configuration index 6 and a DL-reference UL-DL configuration. The operations of 2705 may be performed according to the methods described herein. In some examples, aspects of the operations of 2705 may be performed by a configuration component as described with reference to FIGS. 19 through 22.

At 2710, the base station may transmit, to the UE, an uplink grant in a first subframe of a set of subframes, the uplink grant scheduling transmission of uplink data. The operations of 2710 may be performed according to the methods described herein. In some examples, aspects of the operations of 2710 may be performed by a subframe component as described with reference to FIGS. 19 through 22.

At 2715, the base station may determine a second subframe of the set of subframes to receive the uplink data and a third subframe of the set of subframes to transmit feedback associated with reception of the uplink data, the second subframe and the third subframe being determined based on combinations of the primary cell TDD UL-DL configuration and the DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one. The operations of 2715 may be performed according to the methods described herein. In some examples, aspects of the operations of 2715 may be performed by a subframe component as described with reference to FIGS. 19 through 22.

At 2720, the base station may communicate with the UE in accordance with the transmission timelines. The operations of 2720 may be performed according to the methods described herein. In some examples, aspects of the operations of 2720 may be performed by a transmission component as described with reference to FIGS. 19 through 22.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a UE, comprising: receiving, from a base station and while operating in a dual connectivity mode, an uplink grant in a first subframe of a plurality of subframes, the uplink grant scheduling transmission of uplink data; determining a second subframe of the plurality of subframes to transmit the uplink data and a third subframe of the plurality of subframes to monitor for feedback associated with transmission of the uplink data, the second subframe and the third subframe being determined based at least in part on combinations of a primary cell TDD UL-DL configuration corresponding to a configuration index 0 or a configuration index 6 and a DL-reference UL-DL configuration, the combinations corresponding to transmission timelines, each of the combinations having at least three uplink transmission subframes or three downlink monitoring subframes within a ten-subframe cycle; and communicating with the base station in accordance with the transmission timelines.

Example 2: The method of example 1, wherein determining the second subframe and the third subframe further comprises: identifying, from the combinations of the primary cell TDD UL-DL configuration and the DL-reference UL-DL configuration, the transmission timelines, wherein the transmission timelines include an uplink feedback roundtrip time based on ten-subframe cycles, with each subframe in a cycle having a subframe index ranging from 0 to 9.

Example 3: The method of example 2, further comprising: identifying that the primary cell TDD UL-DL configuration corresponds to the configuration index 0; and identifying that the DL-reference UL-DL configuration corresponds to one of a configuration index 2, a configuration index 4, or a configuration index 5.

Example 4: The method of example 3, wherein determining the second subframe and the third subframe comprises: identifying that the uplink grant is received on subframe index 0 of a first ten-subframe cycle; determining, based at least in part on the uplink grant being received on subframe index 0 of the first ten-subframe cycle, that the second subframe for transmitting the uplink data is at subframe index 4 of the first ten-subframe cycle; and determining, based at least in part on the uplink data being transmitted on subframe index 4 of the first ten-subframe cycle, that the third subframe for monitoring the feedback is at subframe index 0 of a second ten-subframe cycle subsequent to the first ten-subframe cycle.

Example 5: The method of example 3, wherein determining the second subframe and the third subframe comprises: identifying that the uplink grant is received on subframe index 1 of a first ten-subframe cycle; determining, based at least in part on the uplink grant being received on subframe index 1 of the first ten-subframe cycle, that the second subframe for transmitting the uplink data is at subframe index 7 of the first ten-subframe cycle; and determining, based at least in part on the uplink data being transmitted on subframe index 7 of the first ten-subframe cycle, that the third subframe for monitoring the feedback is at subframe index 1 of a second ten-subframe cycle subsequent to the first ten-subframe cycle.

Example 6: The method of example 3, wherein determining the second subframe and the third subframe comprises: identifying that the uplink grant is received on subframe index 1 of a first ten-subframe cycle; determining, based at least in part on the uplink grant being received on subframe index 1 of the first ten-subframe cycle and on a value of an uplink index field in the uplink grant, that the second subframe for transmitting the uplink data is either at subframe index 7 or subframe index 8 of the first ten-subframe cycle; and determining, based at least in part on the uplink data being transmitted on subframe index 7 or subframe index 8 of the first ten-subframe cycle, that the third subframe for monitoring the feedback is at either subframe index 1 or subframe index 5 of a second ten-subframe cycle subsequent to the first ten-subframe cycle.

Example 7: The method of example 3, wherein determining the second subframe and the third subframe comprises: identifying that the uplink grant is received on subframe index 5 of a first ten-subframe cycle; determining, based at least in part on the uplink grant being received on subframe index 5 of the first ten-subframe cycle, that the second subframe for transmitting the uplink data is at subframe index 9 of the first ten-subframe cycle; and determining, based at least in part on the uplink data being transmitted on subframe index 9 of the first ten-subframe cycle, that the third subframe for monitoring the feedback is at subframe index 5 of a second ten-subframe cycle subsequent to the first ten-subframe cycle.

Example 8: The method of example 3, wherein determining the second subframe and the third subframe comprises: identifying that the uplink grant is received on subframe index 6 of a first ten-subframe cycle; determining, based at least in part on the uplink grant being received on subframe index 6 of the first ten-subframe cycle, that the second subframe for transmitting the uplink data is at subframe index 2 of a second ten-subframe cycle subsequent to the first ten-subframe cycle; and determining, based at least in part on the uplink data being transmitted on subframe index 2 of the first ten-subframe cycle, that the third subframe for monitoring the feedback is at subframe index 6 of the second ten-subframe cycle subsequent.

Example 9: The method of example 3, wherein determining the second subframe and the third subframe comprises: identifying that the uplink grant is received on subframe index 6 of a first ten-subframe cycle; determining, based at least in part on the uplink grant being received on subframe index 6 of the first ten-subframe cycle and on a value of an uplink index field in the uplink grant, that the second subframe for transmitting the uplink data is either at subframe index 2 or subframe index 3 of a second ten-subframe cycle subsequent to the first ten-subframe cycle; and determining, based at least in part on the uplink data being transmitted on either subframe index 2 or subframe index 3 of the second ten-subframe cycle, that the third subframe for monitoring the feedback is either at subframe index 6 or at subframe index 0 of a third ten-subframe cycle subsequent to the second ten-subframe cycle.

Example 10: The method of example 3, further comprising: identifying that the UE is a dynamic power sharing capable UE; identifying, from the combinations and based at least in part on the UE being a dynamic power sharing capable UE, that the UE is configured to receive the uplink grant on any one of a subframe index 0, 1, 5, or 6 of a first ten-subframe cycle; identifying, from the combinations, that the UE is configured to transmit the uplink data on any one of a subframe index 4, 7, or 9 of the first ten-subframe cycle or subframe index 2 of a second ten-subframe cycle subsequent to the first ten-subframe cycle; and identifying, from the combinations, that the UE is configured to monitor for the feedback associated with transmission of the uplink data on any one of a subframe index 0, 1, 5, or 6 of the second ten-subframe cycle.

Example 11: The method of example 3, further comprising: identifying that the UE is a non-dynamic power sharing capable UE; identifying, from the combinations and based at least in part on the UE being a non-dynamic power sharing capable UE, that the UE is configured to receive the uplink grant on any one of a subframe index 1 or 6 of a first ten-subframe cycle when the DL-reference UL-DL configuration corresponds to the configuration index 2; identifying, from the combinations, that the UE is configured to transmit the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2; and identifying, from the combinations, that the UE is configured to monitor for the feedback associated with transmission of the uplink data on any one of a subframe index 1 or 6 of the second ten-subframe cycle when the DL-reference UL-DL configuration corresponds to the configuration index 2.

Example 12: The method of example 3, further comprising: identifying that the UE is a non-dynamic power sharing capable UE; identifying, from the combinations and based at least in part on the UE being a non-dynamic power sharing capable UE, that the UE is configured to receive the uplink grant on a subframe index 6 of a first ten-subframe cycle when the DL-reference UL-DL configuration corresponds to the configuration index 4 or the configuration index 5; identifying, from the combinations, that the UE is configured to transmit the uplink data on subframe index 2 of a second ten-subframe cycle subsequent to the first ten-subframe cycle when the d DL-reference UL-DL configuration corresponds to the configuration index 4 or the configuration index 5; and identifying, from the combinations, that the UE is configured to monitor for the feedback associated with transmission of the uplink data on subframe index 6 of the second ten-subframe cycle when the DL-reference UL-DL configuration corresponds to the configuration index 4 or the configuration index 5.

Example 13: The method of example 2, further comprising: identifying that the primary cell TDD UL-DL configuration corresponds to the configuration index 6; and identifying that the DL-reference UL-DL configuration corresponds to one of a configuration index 2, a configuration index 4, or a configuration index 5.

Example 14: The method of example 13, wherein determining the second subframe and the third subframe comprises: identifying that the uplink grant is received on subframe index 1 of a first ten-subframe cycle; determining, based at least in part on the uplink grant being received on subframe index 1 of the first ten-subframe cycle, that the second subframe for transmitting the uplink data is at subframe index 7 of the first ten-subframe cycle; and determining, based at least in part on the uplink data being transmitted on subframe index 7 of the first ten-subframe cycle, that the third subframe for monitoring the feedback is at subframe index 1 of a second ten-subframe cycle subsequent to the first ten-subframe cycle.

Example 15: The method of example 13, wherein determining the second subframe and the third subframe comprises: identifying that the uplink grant is received on subframe index 6 of a first ten-subframe cycle; determining, based at least in part on the uplink grant being received on subframe index 6 of the first ten-subframe cycle, that the second subframe for transmitting the uplink data is at subframe index 2 of a second ten-subframe cycle subsequent to the first ten-subframe cycle; and determining, based at least in part on the uplink data being transmitted on subframe index 2 of the first ten-subframe cycle, that the third subframe for monitoring the feedback is at subframe index 6 of a second ten-subframe cycle subsequent to the first ten-subframe cycle.

Example 16: The method of example 13, wherein determining the second subframe and the third subframe comprises: identifying that the uplink grant is received on subframe index 9 of a first ten-subframe cycle; determining, based at least in part on the uplink grant being received on subframe index 9 of the first ten-subframe cycle, that the second subframe for transmitting the uplink data is at subframe index 3 of a second ten-subframe cycle subsequent to the first ten-subframe cycle; and determining, based at least in part on the uplink data being transmitted on subframe index 3 of the second ten-subframe cycle, that the third subframe for monitoring the feedback is at subframe index 9 of the second ten-subframe cycle.

Example 17: The method of example 13, further comprising: identifying that the UE is a dynamic power sharing capable UE; identifying, from the combinations and based at least in part on the UE being a dynamic power sharing capable UE, that the UE is configured to receive the uplink grant on any one of a subframe index 1, 6, or 9 of a first ten-subframe cycle; identifying, from the combinations, that the UE is configured to transmit the uplink data on any one of a subframe index 7 of the first ten-subframe cycle or subframe index 2 or 3 of a second ten-subframe cycle subsequent to the first ten-subframe cycle; and identifying, from the combinations, that the UE is configured to monitor for the feedback associated with transmission of the uplink data on any one of a subframe index 1, 6, or 9 of the second ten-subframe cycle.

Example 18: The method of example 13, further comprising: identifying that the UE is a non-dynamic power sharing capable UE; identifying, from the combinations and based at least in part on the UE being a non-dynamic power sharing capable UE, that the UE is configured to receive the uplink grant on any one of a subframe index 1 or 6 of a first ten-subframe cycle when the DL-reference UL-DL configuration corresponds to the configuration index 2; identifying, from the combinations, that the UE is configured to transmit the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2; and identifying, from the combinations, that the UE is configured to monitor for the feedback associated with transmission of the uplink data on any one of a subframe index 1 or 6 of the second ten-subframe cycle when the DL-reference UL-DL configuration corresponds to the configuration index 2.

Example 19: The method of example 13, further comprising: identifying that the UE is a non-dynamic power sharing capable UE; identifying, from the combinations and based at least in part on the UE being a non-dynamic power sharing capable UE, that the UE is configured to receive the uplink grant on any one of a subframe index 6 or 9 of a first ten-subframe cycle when the DL-reference UL-DL configuration corresponds to the configuration index 4; identifying, from the combinations, that the UE is configured to transmit the uplink data on any one of a subframe index 2 or 3 of a second ten-subframe cycle subsequent to the first ten-subframe cycle when the DL-reference UL-DL configuration corresponds to the configuration index 4; and identifying, from the combinations, that the UE is configured to monitor for the feedback associated with transmission of the uplink data on any one of a subframe index 6 or 9 of the second ten-subframe cycle when the DL-reference UL-DL configuration corresponds to the configuration index 4.

Example 20: The method of example 13, further comprising: identifying that the UE is a non-dynamic power sharing capable UE; identifying, from the combinations and based at least in part on the UE being a non-dynamic power sharing capable UE, that the UE is configured to receive the uplink grant on a subframe index 6 of a first ten-subframe cycle when the DL-reference UL-DL configuration corresponds to the configuration index 5; identifying, from the combinations, that the UE is configured to transmit the uplink data on subframe index 2 of a second ten-subframe cycle subsequent to the first ten-subframe cycle when the DL-reference UL-DL configuration corresponds to the configuration index 5; and identifying, from the combinations, that the UE is configured to monitor for the feedback associated with transmission of the uplink data on subframe index 6 of the second ten-subframe cycle when the DL-reference UL-DL configuration corresponds to the configuration index 5.

Example 21: The method of any one of examples 1 through 20, wherein an uplink index field in the uplink grant comprises an uplink downlink assignment index.

Example 22: The method of any one of examples 1 through 21, wherein an uplink index field in the uplink grant comprises one or more static bit values.

Example 23: The method of any one of examples 1 through 22, further comprising: identifying a dynamic power sharing capability of the UE; and transmitting, to the base station, UE capability information comprising an indication of the dynamic power sharing capability of the UE.

Example 24: The method of example 23, further comprising: receiving, via signaling from the base station, an indication of the primary cell TDD UL-DL configuration and the DL-reference UL-DL configuration based at least in part on the UE capability information.

Example 25: The method of example 24, wherein the signaling comprises UE specific radio resource control signaling.

Example 26: The method of example 24, wherein the signaling comprises a dynamic control signaling.

Example 27: The method of example 26, wherein the dynamic control signaling comprises downlink control information.

Example 28: A method for wireless communication at a base station, comprising: configuring a UE with a primary cell TDD UL-DL configuration corresponding to a configuration index 0 or a configuration index 6 and a DL-reference UL-DL configuration; transmitting, to the UE, an uplink grant in a first subframe of a plurality of subframes, the uplink grant scheduling transmission of uplink data; determining a second subframe of the set of subframes to receive the uplink data and a third subframe of the set of subframes to transmit feedback associated with reception of the uplink data, the second subframe and the third subframe being determined based at least in part on combinations of a primary cell TDD UL-DL configuration and a DL-reference UL-DL configuration, the combinations corresponding to transmission timelines, each of the combinations having at least three uplink transmission subframes or three downlink monitoring subframes within a ten-subframe cycle, where the configuration index 0 and the configuration index 6 both include an uplink-to-downlink subframe ratio that is greater than or equal to one; and communicating with the UE in accordance with the transmission timelines.

Example 29: The method of example 28, wherein determining the second subframe and the third subframe further comprise: identifying, from the combinations of the primary cell TDD UL-DL configuration and the DL-reference UL-DL configuration, the transmission timelines, where the transmission timelines include an uplink feedback roundtrip time based at least in part on ten-subframe cycles, with each subframe in a cycle having a subframe index ranging from 0 to 9.

Example 30: The method of example 29, further comprising: identifying that the primary cell TDD UL-DL configuration corresponds to a configuration index 0; and identifying that the DL-reference UL-DL configuration corresponds to one of a configuration index 2, a configuration index 4, or a configuration index 5.

Example 31: The method of example 30, wherein determining the second subframe and the third subframe comprises: identifying that the uplink grant is transmitted on subframe index 0 of a first ten-subframe cycle; determining, based at least in part on the uplink grant being transmitted on subframe index 0 of the first ten-subframe cycle, that the second subframe for receiving the uplink data is at subframe index 4 of the first ten-subframe cycle; and determining, based at least in part on the uplink data being received on subframe index 4 of the first ten-subframe cycle, that the third subframe for transmitting the feedback is at subframe index 0 of a second ten-subframe cycle subsequent to the first ten-subframe cycle.

Example 32: The method of example 30, wherein determining the second subframe and the third subframe comprises: identifying that the uplink grant is transmitted on subframe index 1 of a first ten-subframe cycle; determining, based at least in part on the uplink grant being transmitted on subframe index 1 of the first ten-subframe cycle, that the second subframe for receiving the uplink data is at subframe index 7 of the first ten-subframe cycle; and determining, based at least in part on the uplink data being received on subframe index 7 of the first ten-subframe cycle, that the third subframe for transmitting the feedback is at subframe index 1 of a second ten-subframe cycle subsequent to the first ten-subframe cycle.

Example 33: The method of example 30, wherein determining the second subframe and the third subframe comprises: identifying that the uplink grant is transmitted on subframe index 1 of a first ten-subframe cycle; determining, based at least in part on the uplink grant being transmitted on subframe index 1 of the first ten-subframe cycle and on a value of an uplink index field in the uplink grant, that the second subframe for receiving the uplink data is either at subframe index 7 or subframe index 8 of the first ten-subframe cycle; and determining, based at least in part on the uplink data being received on subframe index 1 or subframe index 8 of the first ten-subframe cycle, that the third subframe for transmitting the feedback is at subframe index 1 or subframe index 5 of a second ten-subframe cycle subsequent to the first ten-subframe cycle.

Example 34: The method of example 30, wherein determining the second subframe and the third subframe comprises: identifying that the uplink grant is transmitted on subframe index 5 of a first ten-subframe cycle; determining, based at least in part on the uplink grant being transmitted on subframe index 5 of the first ten-subframe cycle, that the second subframe for receiving the uplink data is at subframe index 9 of the first ten-subframe cycle; and determining, based at least in part on the uplink data being received on subframe index 9 of the first ten-subframe cycle, that the third subframe for transmitting the feedback is at subframe index 5 of a second ten-subframe cycle subsequent to the first ten-subframe cycle.

Example 35: The method of example 30, wherein determining the second subframe and the third subframe comprises: identifying that the uplink grant is transmitted on subframe index 6 of a first ten-subframe cycle; determining, based at least in part on the uplink grant being transmitted on subframe index 6 of the first ten-subframe cycle, that the second subframe for receiving the uplink data is at subframe index 2 of the first ten-subframe cycle; and determining, based at least in part on the uplink data being received on subframe index 2 of the first ten-subframe cycle, that the third subframe for transmitting the feedback is at subframe index 6 of a second ten-subframe cycle subsequent to the first ten-subframe cycle.

Example 36: The method of example 30, further comprising: identifying that the UE is a dynamic power sharing capable UE; identifying, from the combinations and based at least in part on the UE being a dynamic power sharing capable UE, that the base station is configured to transmit the uplink grant on any one of a subframe index 0, 1, 5, or 6 of a first ten-subframe cycle; identifying, from the combinations, that the base station is configured to receive the uplink data on any one of a subframe index 4, 7, or 9 of the first ten-subframe cycle or subframe index 2 of a second ten-subframe cycle subsequent to the first ten-subframe cycle; and identifying, from the combinations, that the base station is configured to transmit the feedback associated with reception of the uplink data on any one of a subframe index 0, 1, 5, or 6 of the second ten-subframe cycle.

Example 37: The method of example 30, further comprising: identifying that the UE is a non-dynamic power sharing capable UE; identifying, from the combinations and based at least in part on the UE being a non-dynamic power sharing capable UE, that the base station is configured to transmit the uplink grant on any one of a subframe index 1, or 6 of a first ten-subframe cycle when the DL-reference UL-DL configuration corresponds to the configuration index 2; identifying, from the combinations, that the base station is configured to receive the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2; and identifying, from the combinations, that the base station is configured to transmit the feedback associated with transmission of the uplink data on any one of a subframe index 1 or 6 of the second ten-subframe cycle when the DL-reference UL-DL configuration corresponds to the configuration index 2.

Example 38: The method of example 30, further comprising: identifying that the UE is a non-dynamic power sharing capable UE; identifying, from the combinations and based at least in part on the UE being a non-dynamic power sharing capable UE, that the base station is configured to transmit the uplink grant on a subframe index 6 of a first ten-subframe cycle when the DL-reference UL-DL configuration corresponds to the configuration index 4 or the configuration index 5; identifying, from the combinations, that the base station is configured to receive the uplink data on subframe index 2 of a second ten-subframe cycle subsequent to the first ten-subframe cycle when the DL-reference UL-DL configuration corresponds to the configuration index 4 or the configuration index 5; and identifying, from the combinations, that the base station is configured to transmit the feedback associated with reception of the uplink data on subframe index 6 of the second ten-subframe cycle when the DL-reference UL-DL configuration corresponds to the configuration index 4 or the configuration index 5.

Example 39: The method of example 29, further comprising: identifying that the primary cell TDD UL-DL configuration corresponds to the configuration index 6; and identifying that the DL-reference UL-DL configuration corresponds to one of a configuration index 2, a configuration index 4, or a configuration index 5.

Example 40: The method of example 39, wherein determining the second subframe and the third subframe comprises: identifying that the uplink grant is transmitted on subframe index 1 of a first ten-subframe cycle; determining, based at least in part on the uplink grant being transmitted on subframe index 1 of the first ten-subframe cycle, that the second subframe for receiving the uplink data is at subframe index 7 of the first ten-subframe cycle; and determining, based at least in part on the uplink data being received on subframe index 7 of the first ten-subframe cycle, that the third subframe for transmitting the feedback is at subframe index 1 of a second ten-subframe cycle subsequent to the first ten-subframe cycle.

Example 41: The method of example 39, wherein determining the second subframe and the third subframe comprises: identifying that the uplink grant is transmitted on subframe index 6 of a first ten-subframe cycle; determining, based at least in part on the uplink grant being transmitted on subframe index 6 of the first ten-subframe cycle, that the second subframe for receiving the uplink data is at subframe index 2 of a second ten-subframe cycle subsequent to the first ten-subframe cycle; and determining, based at least in part on the uplink data being received on subframe index 2 of the first ten-subframe cycle, that the third subframe for transmitting the feedback is at subframe index 6 of a second ten-subframe cycle subsequent to the first ten-subframe cycle.

Example 42: The method of example 39, wherein determining the second subframe and the third subframe comprises: identifying that the uplink grant is transmitted on subframe index 9 of a first ten-subframe cycle; determining, based at least in part on the uplink grant being transmitted on subframe index 9 of the first ten-subframe cycle, that the second subframe for receiving the uplink data is at subframe index 3 of a second ten-subframe cycle subsequent to the first ten-subframe cycle; and determining, based at least in part on the uplink data being received on subframe index 3 of the second ten-subframe cycle, that the third subframe for transmitting the feedback is at subframe index 9 of the second ten-subframe cycle.

Example 43: The method of example 39, further comprising: identifying that the UE is a dynamic power sharing capable UE; identifying, from the combinations and based at least in part on the UE being a dynamic power sharing capable UE, that the base station is configured to transmit the uplink grant on any one of a subframe index 1, 6, or 9 of a first ten-subframe cycle; identifying, from the combinations, that the base station is configured to receive the uplink data on any one of a subframe index 7 of the first ten-subframe cycle or subframe index 2 or 3 of a second ten-subframe cycle subsequent to the first ten-subframe cycle; and identifying, from the combinations, that the base station is configured to transmit the feedback associated with reception of the uplink data on any one of a subframe index 1, 6, or 9 of the second ten-subframe cycle.

Example 44: The method of example 39, further comprising: identifying that the UE is a non-dynamic power sharing capable UE; identifying, from the combinations and based at least in part on the UE being a non-dynamic power sharing capable UE, that the base station is configured to transmit the uplink grant on any one of a subframe index 1 or 6 of a first ten-subframe cycle when the DL-reference UL-DL configuration corresponds to the configuration index 2; identifying, from the combinations, that the base station is configured to receive the uplink data on any one of a subframe index 7 of the first ten-subframe cycle or subframe index 2 of a second ten-subframe cycle subsequent to the first ten-subframe cycle when the DL-reference UL-DL configuration corresponds to the configuration index 2; and identifying, from the combinations, that the base station is configured to transmit the feedback associated with reception of the uplink data on any one of a subframe index 1 or 6 of the second ten-subframe cycle when the DL-reference UL-DL configuration corresponds to the configuration index 2.

Example 45: The method of example 39, further comprising: identifying that the UE is a non-dynamic power sharing capable UE; identifying, from the combinations and based at least in part on the UE being a non-dynamic power sharing capable UE, that the base station is configured to transmit the uplink grant on any one of a subframe index 6 or 9 of a first ten-subframe cycle when the DL-reference UL-DL configuration corresponds to the configuration index 4; identifying, from the combinations, that the base station is configured to receive the uplink data on any one of a subframe index 2 or 3 of a second ten-subframe cycle subsequent to the first ten-subframe cycle when the DL-reference UL-DL configuration corresponds to the configuration index 4; and identifying, from the combinations, that the base station is configured to transmit the feedback associated with reception of the uplink data on any one of a subframe index 6 or 9 of the second ten-subframe cycle when the DL-reference UL-DL configuration corresponds to the configuration index 4.

Example 46: The method of example 39, further comprising: identifying that the UE is a non-dynamic power sharing capable UE; identifying, from the combinations and based at least in part on the UE being a non-dynamic power sharing capable UE, that the base station is configured to transmit the uplink grant on a subframe index 6 of a first ten-subframe cycle when the DL-reference UL-DL configuration corresponds to the configuration index 5; identifying, from the combinations, that the base station is configured to receive the uplink data on subframe index 2 of a second ten-subframe cycle subsequent to the first ten-subframe cycle when the DL-reference UL-DL configuration corresponds to the configuration index 5; and identifying, from the combinations, that the base station is configured to transmit the feedback associated with transmission of the uplink data on subframe index 6 of the second ten-subframe cycle when the DL-reference UL-DL configuration corresponds to the configuration index 5.

Example 47: The method of any of examples 28 through 46, wherein an uplink index field in the uplink grant comprises an uplink downlink assignment index.

Example 48: The method of any of examples 28 through 47, wherein an uplink index field in the uplink grant comprises one or more static bit values.

Example 49: The method of any of examples 28 through 48, further comprising: receiving UE capability information comprising an indication of a dynamic power sharing capability of the UE.

Example 50: The method of example 49, further comprising: transmitting, via signaling to the UE, an indication of the primary cell TDD UL-DL configuration and the DL-reference UL-DL configuration based at least in part on the UE capability information.

Example 51: The method of example 50, wherein the signaling comprises a radio resource control signaling.

Example 52: The method of example 50, wherein the signaling comprises a dynamic control signaling.

Example 53: The method of example 52, wherein the dynamic control signaling comprises downlink control information.

Example 54: An apparatus for wireless communications comprising at least one means for performing a method of any of examples 1 to 27.

Example 55: An apparatus for wireless communications comprising a processor; memory coupled with the processor; and instructions stored in the memory and executable by the processor to cause the apparatus to perform a method of any of examples 1 to 27.

Example 56: A non-transitory computer-readable medium storing code for wireless communications, the code comprising instructions executable by a processor to perform a method of any of examples 1 to 27.

Example 57: An apparatus for wireless communications comprising at least one means for performing a method of any of examples 28 to 53.

Example 58: An apparatus for wireless communications comprising a processor; memory coupled with the processor; and instructions stored in the memory and executable by the processor to cause the apparatus to perform a method of any of examples 28 to 53.

Example 59: A non-transitory computer-readable medium storing code for wireless communications, the code comprising instructions executable by a processor to perform a method of any of examples 28 to 53.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station and while operating in a dual connectivity mode, an uplink grant in a first subframe of a plurality of subframes, the uplink grant scheduling transmission of uplink data;
   determining a second subframe of the plurality of subframes to transmit the uplink data and a third subframe of the plurality of subframes to monitor for feedback associated with the transmission of the uplink data, the second subframe and the third subframe being determined based at least in part on combinations of a primary cell time division duplex uplink-downlink configuration corresponding to a configuration index 0 or a configuration index 6 and a downlink-reference uplink-downlink configuration, the combinations corresponding to transmission timelines, each of the combinations having at least three uplink transmission subframes or at least three downlink monitoring subframes within a ten-subframe cycle, wherein the configuration index 0 and the configuration index 6 both comprise an uplink-to-downlink subframe ratio that is greater than or equal to one; and
   communicating with the base station in accordance with the transmission timelines.

2. The method of claim 1, wherein determining the second subframe and the third subframe further comprises:
   identifying, from the combinations of the primary cell time division duplex uplink-downlink configuration and the downlink-reference uplink-downlink configuration, the transmission timelines, wherein the transmission timelines include an uplink feedback roundtrip time based on ten-subframe cycles, with each subframe in a cycle having a subframe index ranging from 0 to 9.

3. The method of claim 2, further comprising:
identifying that the primary cell time division duplex uplink-downlink configuration corresponds to the configuration index 0; and
identifying that the downlink-reference uplink-downlink configuration corresponds to one of a configuration index 2, a configuration index 4, or a configuration index 5.

4. The method of claim 3, wherein determining the second subframe and the third subframe comprises:
identifying that the uplink grant is received on subframe index 0 of a first ten-subframe cycle;
determining, based at least in part on the uplink grant being received on subframe index 0 of the first ten-subframe cycle, that the second subframe for transmitting the uplink data is at subframe index 4 of the first ten-subframe cycle; and
determining, based at least in part on the uplink data being transmitted on subframe index 4 of the first ten-subframe cycle, that the third subframe for monitoring the feedback is at subframe index 0 of a second ten-subframe cycle subsequent to the first ten-subframe cycle.

5. The method of claim 3, wherein determining the second subframe and the third subframe comprises:
identifying that the uplink grant is received on subframe index 1 of a first ten-subframe cycle;
determining, based at least in part on the uplink grant being received on subframe index 1 of the first ten-subframe cycle, that the second subframe for transmitting the uplink data is at subframe index 7 of the first ten-subframe cycle; and
determining, based at least in part on the uplink data being transmitted on subframe index 7 of the first ten-subframe cycle, that the third subframe for monitoring the feedback is at subframe index 1 of a second ten-subframe cycle subsequent to the first ten-subframe cycle.

6. The method of claim 3, wherein determining the second subframe and the third subframe comprises:
identifying that the uplink grant is received on subframe index 1 of a first ten-subframe cycle;
determining, based at least in part on the uplink grant being received on subframe index 1 of the first ten-subframe cycle and on a value of an uplink index field in the uplink grant, that the second subframe for transmitting the uplink data is either at subframe index 7 or subframe index 8 of the first ten-subframe cycle; and
determining, based at least in part on the uplink data being transmitted on subframe index 7 or subframe index 8 of the first ten-subframe cycle, that the third subframe for monitoring the feedback is at either subframe index 1 or subframe index 5 of a second ten-subframe cycle subsequent to the first ten-subframe cycle.

7. The method of claim 3, wherein determining the second subframe and the third subframe comprises:
identifying that the uplink grant is received on subframe index 5 of a first ten-subframe cycle;
determining, based at least in part on the uplink grant being received on subframe index 5 of the first ten-subframe cycle, that the second subframe for transmitting the uplink data is at subframe index 9 of the first ten-subframe cycle; and
determining, based at least in part on the uplink data being transmitted on subframe index 9 of the first ten-subframe cycle, that the third subframe for monitoring the feedback is at subframe index 5 of a second ten-subframe cycle subsequent to the first ten-subframe cycle.

8. The method of claim 3, wherein determining the second subframe and the third subframe comprises:
identifying that the uplink grant is received on subframe index 6 of a first ten-subframe cycle;
determining, based at least in part on the uplink grant being received on subframe index 6 of the first ten-subframe cycle, that the second subframe for transmitting the uplink data is at subframe index 2 of a second ten-subframe cycle subsequent to the first ten-subframe cycle; and
determining, based at least in part on the uplink data being transmitted on subframe index 2 of the first ten-subframe cycle, that the third subframe for monitoring the feedback is at subframe index 6 of the second ten-subframe cycle.

9. The method of claim 3, wherein determining the second subframe and the third subframe comprises:
identifying that the uplink grant is received on subframe index 6 of a first ten-subframe cycle;
determining, based at least in part on the uplink grant being received on subframe index 6 of the first ten-subframe cycle and on a value of an uplink index field in the uplink grant, that the second subframe for transmitting the uplink data is either at subframe index 2 or subframe index 3 of a second ten-subframe cycle subsequent to the first ten-subframe cycle; and
determining, based at least in part on the uplink data being transmitted on either subframe index 2 or subframe index 3 of the second ten-subframe cycle, that the third subframe for monitoring the feedback is either at subframe index 6 or at subframe index 0 of a third ten-subframe cycle subsequent to the second ten-subframe cycle.

10. The method of claim 3, further comprising:
identifying that the UE is a dynamic power sharing capable UE;
identifying, from the combinations and based at least in part on the UE being a dynamic power sharing capable UE, that the UE is configured to receive the uplink grant on any one of a subframe index 0, 1, 5, or 6 of a first ten-subframe cycle;
identifying, from the combinations, that the UE is configured to transmit the uplink data on any one of a subframe index 4, 7, or 9 of the first ten-subframe cycle or subframe index 2 of a second ten-subframe cycle subsequent to the first ten-subframe cycle; and
identifying, from the combinations, that the UE is configured to monitor for the feedback associated with transmission of the uplink data on any one of a subframe index 0, 1, 5, or 6 of the second ten-subframe cycle.

11. The method of claim 3, further comprising:
identifying that the UE is a non-dynamic power sharing capable UE;
identifying, from the combinations and based at least in part on the UE being a non-dynamic power sharing capable UE, that the UE is configured to receive the uplink grant on any one of a subframe index 1 or 6 of a first ten-subframe cycle when the downlink-reference uplink-downlink configuration corresponds to the configuration index 2;
identifying, from the combinations, that the UE is configured to transmit the uplink data on any one of a subframe index 7 of the first ten-subframe cycle or subframe index 2 of a second ten-subframe cycle subsequent to the first ten-subframe cycle when the downlink-reference uplink-downlink configuration corresponds to the configuration index 2; and identifying, from the combinations, that the UE is configured to monitor for the feedback associated with transmission of the uplink data on any one of a subframe index 1 or 6 of the second ten-subframe cycle when the downlink-reference uplink-downlink configuration corresponds to the configuration index 2.

12. The method of claim 3, further comprising:
identifying that the UE is a non-dynamic power sharing capable UE;
identifying, from the combinations and based at least in part on the UE being a non-dynamic power sharing capable UE, that the UE is configured to receive the uplink grant on a subframe index 6 of a first ten-subframe cycle when the downlink-reference uplink-downlink configuration corresponds to the configuration index 4 or the configuration index 5;
identifying, from the combinations, that the UE is configured to transmit the uplink data on subframe index 2 of a second ten-subframe cycle subsequent to the first ten-subframe cycle when the downlink-reference uplink-downlink configuration corresponds to the configuration index 4 or the configuration index 5; and
identifying, from the combinations, that the UE is configured to monitor for the feedback associated with transmission of the uplink data on subframe index 6 of the second ten-subframe cycle when the downlink-reference uplink-downlink configuration corresponds to the configuration index 4 or the configuration index 5.

13. The method of claim 2, further comprising:
identifying that the primary cell time division duplex uplink-downlink configuration corresponds to the configuration index 6; and
identifying that the downlink-reference uplink-downlink configuration corresponds to one of a configuration index 2, a configuration index 4, or a configuration index 5.

14. The method of claim 13, wherein determining the second subframe and the third subframe comprises:
identifying that the uplink grant is received on subframe index 1 of a first ten-subframe cycle;
determining, based at least in part on the uplink grant being received on subframe index 1 of the first ten-subframe cycle, that the second subframe for transmitting the uplink data is at subframe index 7 of the first ten-subframe cycle; and
determining, based at least in part on the uplink data being transmitted on subframe index 7 of the first ten-subframe cycle, that the third subframe for monitoring the feedback is at subframe index 1 of a second ten-subframe cycle subsequent to the first ten-subframe cycle.

15. The method of claim 13, wherein determining the second subframe and the third subframe comprises:
identifying that the uplink grant is received on subframe index 6 of a first ten-subframe cycle;
determining, based at least in part on the uplink grant being received on subframe index 6 of the first ten-subframe cycle, that the second subframe for transmitting the uplink data is at subframe index 2 of a second ten-subframe cycle subsequent to the first ten-subframe cycle; and determining, based at least in part on the uplink data being transmitted on subframe index 2 of the first ten-subframe cycle, that the third subframe for monitoring the feedback is at subframe index 6 of a second ten-subframe cycle subsequent to the first ten-subframe cycle.

16. The method of claim 13, wherein determining the second subframe and the third subframe comprises:
identifying that the uplink grant is received on subframe index 9 of a first ten-subframe cycle;
determining, based at least in part on the uplink grant being received on subframe index 9 of the first ten-subframe cycle, that the second subframe for transmitting the uplink data is at subframe index 3 of a second ten-subframe cycle subsequent to the first ten-subframe cycle; and
determining, based at least in part on the uplink data being transmitted on subframe index 3 of the second ten-subframe cycle, that the third subframe for monitoring the feedback is at subframe index 9 of the second ten-subframe cycle.

17. The method of claim 13, further comprising:
identifying that the UE is a dynamic power sharing capable UE;
identifying, from the combinations and based at least in part on the UE being a dynamic power sharing capable UE, that the UE is configured to receive the uplink grant on any one of a subframe index 1, 6, or 9 of a first ten-subframe cycle;
identifying, from the combinations, that the UE is configured to transmit the uplink data on any one of a subframe index 7 of the first ten-subframe cycle or subframe index 2 or 3 of a second ten-subframe cycle subsequent to the first ten-subframe cycle; and
identifying, from the combinations, that the UE is configured to monitor for the feedback associated with transmission of the uplink data on any one of a subframe index 1, 6, or 9 of the second ten-subframe cycle.

18. The method of claim 13, further comprising:
identifying that the UE is a non-dynamic power sharing capable UE;
identifying, from the combinations and based at least in part on the UE being a non-dynamic power sharing capable UE, that the UE is configured to receive the uplink grant on any one of a subframe index 1 or 6 of a first ten-subframe cycle when the downlink-reference uplink-downlink configuration corresponds to the configuration index 2;
identifying, from the combinations, that the UE is configured to transmit the uplink data on any one of a subframe index 7 of the first ten-subframe cycle or subframe index 2 of a second ten-subframe cycle subsequent to the first ten-subframe cycle when the downlink-reference uplink-downlink configuration corresponds to the configuration index 2; and
identifying, from the combinations, that the UE is configured to monitor for the feedback associated with transmission of the uplink data on any one of a subframe index 1 or 6 of the second ten-subframe cycle when the downlink-reference uplink-downlink configuration corresponds to the configuration index 2.

19. The method of claim 13, further comprising:
identifying that the UE is a non-dynamic power sharing capable UE;
identifying, from the combinations and based at least in part on the UE being a non-dynamic power sharing capable UE, that the UE is configured to receive the uplink grant on any one of a subframe index 6 or 9 of a first ten-subframe cycle when the downlink-reference uplink-downlink configuration corresponds to the configuration index 4;

identifying, from the combinations, that the UE is configured to transmit the uplink data on any one of a subframe index 2 or 3 of a second ten-subframe cycle subsequent to the first ten-subframe cycle when the downlink-reference uplink-downlink configuration corresponds to the configuration index 4; and identifying, from the combinations, that the UE is configured to monitor for the feedback associated with transmission of the uplink data on any one of a subframe index 6 or 9 of the second ten-subframe cycle when the downlink-reference uplink-downlink configuration corresponds to the configuration index 4.

20. The method of claim 13, further comprising:

identifying that the UE is a non-dynamic power sharing capable UE;

identifying, from the combinations and based at least in part on the UE being a non-dynamic power sharing capable UE, that the UE is configured to receive the uplink grant on a subframe index 6 of a first ten-subframe cycle when the downlink-reference uplink-downlink configuration corresponds to the configuration index 5;

identifying, from the combinations, that the UE is configured to transmit the uplink data on subframe index 2 of a second ten-subframe cycle subsequent to the first ten-subframe cycle when the downlink-reference uplink-downlink configuration corresponds to the configuration index 5; and identifying, from the combinations, that the UE is configured to monitor for the feedback associated with transmission of the uplink data on subframe index 6 of the second ten-subframe cycle when the downlink-reference uplink-downlink configuration corresponds to the configuration index 5.

21. The method of claim 1, wherein an uplink index field in the uplink grant comprises an uplink downlink assignment index.

22. The method of claim 1, wherein an uplink index field in the uplink grant comprises one or more static bit values.

23. The method of claim 1, further comprising:

identifying a dynamic power sharing capability of the UE; and transmitting, to the base station, UE capability information comprising an indication of the dynamic power sharing capability of the UE.

24. The method of claim 23, further comprising:

receiving, via signaling from the base station, an indication of the primary cell time division duplex uplink-downlink configuration and the downlink-reference uplink-downlink configuration based at least in part on the UE capability information.

25. The method of claim 24, wherein the signaling comprises UE specific radio resource control signaling.

26. The method of claim 24, wherein the signaling comprises a dynamic control signaling.

27. The method of claim 26, wherein the dynamic control signaling comprises downlink control information.

28. An apparatus for wireless communication, comprising:

a processor, memory coupled with the processor; and instructions stored in the memory and executable by the processor to cause the apparatus to:

receive, from a base station and while operating in a dual connectivity mode, an uplink grant in a first subframe of a plurality of subframes associated with a set of transmission timelines, the uplink grant scheduling transmission of uplink data;

determine a second subframe of the plurality of subframes to transmit the uplink data and a third subframe of the plurality of subframes to monitor for feedback associated with the transmission of the uplink data, the second subframe and the third subframe being determined based at least in part on combinations of a primary cell time division duplex uplink-downlink configuration corresponding to a configuration index 0 or a configuration index 6 and a downlink-reference uplink-downlink configuration, the combinations corresponding to transmission timelines, each of the combinations having at least three uplink transmission subframes or at least three downlink monitoring subframes within a ten-subframe cycle, wherein the configuration index 0 and the configuration index 6 both comprise an uplink-to-downlink subframe ratio that is greater than or equal to one; and communicate with the base station in accordance with the transmission timelines.

29. An apparatus for wireless communication, comprising:

means for receiving, from a base station and while operating in a dual connectivity mode, an uplink grant in a first subframe of a plurality of subframes associated with a set of transmission timelines, the uplink grant scheduling transmission of uplink data;

means for determining a second subframe of the plurality of subframes to transmit the uplink data and a third subframe of the plurality of subframes to monitor for feedback associated with the transmission of the uplink data, the second subframe and the third subframe being determined based at least in part on combinations of a primary cell time division duplex uplink-downlink configuration corresponding to a configuration index 0 or a configuration index 6 and a downlink-reference uplink-downlink configuration, the combinations corresponding to transmission timelines, each of the combinations having at least three uplink transmission subframes or at least three downlink monitoring subframes within a ten-subframe cycle, wherein the configuration index 0 and the configuration index 6 both comprise an uplink-to-downlink subframe ratio that is greater than or equal to one; and means for communicating with the base station in accordance with the transmission timelines.

30. A non-transitory computer-readable medium storing code for wireless communication at a user equipment (UE), the code comprising instructions executable by a processor to:

receive, from a base station and while operating in a dual connectivity mode, an uplink grant in a first subframe of a plurality of subframes associated with a set of transmission timelines, the uplink grant scheduling transmission of uplink data;

determine a second subframe of the plurality of subframes to transmit the uplink data and a third subframe of the plurality of subframes to monitor for feedback associated with the transmission of the uplink data, the second subframe and the third subframe being determined based at least in part on combinations of a primary cell time division duplex uplink-downlink configuration corresponding to a configuration index 0 or a configuration index 6 and a downlink-reference uplink-downlink configuration, the combinations corresponding to transmission timelines, each of the combinations having at least three uplink transmission subframes or at least three downlink monitoring subframes within a ten-subframe cycle, wherein the configuration index 0 and the configuration index 6 both comprise an uplink-to-downlink subframe ratio that is greater than or equal to one; and communicate with the base station in accordance with the transmission timelines.

\* \* \* \* \*